United States Patent
Nobukuni et al.

(10) Patent No.: US 7,050,377 B1
(45) Date of Patent: May 23, 2006

(54) OPTICAL RECORDING METHOD AND OPTICAL RECORDING MEDIUM

(75) Inventors: Natsuko Nobukuni, Kanagawa (JP); Michikazu Horie, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 131 days.

(21) Appl. No.: 10/657,121

(22) Filed: Sep. 9, 2003

Related U.S. Application Data

(60) Division of application No. 10/141,981, filed on May 10, 2002, now Pat. No. 6,661,760, which is a division of application No. 09/884,121, filed on Jun. 20, 2001, now Pat. No. 6,411,572, which is a continuation-in-part of application No. PCT/JP00/03036, filed on May 11, 2000.

(30) Foreign Application Priority Data

| | | |
|---|---|---|
| May 19, 1999 | (JP) | 11-138067 |
| Mar. 17, 2000 | (JP) | 2000-076514 |

(51) Int. Cl.
  *G11B 7/00* (2006.01)

(52) U.S. Cl. ............... 369/59.11; 369/59.12; 369/59.2; 369/116

(58) Field of Classification Search .......... 369/47.1, 369/47.28, 47.5, 53.1, 59.1, 59.11, 59.12, 369/59.2, 116
See application file for complete search history.

(56) References Cited

U.S. PATENT DOCUMENTS

| | | |
|---|---|---|
| 5,530,688 A | 6/1996 | Hurst, Jr. et al. |
| 5,568,461 A | 10/1996 | Nishiuchi et al. |

(Continued)

FOREIGN PATENT DOCUMENTS

| | | |
|---|---|---|
| EP | 0 217 293 | 4/1987 |
| EP | 0 388 897 | 9/1990 |

(Continued)

OTHER PUBLICATIONS

N. Nobukuni, et al. J. Appl Physics, "Microstructural changes in GeSbTe film during repetitious overwriting in phase–change optical recording," Dec. 15, 1995, pp. 6980–6988.

(Continued)

*Primary Examiner*—Muhammad Edun
(74) *Attorney, Agent, or Firm*—Oblon, Spivak, McClelland, Maier & Neustadt, P.C.

(57) ABSTRACT

An optical recording method for recording mark length-modulated information on a recording medium by using a plurality of recording mark lengths. The optical recording method comprises the steps of:

when a time length of one recording mark is denoted nT (T is a reference clock period equal to or less than 25 ns, and n is a natural number equal to or more than 2), (i) dividing the time length of the recording mark nT into $$\eta_1 T, \alpha_1 T, \beta_1 T, \alpha_2 T, \beta_2 T, \ldots, \alpha_i T, \beta_i T, \alpha_m T, \beta_m T, \eta_2 T$$

in that order (m is a pulse division number; $\Sigma_i(\alpha_i+\beta_i)+\eta_1+\eta_2=n$; $\alpha_i$ ($1 \leq i \leq m$) is a real number>0; $\beta_i$ ($1 \leq i \leq m-1$) is a real number>0; $\beta_m$ is a real number$\geq 0$; and $\eta_1$ is a real number of $-2 \leq \eta_1 \leq 2$ and $\eta_2$ is a real number of $-2 \leq \eta_2 \leq 2$);

radiating recording light with a recording power $Pw_i$ in a time duration of $\alpha_i T$ ($1 \leq i \leq m$), and radiating recording light with a bias power $Pb_i$ in a time duration of $\beta_i T$ ($1 \leq i \leq m$), the bias power being $Pb_i < Pw_i$ and $Pb_i < Pw_{i+1}$; and (ii) changing m, $\alpha_i$, $\beta_i$, $\eta_1$, $\eta_2$, $Pw_i$ and $Pb_i$ according to n of the time length nT of the recording mark;

wherein the pulse division number m is 2 or more for the time duration of at least one recording mark and meets $n/m \geq 1.25$ for the time length of all the recording marks.

11 Claims, 27 Drawing Sheets

U.S. PATENT DOCUMENTS

| | | | |
|---|---|---|---|
| 5,703,855 A | 12/1997 | Kirino et al. | |
| 5,732,062 A | 3/1998 | Yokoi et al. | |
| 5,848,043 A | 12/1998 | Takada et al. | |
| 6,108,295 A * | 8/2000 | Ohno et al. | 369/275.2 |
| 6,256,277 B1 | 7/2001 | Saga et al. | |
| 6,256,286 B1 | 7/2001 | Ogawa | |
| 6,285,647 B1 * | 9/2001 | Van Woudenberg et al. | 369/53.1 |
| 6,294,310 B1 | 9/2001 | Ohno et al. | |
| 6,383,595 B1 | 5/2002 | Hirotsune et al. | |

FOREIGN PATENT DOCUMENTS

| | | |
|---|---|---|
| EP | 0 834 874 | 4/1998 |
| EP | 0 847 049 | 6/1998 |
| EP | 0 867 868 | 9/1998 |
| EP | 0 902 424 | 3/1999 |
| EP | 1 047 056 | 10/2000 |
| JP | 62-259229 | 11/1987 |
| JP | 63-22439 | 1/1988 |
| JP | 63-266632 | 11/1988 |
| JP | 4-325288 | 11/1992 |
| JP | 7-37251 | 2/1995 |
| JP | 7-37252 | 2/1995 |
| JP | 8-287465 | 11/1996 |
| JP | 9-7176 | 1/1997 |
| JP | 9-71049 A | 3/1997 |
| JP | 9-282661 | 10/1997 |
| WO | WO 99/006220 | 2/1999 |

OTHER PUBLICATIONS

M. Horie, et al., Optical Data Storage, Proceedings of SPIE, vol. 4342, XP-002267102, pp. 76–87, "Material Characterization and Application of Eutectic SbTe Based Phase-change Optical Recording Media", Apr., 2001.

Patent Abstracts of Japan, JP 10-241160, Sep. 11, 1998.

Patent Abstracts of Japan, JP 61-020236, Jan. 29, 1986.

U.S. Appl. No. 10/657,121, filed Sep. 9, 2003, Nobukuni et al.

U.S. Appl. No. 10/825,439, filed Apr. 16, 2004, Nobukuni et al.

* cited by examiner

FIG. 11 (a)

11T SPACE
11T MARK
1T
1T
0.5T

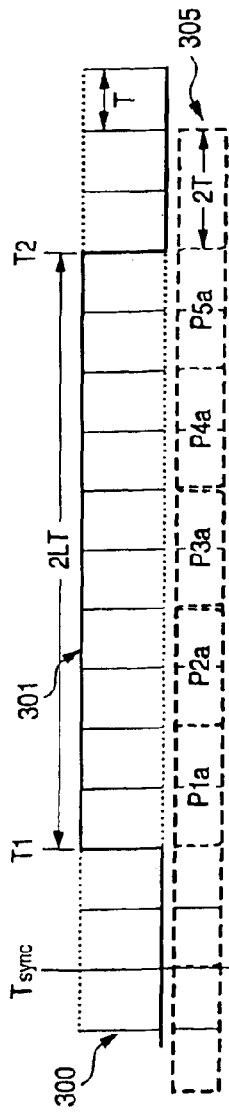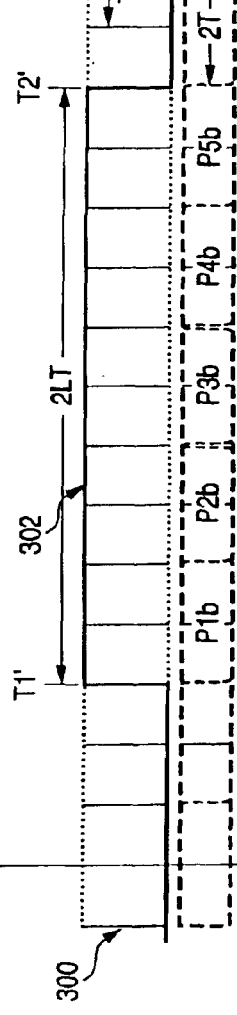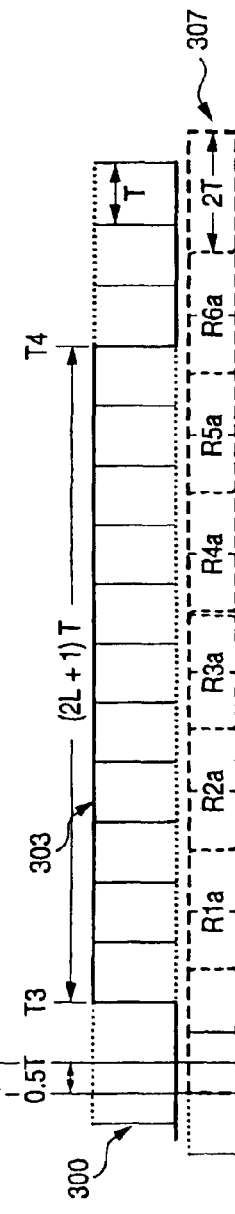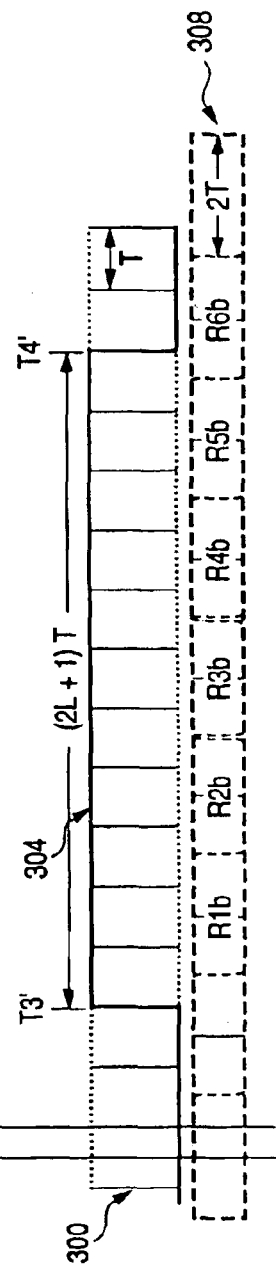
FIG. 13 (a)  FIG. 13 (b)  FIG. 13 (c)  FIG. 13 (d)

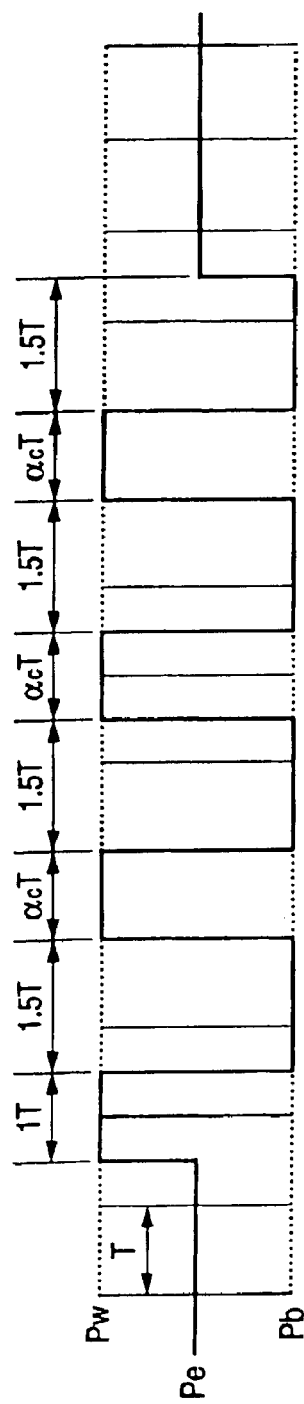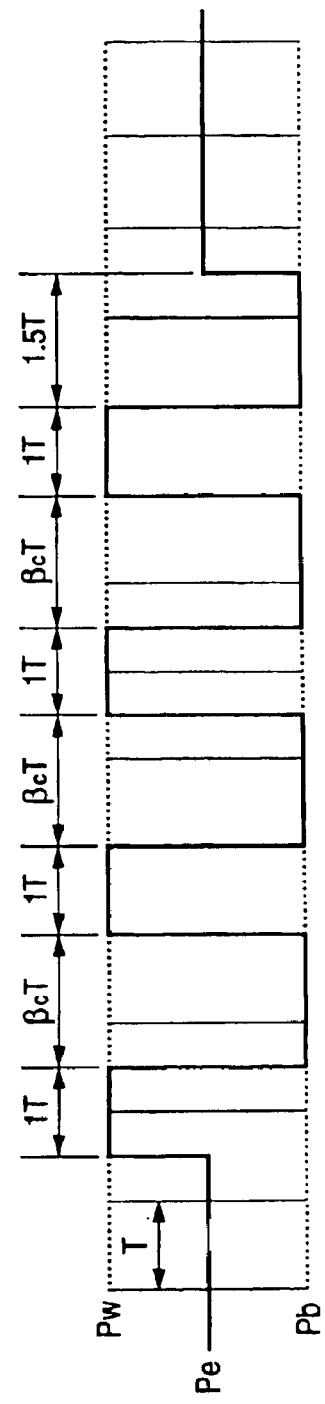
FIG. 14 (a)    FIG. 14 (b)

MARK LENGTH AND SPACE LENGTH

MARK AND SPACE JITTER

MARK LENGTH AND SPACE LENGTH

MARK AND SPACE JITTER

MARK LENGTH AND SPACE LENGTH

MARK AND SPACE JITTER

FIG. 20

| | α1 | β1 | α2 | β2 | α3 | β3 | α4 | β4 | α5 | β5 |
|---|---|---|---|---|---|---|---|---|---|---|
| 3T | 1.2T | 1.5T | | | | | | | | |
| 4T | 0.8T | 1.2T | 0.7T | 0.9T | | | | | | |
| 5T | 1.0T | 1.5T | 1.0T | 1.1T | | | | | | |
| 6T | 0.8T | 1.2T | 0.8T | 1.2T | 0.7T | 0.9T | | | | |
| 7T | 1.0T | 1.5T | 0.8T | 1.2T | 1.0T | 1.1T | | | | |
| 8T | 0.8T | 1.2T | 0.8T | 1.2T | 0.8T | 1.2T | 0.7T | 0.9T | | |
| 9T | 1.0T | 1.5T | 0.8T | 1.2T | 0.8T | 1.2T | 1.0T | 1.1T | | |
| 10T | 0.8T | 1.2T | 0.8T | 1.2T | 0.8T | 1.2T | 0.8T | 1.2T | 0.7T | 0.9T |
| 11T | 1.0T | 1.5T | 0.8T | 1.2T | 0.8T | 1.2T | 0.8T | 1.2T | 1.0T | 1.1T |

FIG. 22

| | α1 | β1 | α2 | β2 | α3 | β3 | α4 | β4 | α5 | β5 |
|---|---|---|---|---|---|---|---|---|---|---|
| 3T | 0.8T | 2.4T | | | | | | | | |
| 4T | 0.6T | 1.4T | 0.5T | 1.4T | | | | | | |
| 5T | 0.6T | 1.9T | 0.6T | 1.8T | | | | | | |
| 6T | 0.6T | 1.4T | 0.5T | 1.5T | 0.5T | 1.4T | | | | |
| 7T | 0.6T | 1.9T | 0.5T | 1.5T | 0.6T | 1.8T | | | | |
| 8T | 0.6T | 1.4T | 0.5T | 1.5T | 0.5T | 1.5T | 0.5T | 1.4T | | |
| 9T | 0.6T | 1.9T | 0.5T | 1.5T | 0.5T | 1.5T | 0.6T | 1.8T | | |
| 10T | 0.6T | 1.4T | 0.5T | 1.5T | 0.5T | 1.5T | 0.5T | 1.5T | 0.5T | 1.4T |
| 11T | 0.6T | 1.9T | 0.5T | 1.5T | 0.5T | 1.5T | 0.5T | 1.5T | 0.8T | 1.8T |

FIG. 26

| | Td1 | α1 | β1 | α2 | β2 | α3 | β3 | α4 | β4 | α5 | β5 | α6 | β6 | α7 | β7 |
|---|---|---|---|---|---|---|---|---|---|---|---|---|---|---|---|
| 3T | 1.15T | 1.2T | 0.8T | | | | | | | | | | | | |
| 4T | 0.95T | 1.05T | 1.0T | 1.0T | | | | | | | | | | | |
| 5T | 1.0T | 1.05T | 1.7T | 1.2T | 0.4T | | | | | | | | | | |
| 6T | 0.95T | 1.05T | 1.0T | 1.0T | 0.4T | 1.0T | | | | | | | | | |
| 7T | 1.0T | 1.05T | 1.45T | 1.0T | 1.0T | 1.0T | 0.4T | | | | | | | | |
| 8T | 0.95T | 1.05T | 1.0T | 1.0T | 1.45T | 1.0T | 0.4T | 1.0T | | | | | | | |
| 9T | 1.0T | 1.05T | 1.45T | 1.0T | 1.0T | 1.0T | 1.0T | 1.0T | 0.4T | | | | | | |
| 10T | 0.95T | 1.05T | 1.0T | 1.0T | 1.0T | 1.0T | 1.45T | 1.0T | 0.4T | 1.0T | | | | | |
| 11T | 1.0T | 1.05T | 1.45T | 1.0T | 1.0T | 1.0T | 1.0T | 1.0T | 1.0T | 1.0T | 0.4T | | | | |
| 14T | 0.95T | 1.05T | 1.0T | 1.0T | 1.0T | 1.0T | 1.0T | 1.0T | 1.0T | 1.0T | 1.45T | 1.0T | 1.0T | 1.0T | 0.4T |

FIG. 28

| | Td1 | α1 | β1 | α2 | β2 | α3 | β3 | α4 | β4 | α5 | β5 | α6 | β6 | α7 | β7 |
|---|---|---|---|---|---|---|---|---|---|---|---|---|---|---|---|
| 3T | 1.05T | 1.2T | 1.2T | | | | | | | | | | | | |
| 4T | 1.0T | 1.0T | 1.3T | 0.7T | | | | | | | | | | | |
| 5T | 1.05T | 1.0T | 2.0T | 0.9T | 0.7T | | | | | | | | | | |
| 6T | 1.0T | 1.0T | 1.3T | 0.7T | 1.3T | 0.7T | | | | | | | | | |
| 7T | 1.05T | 1.0T | 1.75T | 0.7T | 1.75T | 0.7T | 0.7T | | | | | | | | |
| 8T | 1.0T | 1.0T | 1.3T | 0.7T | 1.3T | 0.7T | 1.3T | 0.7T | 0.7T | | | | | | |
| 9T | 1.05T | 1.0T | 1.75T | 0.7T | 1.3T | 0.7T | 1.75T | 0.7T | 0.7T | 0.7T | | | | | |
| 10T | 1.0T | 1.0T | 1.3T | 0.7T | 1.3T | 0.7T | 1.3T | 0.7T | 1.3T | 0.7T | 0.7T | | | | |
| 11T | 1.05T | 1.0T | 1.75T | 0.7T | 1.3T | 0.7T | 1.3T | 0.7T | 1.75T | 0.7T | 0.7T | 0.7T | | | |
| 14T | 1.0T | 1.0T | 1.3T | 0.7T | 1.3T | 0.7T | 1.3T | 0.7T | 1.3T | 0.7T | 1.3T | 0.7T | 1.3T | 0.7T | 0.7T |

OPTICAL RECORDING METHOD AND OPTICAL RECORDING MEDIUM

This is a division of application Ser. No. 10/141,981, filed May 10, 2002, now U.S. Pat. No. 6,661,760, which is a division of application Ser. No. 09/884,121, filed on Jun. 20, 2001, now U.S. Pat. No. 6,411,579, which is a continuation of International patent application No. PCT/JP00/03036, filed May, 11, 2000.

TECHNICAL FIELD

The present invention relates to an optical recording method and an optical recording medium.

BACKGROUND ART

As the amount of information increases in recent years, there are growing demands for a recording medium capable of writing and retrieving a large amount of data at high speed and in high density. There are growing expectations that the optical disks Will meet this demand.

There are two types of optical disks: a write-once type that allows the user to record data only once, and a rewritable type that allows the user to record and erase data as many times as they wish. Examples of the rewritable optical disk include a magnetooptical recording medium that utilizes a magneto-optical effect and a phase-change type recording medium that utilizes a change in reflectance accompanying a reversible crystal state change.

The principle of recording an optical disk involves applying a recording power to a recording layer to raise the temperature of that layer to or above a predetermined critical temperature to cause a physical or chemical change for data recording. This principle applies to all of the following media: a write-once medium utilizing pitting or deformation, an magnetooptical medium utilizing a magnetic reversal at the vicinity of the Curie point, and a phase change medium utilizing a phase transition between amorphous and crystal states of the recording layer.

Further, taking advantage of the 1-beam-overwrite ability (erasing and writing at the same time) of the phase change recording medium, rewritable compact disks compatible with CDs and DVDs (CD-ReWritable and CD-RW) and rewritable DVDs have been developed.

Almost all of these optical recording media in recent years employ a mark length recording method, which is suited for increasing the recording density.

The mark length recording is a method that records data by changing both the lengths of marks and the lengths of spaces. Compared with a mark position recording method which changes only the lengths of the spaces, this method is more suited to increasing the recording density and can increase the recording density by as much as 1.5 times. However, to retrieve data accurately makes the detection of the time length of the mark stringent, thus requiring precise control of the shape of mark edges. Further, there is another difficulty that a plurality of kinds of marks with different lengths, from short marks to long marks, need to be formed.

In the following descriptions, the spatial length of a mark is referred to as a mark length and a time length of the mark as a mark time length. When a reference clock period is determined, the mark length and the mark time length have a one-to-one correspondence.

In the mark length recording, when writing an nT mark (a mark having a mark time length of nT where T is a reference clock period of data and n is a natural number), simply radiating a recording power of square wave with the time length of nT or with the length finely adjusted will result in the front and rear ends of each mark differing in temperature distribution, which in turn causes the rear end portion in particular to accumulate heat and widen, forming an mark with an asymmetric geometry. This raises difficulties in precisely controlling the mark length and suppressing variations of the mark edge.

To uniformly shape the marks, from short marks to long marks, various means have been employed, such as division of recording pulses and use of off pulses. For example, the following techniques have been adopted in the phase change media.

That is, a recording pulse is divided to adjust the geometry of an amorphous mark (JP-A 62-259229, JP-A 63-266632). This approach is also utilized in the write-once medium that is not overwritten. Further, an off pulse is widely employed as a mark shape compensation means (JP-A 63-22439, etc.)

Other proposed methods include one which deliberately dull a trailing edge of the recording pulse to adjust the mark length and the mark time length (JP-A 7-37252); one which shifts a recording pulse radiation time (JP-A 8-287465); one which, in a multipulse recording method, differentiates a value of bias power during the mark writing operation from that during the space writing operation or erasing operation (JP-A 7-37251); and one which controls a cooling time according to a linear velocity (JP-A 9-7176).

The recording method based on the above pulse division approach is also used in the magnetooptical recording medium and the write-once type optical recording medium. In the magnetooptical and write-once type mediums, this approach aims to prevent heat from becoming localized. In the phase change medium, this approach has additional objective of preventing recrystallization.

Common examples of mark length modulation recording include a CD compatible medium using an EFM (Eight-Fourteen Modulation), a DVD compatible medium using an EFM+ modulation, a variation of 8–16 modulation, and a magnetooptical recording medium using a (1, 7)-RLL-NRZI (Ruu-Length Limited Non-Return to Zero Inverted) modulation. The EFM modulation provides 3T to 11T marks; the EFM+ modulation provides 3T to 14T marks; and the (1, 7)-RLL-NRZI modulation provides 2T to 8T marks. Of these, the EFM+ modulation and the (1, 7)-RLL-NRZI modulation are known as modulation methods for high-density mark length modulation recording.

As the recording pulse division scheme for the mark length modulation recording media such as CD, the following method is widely used.

That is, when a mark to be recorded has a time length of nT (T is a reference clock period and n is a natural number equal to or greater than 2), the time (n−η)T is divided into $$\alpha_1 T, \beta_1 T, \alpha_2 T, \beta_2 T, \ldots, \alpha_m T, \beta_m T$$

(where $\Sigma\alpha_i + \Sigma\beta_i = n - \eta$; $\eta$ is a real number from 0 to 2; m is a number satisfying m=m−k; and k is 1 or 2). In a time duration of $\alpha_i T$ ($1 \leq i \leq m$) as the recording pulse section, recording light with a recording power Pw is radiated. In a time duration of $\beta_i T$ ($1 \leq i \leq m$) as the off pulse section, recording light with a bias power Pb, less than Pw, is radiated.

FIG. 2 is a schematic diagram showing a power pattern of the recording light used in this recording method. To form a mark of a length shown in FIG. 2(a), a pattern shown in FIG. 2(b) is used. When forming a mark that is mark-lengthmodulated to the length of nT (T is a reference clock period; and n is a mark length, an integer value, that can be taken in the mark length modulation recording), (n−η)T is divided into m=n−k (k is 1 or 2) recording pulses (in the case of FIG. 2(b), k=1 and i=0.5), and the individual recording pulse widths are set to $\alpha_i T$ ($1 \leq i \leq m$), each followed by the off pulse section of $\beta_i T$ ($1 \leq i \leq m$). In the $\alpha_i T$ ($1 \leq i \leq m$) section during the recording, the recording light with the recording power Pw is radiated and, in the $\beta_i T$ ($1 \leq i \leq m$) section, the bias power Pb (Pb<Pw) is radiated. At this time, to ensure that an accurate nT mark can be obtained during the detection of the mark length, $\Sigma\alpha_i + \Sigma\beta_i$ may be set slightly smaller than n, and the following setting is made: $\Sigma\alpha_i + \Sigma\beta_i = n - \eta$ (η is a real number in $0.0 \leq \eta \leq 2.0$).

That is, in the conventional technique, when the recording light to be radiated to form an nT mark is divided, the recording pulse is divided into m pieces (m=n−k, where k is 1 or 2), m being obtained by uniformly subtracting k from n (as described in JP-A 9-282661), and then a predetermined number is subtracted from the number of divisions m of the recording pulse to control the mark time length accurately (in the following, such a pulse division scheme is called an "n−k division" scheme).

Generally, the reference clock period T decreases as the density or speed increases. For example, T decreases in the following cases.

(1) When the recording density is enhanced to increase the recording capacity:

As the mark length and the mark time length are reduced, the density increases. In this case, a clock frequency needs to be increased to reduce the reference clock period T.

(2) When the recording linear velocity is increased to increase a data transfer rate:

In the high-speed recording of recordable CDs and DVDs, the clock frequency is increased to reduce the reference clock period T. In a CD-based medium such as a rewritable compact disk, for example, the reference clock period T during a ×1-speed operation (linear velocity is 1.2–1.4 m/s) is 231 nanoseconds; but during a ×10-speed operation the reference clock period T becomes very short, 23.1 nanoseconds. In the DVD-based medium, while the reference clock frequency T during a ×1-speed operation (3.5 m/s) is 38.2 nanoseconds, it is 19.1 ns during a ×2-speed operation.

As can be seen from the (1) and (2), in large-capacity optical disks and CDs and DVDs with high data transfer rates, the reference clock period T is very short. As a result, the recording pulse section $\alpha_i T$ and the off pulse section $\beta_i T$ also tend to become short. Under these circumstances the following problems arise.

(Problem a)

The recording pulse section $\alpha_i T$ may be too short for the rising/falling edge speed of radiated light, particularly a laser, to follow. A rise time is a time taken by the projected power of radiated light such as laser to reach a set value, and a fall time is a time taken by the projected power of the radiated light such as laser to fall from the set value to a complete off level. At present the rise and fall times take at least 2–3 nanoseconds respectively. Hence, when the pulse width is less than 15 ns, for example, the time it takes for the light to actually project a required power is a few nanoseconds. Further, when the pulse width is less than five nanoseconds, the projected power begins to fall before it reaches the set value, so that the temperature of the recording layer does not rise sufficiently, failing to produce a predetermined mark size. These issues of response speed limits of a signal source and a laser beam cannot be dealt with by making improvements on the wavelength of a light source, on the method of radiating light onto substrate/film surface, or on other recording methods.

(Problem b)

When the off pulse section $\beta_i T$ is narrow, the recording medium cannot take a sufficient time to cool down and the off pulse function (cooling speed control function) does not work although the off pulse section is provided, leaving heat to be accumulated in the rear end part of the mark, making it impossible to form the correct shape of the mark. This problem becomes more serious as the length of the mark increases.

This problem will be explained by taking a phase change medium as an example.

The currently available phase change medium typically takes crystal portions as an unrecorded state or erased state and amorphous portions as a recorded state. To form an amorphous mark involves radiating a laser onto a tiny area of the recording layer to melt that tiny portion and quickly cooling it to form an amorphous mark: When, for example, a long mark (a mark more than about 5T in length based on the EFM modulation recording for CD format) is formed using a rectangular waveform of recording power with no off pulse section at all, as shown in FIG. 3(a), then an amorphous mark with a narrow rear end is formed as shown in FIG. 3(b) and a distorted retrieve waveform is observed as shown in FIG. 3(c). This is because, in the rear part of the long mark in particular, heat is accumulated by heat diffusion from the front part enlarging the melted area in the rear part but the cooling speed deteriorates significantly allowing the melted area to recrystallize as it solidifies. This tendency becomes conspicuous as the linear velocity for recording decreases because the cooling speed of the recording layer becomes slower as the linear velocity decreases.

Conversely, if the cooling speed is so high as to render recrystallization almost negligible, when a long mark is recorded, an amorphous mark with a thicker rear end is formed as shown in FIG. 3(d), producing a distorted retrieve waveform as shown in FIG. 3(e). This is explained as follows. In the rear end of the long mark in particular, heat is accumulated by heat diffusion from the front part enlarging the melted area in the rear part and the shape of the melted area is transformed into the shape of an amorphous mark relatively precisely because the cooling speed is kept relatively high over the entire area.

When a plurality of off pulse sections are not distributed and properly used over the entire mark length, recrystallization becomes conspicuous somewhere in the mark, as shown in FIG. 3(b) and 3(d) though in different degrees, preventing a good formation of an amorphous long mark and causing distortions in the retrieve waveform.

Inserting the off pulse sections makes sharp the temperature change over time of the recording layer ranging from the front end to the rear end of the long mark, preventing degradation of the mark due to recrystallization during recording.

However, as the reference clock frequency T becomes shorter because of increased density and speed as described above, the rapid cooling becomes difficult to achieve even with the off pulse sections provided in a conventional manner, resulting in the front half of the mark being recrystallized.

For example, when a mark with a time length of 4T is to be recorded on a CD-RW, a phase change type rewritable compact disk, by the conventional n−k division scheme (k=1), the following pulses are radiated during the process of forming the amorphous mark:

$\alpha_1 T, \beta_1 T, \alpha_2 T, \beta_2 T, \alpha_3 T, \beta_3 T$

Here, the starting end of the mark is melted by the application of the recording pulse $\alpha_1 T$ and then heat produced by the application of the subsequent recording pulses $\alpha_2 T$, $\alpha_3 T$ conducts toward the front part of the mark. FIG. 4 is a schematic temperature history of the mark starting end, with FIG. 4(a) representing a case in which the linear velocity is low and FIG. 4(b) a case in which the linear velocity is high. In either case, three temperature rising processes due to $\alpha_1 T$, $\alpha_2 T$, $\alpha_3 T$ and three cooling processes due to $\beta_1 T$, $\beta_2 T$, $\beta_3 T$ are observed.

In the case of low linear velocity, as shown in FIG. 4(a), there are sufficient cooling times at $\beta_1 T$, $\beta_2 T$, during each of which the temperature of the cooling layer can fall below the crystallization temperature. In the case of high linear velocity, however, because the reference clock period T decreases in inverse proportion to the linear velocity, the recording layer melted by the $\alpha_1 T$ is heated by the next $\alpha_2 T$ and further by $\alpha_3 T$ without cooling below the crystallization temperature range, as shown in FIG. 4(b). The time during which the recording layer stays in the crystallization temperature range is much longer for $T_4+T_5+T_6$ of the high linear velocity than for $T_1+T_2+T_3$ of the low linear velocity, so it is understood that the recrystallization is more likely to take place at the fast linear velocity. In an alloy with a composition close to a SbTe eutectic composition and used as a phase change recording layer, a crystal is likely to grow at the amorphous/crystal boundary and therefore recrystallization easily occurs outer area of the mark. Here, the low speed refers to less than about ×10-speed (T=less than 23.1 nanoseconds) and the high speed refers to about ×10-speed or more.

As described above, in the phase change medium, as the reference clock period T becomes short due to an increased density and speed, recrystallization is likely to occur with the conventional pulse division scheme, giving rise to a serious problem that a required degree of modulation fails to be generated at the central part of the long mark.

In the phase change medium in which an amorphous mark is recorded over a crystal area, although it is generally easy at high linear velocity to secure an enough cooling speed to form an amorphous solid, the crystallization time is difficult to secure. Hence, the phase change medium often employs a recording layer of a composition which tends to be easily crystallized, i.e., a recording layer of an easily recrystallizable composition. Therefore, it is important to increase the off pulse section to enhance the cooling effect, but during the high linear velocity the off pulse section becomes short to the contrary.

The similar problem is also encountered when the wavelength of a laser source is reduced or a numerical aperture is increased to reduce a beam diameter for enhancing the density of the phase change medium. For example, when a laser with a wavelength of 780 nm and a numerical aperture of NA=0.50 is changed to a laser with a wavelength of 400 nm and a numerical aperture of 0.65, the beam diameter is throttled to almost one-half. At this time, the energy distribution in the beam becomes steep so that the heated portion is easily cooled, allowing an amorphous mark to be formed easily. This however makes the recording layer more difficult to crystallize. In this case, too, it is necessary to increase the cooling effect.

The present invention has been accomplished to solve the aforementioned problems. It is an object of the invention to provide an optical recording method and an optical recording medium suited for the method, which can perform recording in a satisfactory manner even during a mark length recording using a short clock period suited for high density recording and high speed recording.

DISCLOSURE OF THE INVENTION

The inventors of this invention have found that the above objective can be realized by reducing the number of divisions m in the pulse division scheme from the conventional division number.

Viewed from one aspect the present invention provides an optical recording method for recording mark length-modulated information with a plurality of recording mark lengths by radiating light against a recording medium, the optical recording method comprising the steps of:

when a time length of one recording mark is denoted nT (T is a reference clock period equal to or less than 25 ns, and n is a natural number equal to or more than 2), dividing the time length of the recording mark nT into $\eta_1 T, \alpha_1 T, \beta_1 T, \alpha_2 T, \beta_2 T, \ldots, \alpha_i T, \beta_i T, \ldots, \alpha_m T \beta_m T, \eta_2 T$ in that order (m is a pulse division number; $\Sigma_i(\alpha_i+\beta_i)+\eta_1+\eta_2=n$; $\alpha_i$ ($1 \leq i \leq m$) is a real number larger than 0; $\beta_i$ ($1 \leq i \leq m-1$) is a real number larger than 0; $\beta_m$ is a real number larger than or equal to 0; and $\eta_1$ and $\eta_2$ are real numbers between −2 and 2); and radiating recording light with a recording power $Pw_i$ in a time duration of $\alpha_i T$ ($1 \leq i \leq m$), and radiating recording light with a bias power $Pb_i$ in a time duration of $\beta_i T$ ($1 \leq i \leq m-1$), the bias power being $Pb_i < Pw_i$ and $Pb_i < Pw_{i+1}$;

wherein the pulse division number m is 2 or more for the time duration of at least one recording mark and meets $n/m \geq 1.25$ for the time length of all the recording marks Viewed from another aspect, the present invention provides a phase change type optical recording medium recorded by the optical recording method, the phase change type optical recording medium having a recording layer made of $M_z Ge_y (Sb_x Te_{1-x})_{1-y-z}$ alloy (where $0 \leq z \leq 0.1$, $0 < y \leq 0.3$, $0.8 \leq x$; and M is at least one of In, Ga, Si, Sn, Pb, Pd, Pt, Zn, Au, Ag, Zr, Hf, V, Nb, Ta, Cr, Co, Mo, Mn, Bi, O, N and S).

BRIEF DESCRIPTION OF THE DRAWINGS

FIG. 11 is an example of conventional division scheme of a recording pulse for a 11T mark/11T space.

FIG. 13 is an explanatory diagram showing a timing for generating a gate in the pulse division scheme of FIG. 12.

FIG. 14 is an explanatory diagram showing a pulse division scheme in (1) of embodiment 3.

FIG. 20 is an explanatory diagram showing a pulse division scheme in (3) of embodiment 3.

FIG. 22 is an explanatory diagram showing a pulse division scheme in (4) of embodiment 3.

FIG. 26 is an explanatory diagram showing an example of a pulse division scheme according to embodiment 4 of the invention.

FIG. 28 is an explanatory diagram showing another example of a pulse division scheme according to embodiment 4.

PREFERRED EMBODIMENTS OF THE INVENTION

Figure 1:
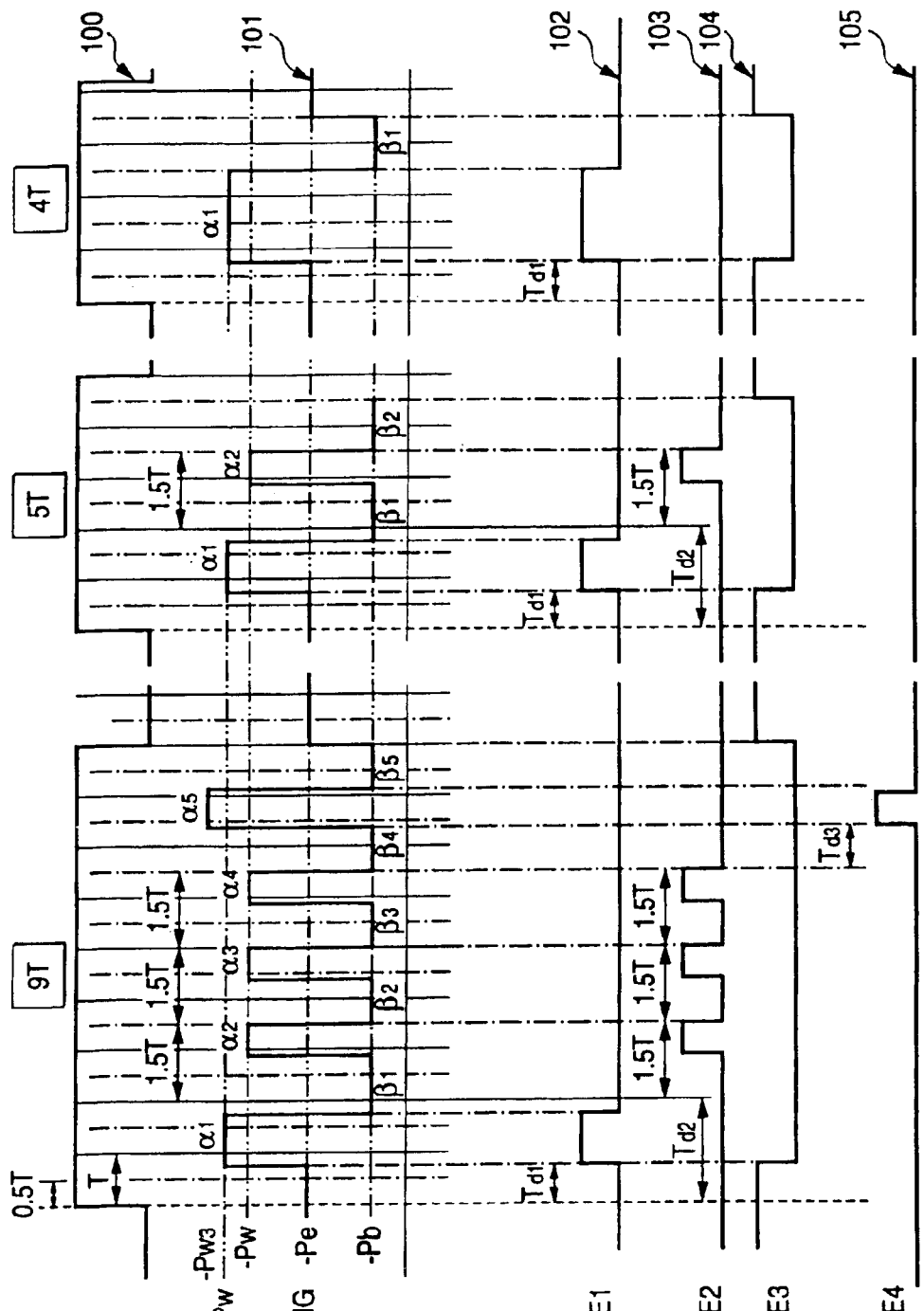
FIG. 1 is an explanatory diagram showing an example recording pulse division scheme and an example method of generating the recording pulses according to the invention.

Now, the present invention will be described in detail by referring to the accompanying drawings.

The optical recording method of this invention reduces the number of divisions in the pulse division scheme, i.e., elongates each pulse of recording light to make the time during which to heat a light-irradiated portion of the optical recording medium sufficiently long with respect to the response speed of the laser pulse and also sets the time during which to cool the light-irradiated portion sufficiently long. This enables satisfactory mark length recording even with a clock period as low as 25 nm or less.

In more concrete terms, suppose the time length of a recording mark is nT (T is a reference clock period equal to or less than 25 ns; and n is a natural number equal to or more than 2). The time length nT of the recording mark is divided in the following order:

$\eta_1 T, \alpha_1 T, \beta_1 T, \alpha_2 T, \beta_2 T, \ldots, \alpha_i T, \beta_i T, \ldots, \alpha_m T, \beta_m T, \eta_2 T$ (m is a number of pulse divisions; $\Sigma_i(\alpha_i+\beta_i)+\eta_1+\eta_2=n$; $\alpha_i$ ($1\leq i\leq m$) is a real number larger than 0, $\beta_i$ ($1\leq i\leq m-1$) is a real number larger than 0, and $\beta_m$ is a real number equal to or larger than 0; and $\eta_1$ and $\eta_2$ are real numbers equal to or larger than −2, preferably 0, and equal to or smaller than 2, preferably 1). In the time length of $\alpha_i T$ ($1\leq i\leq m$), recording light with a recording power $Pw_i$ is radiated; and in the time length of $\beta_i T$ ($1\leq i\leq m$), recording light with a bias power $Pb_i$, which has the relation of $Pb_i<Pw_i$ and $Pb_i<Pw_{1+1}$, is radiated. As for the time length of at least one recording mark, the above pulse division number m is set to 2 or more; and as for the time length of all recording marks, $n/m \geq 1.25$.

That is, while the conventional n−k division scheme sets the pulse division number m equal to n−k (k is 1 or 2), this invention defines the pulse division number m from a different perspective.

In this invention, as to the time length of at least one recording mark the above pulse division number m is set to 2 or more. It should be noted, however, that there is no need to perform the pulse division for all nT marks (marks with a time length of nT; T is a reference clock period; and n is a natural number equal to or larger than 2). In short marks such as 2T, 3T and 4T, the problem of heat accumulation is relatively small but the response speed of the pulse being unable to follow the pulse division poses a more serious problem. It is therefore preferred that only one pulse of recording light with a recording power of Pw be radiated or that one pulse of recording light with the recording power of Pw and one pulse of recording light with a bias power of Pb be radiated.

In this invention, as to the time lengths of all recording marks, it is assumed that $n/m \geq 1.25$.

Suppose that $\eta_1$, and $\eta_2$ are both 0. Then because $\Sigma_i(\alpha_i+\beta_i)/m=n/m$, the value of n/m corresponds to an average length of $(\alpha_i+\beta_i)$ and the value of (n/m)T corresponds to an average period of the divided pulse.

In the conventional n−k division scheme, m=n−k and k is fixed to 1 or 2, so that n/m=n/(n−1) or n/m=n/(n−2). This value decreases as n increases. Thus, if we let the longest mark time length be $n_{max}T$, then n/m becomes minimum for $n_{max}$. That is, because the average period of the divided pulses is longest for the shortest mark and shortest for the longest mark, $\alpha_i T$ and $\beta_i T$ are shortest for the longest mark.

For example, in the EFM modulation, n=3–11 and k=2, so $(n_{max}/m)=11/(11−2)=$ about 1.22

Similarly, in the EFM+ modulation, n=3–14 and k=2, so $(n_{max}/m)=14/(14−2)=$ about 1.16

In the (1, 7)-RLL-NRZI modulation, n=2–8 and k=1, so $(n_{max}/m)=8/(8−1)=$ about 1.14

As can be seen from the above, in the conventional scheme the values of n/m are approximately 1.22, 1.16 and 1.14. When the reference clock period T becomes shorter than about 25 nanoseconds, the average period of the divided pulses in the longest mark is generally less than 25 nanoseconds and the average value of the recording pulse section $\alpha_i T$ or the average value of the off pulse section $\beta_i T$ is less than 12.5 nanoseconds. This means that for at least one i, either $\alpha_i T$ or $\beta_i T$ is less than 12.5 nanoseconds. Further, when the clock period T goes below approximately 20 seconds, either $\alpha_i T$ or $\beta_i T$ becomes further smaller.

In the above explanation, if a particular $\alpha_i$ or $\beta_i$ becomes longer than the average, this means that other $\alpha_i T$ or $\beta_i T$ becomes shorter and the fact still remains that either $\alpha_i T$ or $\beta_i T$ becomes smaller.

To describe more accurately, in the n−k division scheme $\Sigma_i(\alpha_i+\beta_i)$ is not necessarily equal to n and may be equal to n−η (η=0 to 2). In this case, the average value of $\alpha_1$ and $\beta_i$ becomes further smaller, making the problem more serious.

In the optical recording method of this invention, m is set to satisfy the condition of n/m≧1.25 as to the time length of all recording marks ranging from short to long marks. As a result, the lengths of $\alpha_i T$ and $\beta_i T$ are made sufficiently long. For example, the recording pulse section $\alpha_i T$ and the off pulse section $\beta_i T$ can generally be set slightly longer than 0.5T to sufficiently heat the recording layer and at the same time limit the heat being supplied from the subsequent pulses and thereby produce a sufficient cooling effect.

When a mark is long in particular, the shape of a mark is easily deformed by the accumulated heat. Hence, for marks 7T or longer in time length, n/m should preferably be set to 1.5 or more. It is of course preferred that, also for short marks 6T or shorter, n/m be set to 1.5 or more, more preferably to 1.8 or more.

It is noted, however, that because too large a value of n/m increases the heat accumulation, normally n/m is preferably set to 4 or less, more preferably 3 or less.

The optical recording method of this invention produces a greater effect as the reference clock period T decreases, and it is preferred that the reference clock period be set to 20 nm or less or more preferably 15 ns or less. A very short clock period is difficult to achieve in practice and it is normally preferred that the clock period have 0.1 ns or more, or preferably 1 ns or more, or more preferably 3 ns or more. As the clock period T decreases, it is desired that the minimum value of n/m be increased.

The recording mark in this invention is recognized as a physical mark formed continuously in a recording medium and optically distinguishable from other portions. That is, the invention does not join, through processing by a reproducing system, 2T, 3T and 4T marks of the conventional n−k division scheme that meet the condition of n/m≧1.25 and recognize them as a single long mark. In this invention, however, the recording mark may be formed of a plurality of physical marks that are below the optical resolution power of the retrieveing light. If we let the numerical aperture of an objective for focusing the retrieveing light be NA and the wavelength of the retrieveing light be λ, when the physical marks are spaced from each other by 0.2 (λ/NA) or more, these physical marks can be optically distinguishable as separate marks. Hence, when forming a recording mark using a plurality of physical marks, they should preferably be spaced within 0.2 (λ/NA) of each other.

In this invention, the parameters associated with the divided pulses such as $\alpha_i$, $\beta_i$, $\eta_1$, $\eta_2$, Pw and Pb can be changed as required according to the mark length and i.

Further, in this invention it is preferred that the average value of the recording pulse section $\alpha_i T$ (1≦i≦m) and the average value of the off pulse section $\beta_i T$ (1≦i≦m−1) both be set to 3 nanoseconds or more, preferably 5 nanoseconds or more, or more preferably 10 nanoseconds or more in terms of securing the response capability of the radiated light. More preferably, individual $\alpha_i T$ (1≦i≦m) and $\beta_i T$ (1≦i≦m−1) are set to 3 nanoseconds or more, or 5 nanoseconds or more, or more specifically 10 nanoseconds or more. The rise time and fall time of the power of the laser beam normally used during the process of recording should preferably be set 50% or less of the minimum $\alpha_i T$ (1≦i≦m) and $\beta_i T$ (1≦i≦m).

In this invention, although it is possible to set $\beta_m$ to 0 not to radiate light during the last off pulse section of $\beta_m T$, if the heat accumulation problem at the end of the mark is grave, $\beta_m T$ should preferably be provided. In that case, it is preferred that $\beta_m T$ be set normally to 3 nanoseconds or more, or specifically to 5 nanoseconds or more, or more preferably to 10 nanoseconds or more.

When the recording pulse section $\alpha_i T$ (1≦i≦m) is three nanoseconds or more, especially 5 nanoseconds or more, the radiation energy required for recording can be secured by increasing the recording power $Pw_i$ although there is a problem of the rising/falling edge of the recording light.

On the other hand, when the off pulse section $\beta_i T$ (1≦i≦m−1), too, is 3 nanoseconds or more, especially 5 nanoseconds or more, the cooling effect can be secured by reducing the bias power Pb down to nearly the retrieveing light power Pr or to 0 as long as this is not detrimental to a tracking servo or others.

To obtain a still greater cooling effect, it is desired that $\Sigma_i(\alpha_i)$ associated with the time length of all recording marks be set to 0.6 n or less, particularly 0.5 n or less. More preferably, $\Sigma_i(\alpha_i)$ is set to 0.4 n or less. That is, the sum of the recording pulse sections $\Sigma_i(\alpha_i T)$ is set shorter than $\Sigma_i(\beta_i T)$ so that the off pulse section in each mark is longer. It is particularly preferred that, for all i of i=2 to m−1, $\alpha_i T \geq \beta_i T$, i.e., in the recording pulse train following at least a second pulse, $\beta_i T$ is made longer.

In the recording method of this invention, the values of $\alpha_1$ (1≦i≦m) and $\beta_i$ (1≦i≦m−1) are set appropriately according to the values of the recording pulse section $\alpha_i T$ (1≦i≦m) and the off pulse section $\beta_i T$ (1≦i≦m−1) and are normally set to 0.01 or more, preferably 0.05 or more, and normally 5 or less, preferably 3 or less. Too small a value of $\beta_i$ (1≦i≦m−1) may result in an insufficient cooling effect and hence it is preferably set to 0.5 or more, specifically 1 or more. On the other hand, too large a value of $\beta_i$ may cause an excessive cooling and result in the recording mark being optically separated. Hence it is preferably set to 2.5 or less, specifically 2 or less. The effect of this setting is particularly large in the first off pulse section $\beta_i T$ that has a great effect on the shape of the front end of the mark.

What has been described above can also be said of the last off pulse section $\beta_m T$ that has a great effect on the shape of the rear end of the mark. Hence, $\beta_m$ is normally set to 0.1 or more, preferably 0.5 or more, more preferably 1 or more, and 2.5 or less, preferably 2 or less. The switching period of intermediate pulse sections (group) $\alpha_i T$ (2≦i≦m−1) between the start pulse section $\alpha_1 T$ and the last pulse section $\alpha_m T$ should preferably be set constant in terms of simplifying the circuit. In more concrete terms, $(\alpha_i + \beta_i)T$ (2≦i≦m−1) or $(\alpha_i + \beta_i)T$ (2≦i≦m−1) is preferably set to 1.5T, 2T or 2.5T.

In this invention, the recording light power $Pb_i$ radiated during the off pulse section $\beta_i T$ (1≦i≦m−1) is set smaller than the powers $Pw_i$ and $Pw_{i-1}$ of the recording light radiated during the recording pulse sections $\alpha_i T$ and $\alpha_{i+1} T$. To obtain a large cooling effect, it is preferred that $Pb_i < Pw_i$ be set for the time lengths of all recording marks. More preferably $Pb_i / Pw. \leq 0.5$ and still more preferably $Pb_i / Pw_i \leq 0.2$. The bias power Pb can be set equal to the power Pr of the light radiated during retrieving. This simplifies the setting of the divided pulse circuit required for the pulse division.

For the time length of one particular recording mark, two or more different values of $Pb_i$ and or $Pw_i$ may be used according to i. Particularly, setting the recording powers $Pw_1$ and $Pw_m$ used in the start recording pulse section $\alpha_1 T$ and the last recording pulse section $\alpha_m T$ to values different from the recording power $Pw_i$ used in the intermediate recording pulse sections $\alpha_i T$ (2≦i≦m−1) can control the shape of the front and rear ends of the mark accurately. It is preferred that the recording powers $Pw_i$ in the intermediate recording pulse sections $\alpha_i T$ ($2 \leq i \leq m-1$) be set equal as practically as possible as this simplifies the setting of the divided pulse circuit. Similarly, it is preferred that the bias powers $Pb_i$ in the off pulse sections $\beta_i T$ ($1 \leq i \leq m-1$) be all set to the same value as practically as possible unless there is any justifiable reason. At least two recording marks with different n's may have different values of $Pw_i$ and/or $Pb_i$ for the same i.

In this invention, although there are no limiting specifications as to what power of light shall be radiated onto the spaces where no recording marks are formed, the light to be radiated should preferably have a power Pe, which is $Pb_i \leq Pe < Pw_i$. In the rewritable recording medium, the power Pe is an erase power used to erase the recorded marks. In this case, it is preferred that during a $(n-(\eta_1+\eta_2))T$ section, light with a power equal to or higher than the bias power $Pb_i$ and equal to or lower than the erase power Pe be radiated. Setting the light power equal to the bias power $Pb_i$ or the erase power Pe facilitates the setting of the divided pulse circuit. When light with the bias power Pb is radiated during an $\eta_1 T$ section, the light with the bias power Pb is radiated prior to the start recording pulse section $\alpha_1 T$, thus minimizing the influences of heat from the preceding recording mark.

The recording power Pw and bias power Pb or erase power Pe have different physical functions depending on the type of the optical recording medium used.

In the case of the magnetooptical medium, for example, Pw or Pe is a power necessary to raise the temperature of the recording layer at least above the vicinity of the Curie temperature to make the occurrence of the magnetization inversion easy. In the so-called optical modulation overwritable magnetooptical medium, Pw is greater than Pe and is a power to raise the temperatures of a plurality of magnetic layers with different Curie points above one of the Curie point temperatures.

In the case of the phase change medium, when performing the recording through crystallization, Pw is a power to raise the recording layer to a temperature higher than the crystallization temperature. Or when performing the recording through transformation into amorphous state, Pw is a power to raise the recording layer at least to a temperature higher than its melting point. When performing overwriting through amorphisation recording and crystallization erasing, Pe is a power to raise the recording layer at least above the crystallization temperature.

In the write-once medium that performs recording through pitting or deformation of a metallic or organic recording layer, Pw is a power necessary to raise the recording layer to a temperature that induces softening, melting, evaporation, decomposition or chemical reaction.

Although the values of the recording power Pw and bias power Pb differ from one kind of recording medium used to another, in the rewritable phase change medium for example the recording power Pw is normally about 1–100 mW and the bias power Pb about 0.01–10 mW.

Whichever medium is used, the recording power Pw is a laser beam power necessary to raise the recording layer to a temperature that induces some optical changes in the recording layer, or to hold that temperature. The bias power Pb on the other hand is a power at least lower than the recording power Pw. Normally, the bias power Pb is lower than the recording power Pw and the erase power Pe and does not induce any physical changes in the recording layer.

The heat accumulation problem described above is common to a wide range of optical disks that perform the mark length modulation recording, such as phase change type, magnetooptical type and write-once type optical recording media.

In the overwritable phase change medium among others, because the mark recording and mark erasing are performed at the same time by precisely controlling two temperature parameters, the heating speed and cooling speed of the recording layer, the function of cooling the recording layer by the off pulses bears more importance than in other write-once medium and magnetooptical medium. Hence, this invention is particularly effective for the phase change type recording medium.

In the recording method using the pulse division of this invention, the same pulse division number m may be used on at least two recording marks which have different n's of time lengths nT of the pulse recording marks. Normally, the same m values are used for the nT marks having adjoining time lengths, such as 3T mark and 4T mark. With m values set equal, at least one of $\alpha_1$ ($1 \leq i \leq m$), $\beta_i$ ($1 \leq i \leq m$), $\eta_1$, $\eta_2$, $Pw_i$ ($1 \leq i \leq m$) and $Pb_i$ ($1 \leq i \leq m$) is made to differ from others. This makes it possible to differentiate the time lengths of the marks from one another that have the same division numbers.

The division numbers m may be arranged irrelevant to the magnitudes of the n values but it is preferred that the division numbers m be set to monotonously increase as the mark becomes longer, i.e., the value of m increases (including the case of staying the same).

Examples of pulse division scheme according to this invention are shown below.

EXAMPLE 1 OF DIVISION SCHEME

For example, in the EFM modulation that forms 3T to 11T marks, m=1 for n=3 and m is increased for n≧4 (4, 5, 6, 7, 8, 9, 10, 11). That is, the division number m is increased to m=1, 2, 2, 3, 4, 5, 6, 7, 8 as the n value increases to n=3, 4, 5, 6, 7, 8, 9, 10, 11.

The value of n/m is minimum at 1.38 when n=11 and maximum at 3 when n=3.

EXAMPLE 2 OF DIVISION SCHEME

In the same EFM modulation, the division number m is increased to m=1, 2, 2, 3, 4, 5, 6, 6, 6 as the n value increases to n=3, 4, 5, 6, 7, 8, 9, 10, 11.

The value of n/m is minimum at 1.5 when n=9 and maximum at 3 when n=3.

EXAMPLE 3 OF DIVISION SCHEME

In the same EFM modulation, the division number m is increased to m=1, 2, 2, 3, 3, 4, 5, 5, 5 as the n value increases to n=3, 4, 5, 6, 7, 8, 9, 10, 11.

The value of n/m is minimum at 1.8 when n=9 and maximum at 3 when n=3.

When the same pulse division number m is used on at least two recording marks with different n values, a pulse period $\tau_i=\alpha_i+\beta_i$ and a duty ratio ($\alpha_i/(\alpha_i+\beta_i)$) may be changed. Examples of this procedure are shown below.

EXAMPLE 4 OF DIVISION SCHEME

The simplest division scheme is to make an equal division such that the pulse period $\tau_i$=nT/m when m≧2.

However, simply dividing nT into equal parts may result in $\tau_i$ assuming a value totally irrelevant to the timing and length of the reference clock period T.

EXAMPLE 5 OF DIVISION SCHEME

The pulse period $\tau_i$ is preferably synchronized to the reference clock period T or to the reference clock period T divided by an integer (preferably ½T, ¼T, ⅕T, ⅒T) as this allows the rising/falling edge of the pulse to be controlled with one base clock taken as a reference. At this time, $\Sigma_i(\tau_i)=\Sigma_i(\alpha_i+\beta_i)$ does not necessarily agree with n and an excess time is produced, so that the pulse length must be corrected. It is preferred that the sum of the pulse irradiation times be set smaller than n because setting the sum greater than n makes the mark length too long.

Hence, sections $\eta_1 T$, $\eta_2 T$ are provided such that $\Sigma_i(\alpha_i+\beta_i)+(\eta_1+\eta_2)=n$ ($\eta_1$ and $\eta_2$ are each real numbers such that $0\leq\eta_1$ and $0\leq\eta_2$), and these sections are changed in each of two recording marks that have the same division numbers m but different lengths. During the sections $\eta_1 T$, $\eta_2 T$ light with the bias power Pb may be radiated. At this time, it is preferred that $0\leq(\eta_1+\eta_2)\leq 1$.

The above $\eta_1$ and $\eta_2$ can also be used to correct the effect of heat transferred from other preceding and/or subsequent marks. In this case, the time lengths of $\eta_1 T$ and $\eta_2 T$ are made variable according to the mark lengths and/or space lengths of the preceding and/or subsequent marks.

It is possible to use only the first $\eta_1 T$ or last $\eta_2 T$ of the divided pulses and set the other to 0, or to use both of them in the range of $0\leq(\eta_1+\eta_2)\leq 1$. It is also possible to radiate light having other than the bias power Pb during the sections $\eta_1 T$, $\eta_2 T$ to align the mark lengths or to more precisely control the influence of heat transferred from the preceding and/or subsequent marks.

EXAMPLE 6 OF DIVISION SCHEME

The divided pulse period $\tau_i$ and the duty ratio ($\alpha_1/(\alpha_i+\beta_i)$) are made variable according to i. With this method, jitters (fluctuations) in the front and rear ends of the mark, which are important in the mark length recording, can be improved.

More specifically, the first recording pulse period $\tau_1$ and/or the last recording pulse period $\tau_m$ are made to differ from a recording pulse period $\tau_i$ ($2\leq i\leq m-1$) of intermediate pulses.

At this time it is possible to slightly adjust $\tau_1$, $\alpha_1$, $\beta_1$, $\tau_m$, $\alpha_m$ and $\beta_m$ of the first and/or last pulse according to the preceding and/or subsequent mark length or space length.

It is preferred that the first recording pulse section $\alpha_1 T$ be set larger than any of the subsequent recording pulse sections $\alpha_2 T, \ldots, \alpha_m T$. It is also preferred that the recording power $Pw_1$ be set higher than the recording power $Pw_i$ in the succeeding recording pulse sections $\alpha_2 T, \ldots, \alpha_m T$. These methods are effective in improving an asymmetry value of the retrieve signal described later.

The heat accumulation effect is small in short marks such as those with time lengths of 3T and 4T, so that the mark tends to be formed slightly shorter than required. In such a case, the mark time length may be strictly controlled by elongating the recording pulse section $\alpha_1 T$ to some extent or setting the recording power $Pw_1$ in the recording pulse section $\alpha_1 T$ slightly higher than required.

The method of changing the first pulse or last pulse is particularly effective when overwriting an amorphous mark in the crystal area of the phase change medium.

Changing the first recording pulse section $\alpha_1 T$ can control the width of an area of the recording layer in the phase change medium that first melts.

The last off pulse section $\beta_m T$ is important in preventing the recording layer of the phase change medium from getting recrystallized and is also an important pulse that determines the area in which the recording layer is made amorphous.

When an amorphous mark is formed, an area in the rear end part of the mark that has melted crystallizes again, making the actually formed amorphous mark smaller than the melted area. Elongating the off pulse section, i.e., extending the cooling time length, can prevent recrystallization and elongates the amorphous portion. Hence, by changing the length of the last off pulse section $\beta_m T$ it is possible to change the time during which the rear end portion of the mark is kept in the crystallization time and thereby change the mark length in significant degrees.

Conversely, by changing the intermediate parameters $\tau_i$, $\alpha_i$, $\beta_i$ ($2\leq i\leq m-1$) without changing $\tau_1$, $\alpha_1$, $\beta_1$, $\tau_m$, $\alpha_m$ and $\beta_m$, the degree of modulation can be controlled without affecting the mark edges.

Now, the method of generating divided recording pulses that realizes the above-described division scheme will be explained below.

The above pulse division can basically be realized by making the division scheme for each mark time length nT programmable and incorporating it into a ROM chip. However, adding a very wide range of flexibility to the same pulse generating circuit will render the circuit complex. So, the following two pulse generating methods may preferably be used. They can provide pulses capable of dealing with almost all media with ease.

Divided Recording Pulse Generating Method 1

For the mark length modulated data 100, which is EFM-modulated as shown in FIG. 1(a), a division scheme 101 shown in FIG. 1(b) is applied. That is, the division is made as follows:

m=1, 1, 2, 3, 3, 4, 5, 5, 5 for n=3, 4, 5, 6, 7, 8, 9, 10, 11.

At this time, the circuits Gate1, Gate2, Gate3, Gate4 that generate clocks at timings shown in FIG. 1(c) are combined to realize the division scheme of FIG. 1(b).

In FIG. 1(c), the Gate1 denoted 102 generates the first recording pulse $\alpha_1 T$ with a delay time of $T_{d1}$. The Gate2 denoted 103 generates a group of second and subsequent intermediate recording pulses $\alpha_i T$ with a delay time of $T_{d2}$. The Gate3 denoted 104 generates pulses with a bias power Pb and pulses with power Pe. That is, when recording pulses are not generated by the Gate1, Gate2 and Gate4, off pulses $\beta_i T$ with a bias power Pb are retrieved when the level is low and pulses with a power Pe are retrieved when the level is high. The Gate3 and $T_{d1}$ determine (n−($\eta_1+\eta_2$))T. The Gate4 denoted 105 generates a last recording pulse $\alpha_m T$ with a delay time of $T_{d3}$ after the intermediate recording pulse group $\alpha_i T$ has been generated. In the sections in which the Gate3 is at low level, when the recording pulses are at high level, they have priority over the off pulses.

$\beta_1 T$ can be controlled independently by the delay time $T_{d2}$ and $\alpha_1 T$, and $\beta_m T$ can be controlled independently by Gate3 and $\alpha_m T$.

In the section where the $\alpha_1 T$ pulse is generated by the Gate1, a recording power $Pw_1$ is used; in the sections where the intermediate pulse group $\alpha_i T$ is generated by the Gate2, a recording power $Pw_2$ is used; and in the section where the $\alpha_m T$ pulse is generated by the Gate4, a recording power $Pw_3$ is used. This arrangement allows the recording power to be controlled independently in each of the first pulse section, the intermediate pulse section group and the last pulse section.

To independently control the recording pulse width and the recording power in the first and last sections, the period of the intermediate pulses is defined by $\gamma_i = \alpha_i + \beta_{i-1}$ ($2 \leq i \leq m-1$) with $T_{d2}$ as a start point, and $\gamma_i$ is set almost constant at $\gamma_i = 1$ to 3. In this case, $\beta_i$ is automatically determined. In FIG. 1, $\gamma_i = 1.5$. It is noted, however, that $T_{d2}$ is defined so as to make a correction of $(T_{d2} - (T_{d1} + \alpha_1 T))$ for $\beta_1$ and thus $\beta_1$ can be handled as an independent parameter.

In either case, it is assumed that the Gate timing is synchronized with the reference clock period T or with a base clock, which is the reference clock period divided by an integer, and that $\alpha_i$ and $\beta_i$ are defined by the duty ratio with respect to the base clock.

If n is smaller than a predetermined value $n_c$, then m=1 and the intermediate pulse group are not generated by the Gate2. If n is equal to or larger than $n_c$, a predetermined number of pulses are retrieved according to the above (division scheme example 3). In FIG. 1, $n_c$ is set to 5 and when n is equal to or smaller than 4, then m=1; and when n is 5 or more, the intermediate pulses are generated. Here, it is assumed that the intermediate pulses are generated, according to n, in numbers equal to the division number stored in the ROM memory.

The last pulse $\alpha_m T$ generated by the Gate4 is generated only when $n \geq n_c + 1$. This is indicated by a 9T mark in FIG. 1.

When $n = n_c$, the pulse is divided into two pulses, the first pulse and one intermediate pulse. In FIG. 1 this is represented by a 5T mark.

When a plurality of marks with different time lengths are each divided into the same number of divisions, if a 3T mark and a 4T mark in FIG. 1 for example are both recorded by a pair of recording pulse and an off pulse, at least $\alpha_1$, $\beta_1$, $\eta_1$ and $\eta_2$ and, if further required, $Pw_1$ and $Pw_3$ need to be differentiated between the 3T mark and the 4T mark.

Divided Recording Pulse Generating Method 2

The following description concerns a divided recording pulse generating method based on a clock signal with a period of 2T which is obtained by dividing the reference clock period T. This method has more limitations than the divided recording pulse generating method 1 but has an advantage of allowing for the design of logic circuits based on more regular rules.

The pulse generating method 2 is characterized in that the procedure depends on whether the value that n of an nT mark can take is odd or even.

That is, for the recording of a mark in which n is even, i.e., the mark length is nT=2LT (L is an integer equal to 2 or more), the mark is divided into the number of sections m=L and the $\alpha_i$ and $\beta_i$ in the recording pulse sections $\alpha_i T$ and the off pulse sections $\beta_i T$ are defined as follows.

$$\alpha_1 + \beta_1 = 2 + \delta_1$$

$$\alpha_1 + \beta_i = 2 \ (2 \leq i \leq m-1)$$

$$\alpha_m + \beta_m = 2 + \delta_2$$

(where $\delta_1$ and $\delta_2$ are real numbers that satisfy $-0.5 \leq \delta_1 \leq 0.5$ and $-1 \leq \delta_2 \leq 1$; and when L=2, it is assumed that only $\alpha_1$, $\beta_1$, $\alpha_m$ and $\beta_m$ exist).

For the recording of a mark in which n is odd, i.e., the mark length is nT=(2L+1)T, on the other hand, the mark is divided into the number of sections m=L and the $\alpha_i'$ and $\beta_i'$ in the recording pulse sections $\alpha_i' T$ and the off pulse sections $\beta_i' T$ are defined as follows.

$$\alpha_1' + \beta_1' = 2.5 + \delta_1'$$

$$\alpha_i' + \beta_i' = 2 \ (2 \leq i \leq m-1)$$

$$\alpha_m' + \beta_m' = 2.5 + \delta_2'.$$

(where $\delta_1'$ and $\delta_2'$ are real numbers that satisfy $-0.5 < \delta_1' \leq 0.5$ and $-1 \leq \delta_2' \leq 1$; and when L=2, it is assumed that only $\alpha_1'$, $\beta_1'$, $\alpha_m'$ and $\beta_m'$ exist).

Further, in the pulse generating method 2, the following equation is satisfied.

$$\alpha_1 + \beta_1 + \alpha_m + \beta_m \Delta = \alpha_1' + \beta_1' + \alpha_m' + \beta_m'$$

(where $\Delta = 0.8$ to 1.2).

In the above pulse generating method 2, $\alpha_1$, $\beta_1$, $_1'$, $\beta_1'$, $\delta_1$, $\delta_2$, $\delta_1'$, and $\delta_2'$ may change according to the value of L. In the pulse generating method 2, in the process of forming recording marks with n=2L and n=(2L+1), they are both divided into the same division number L of recording pulses. That is, when n is 2, 3, 4, 5, 6, 7, 8, 9, . . . , in that order, then the division number m is set to 1, 1, 2, 2, 3, 3, 4, 4, . . . in that order. More specifically, in the EFM modulation signal, for n=3, 4, 5, 6, 7, 8, 9, 10, 11, the division number m is sequentially set to m 1, 2, 2, 3, 3, 4, 4, 5, 5 in that order. In the EFM+ signal, n=14 is added. In that case, the division number m is set to 7. In the (1, 7)-RLL-NRZI modulation there is a case of n=2, in which case the division number m is set to 1.

In the pulse generation method 2, two recording marks with the same division numbers m=L and different lengths have only the first pulse period $(\alpha_1 + \beta_1)T$ and the last pulse period $(\alpha_m + \beta_m)T$ differ from each other. That is, for $(\alpha_1 + \beta_1 + \alpha_m + \beta_m)$, $(\alpha_1' + \beta_1' + \alpha_m' + \beta_m')$ is increased by $\Delta$ ($\Delta = 0.8$ to 1.2). The $\Delta$ is normally 1 but can be changed in a range of about 0.8 to 1.2, considering the influence of heat interference from the preceding and subsequent recording marks.

$\delta_1$ and $\delta_2$, and $\delta_1'$ and $\delta_2'$ are adjusted to ensure that each mark length will be precisely nT and to reduce jitters at the ends of the mark. They are normally $-0.5 \leq \delta_1 \leq 0.5$, $-0.5 \leq \delta_1' \leq 0.5$, $-1 \leq \delta_2 \leq 1$ and $-1 \leq \delta_2' \leq 1$. The correction amounts at the front end and rear end are preferably set equal, i.e., $|\delta_2/\delta_1|$ and $|\delta_2'/\delta_1'|$ are each preferably in the range of 0.8 to 1.2.

The two recording marks with the same division numbers are preferably formed in such a manner that their mark length difference 1T is about 0.5T at the front end side and about 0.5T at the rear end side. That is, $$\alpha_1 + \beta_1 + \Delta_1 = \alpha_1' + \beta_1'$$

(where $\Delta_1 = 0.4$ to 0.6)
In this case, the rear end side is normally $$\alpha_m + \beta_m + \Delta_2 = \alpha_m' + \beta_m'$$

(where $\Delta_2 = 0.4$ to 0.6 and $\Delta_1 + \Delta_2 = \Delta$)

Setting $\delta_1$=about 0 and $\delta_1'$=about 0 is particularly preferred as this allows the use of a circuit that can generate divided pulses in synchronism with the front end of the mark. The position of the front end of the mark is determined almost by the rising edge of the recording power laser beam at $\alpha_1 T$ and its jitter is determined by the duty ratio of $\alpha_1$ and $\beta_1$ and by the duty ratio of $\alpha_1'$ and $\beta_1'$. Hence, in this method, setting $\delta_1=0$ and $\delta_1'=0.5$ can control the mark front end position and the jitter satisfactorily.

The mark rear end position depends on $\delta_2$ (and $\delta_2'$), i.e., the value of the divided pulse period $(\alpha_m+\beta_m)T$ (and $(\alpha_m'+\beta_m')T$) at the rear end of the mark and also on the value of the duty ratio of $\alpha_m$ and $\beta_m$ (and the duty ratio of $\alpha_m'$ and $\beta_m'$) Further, the mark rear end position also depends on the position of the falling edge of the recording pulse $\alpha_m T$ (and $\alpha_m'T$ at the rear end and on the cooling process of the recording layer before and after that falling edge position. In the phase change medium where amorphous marks are formed, in particular, the mark rear end position depends on the value of the off pulse section $\beta\alpha_m T$ (and $\beta_m'T$) at the rear end that has a great effect on the cooling speed of the recording layer. Hence, the divided pulse period $(\alpha_m+\beta_m)T$ at the rear end does not need to be 0.5T or 1T, and fine adjustment can be made with a resolution power of about 0.1T, preferably 0.05T, or more preferably 0.025T.

In the pulse generating method 2, the duty ratio between $\alpha_i$ and $\beta_i$, $\alpha_i/(\alpha_i+\beta_i)$, can be optimized for each mark length, but for simplification of the pulse generating circuit, it is preferred that the duty ratios in the intermediate pulses situated between the first pulse and the last pulse be set to a fixed value. That is, when $L\geq 3$ in which case intermediate pulses can exist, it is preferred that, for all i ranging from 2 to (m−1) in two recording marks with the same division numbers m=L, $\alpha_i$ and $\alpha_i'$ be set to $\alpha_i=\alpha c$ (fixed value) and $\alpha_i'=\alpha c'$ (fixed value). Further, when L is 3 or more, $\alpha c$ and $\alpha c'$ are preferably set to a fixed value, particularly $\alpha c=\alpha c'$, not dependent on the value of L because this further simplifies the circuit.

For the simplified pulse generating circuit in the pulse generating method 2, it is preferred that in the recording mark with n being even, $\alpha_1$ and $\beta_1$ assume fixed values for all L equal to 3 or more. For all L equal to 2 or more, it is preferred that $\alpha_1+\beta_1$ be set to 2 as this causes the period $(\alpha_i+\beta_i)T$ to become 2T for all i ranging from 1 to (m−1).

Similarly, for the simplified pulse generating circuit in the pulse generating method 2, it is preferred that in the recording mark with n being odd, $\alpha_1'$ and $\beta_1'$ assume fixed values for all L equal to 3 or more. For all L equal to 2 or more, it is preferred that $\alpha_1+\beta_1$ be set to 2.5 as this makes it easy to synchronize with the subsequent divided pulse period 2T.

Further, for the simplification of the pulse generating circuit in the pulse generating method 2, $\alpha_m$, $\beta_m$, $\alpha_m'$ and $\beta_m'$ each preferably assume the same values for all L equal to 3 or more, specifically 2 or more. Here, if $\Delta_2=(\alpha_m'+\beta_m')-(\alpha_m+\beta_m)=0.5$, the circuit can be further simplified.

When n is 2 or 3, the division number m is 1. In that case, the $\alpha_1-\beta_1$ duty ratio and $\delta_1$ (or the $\alpha_1'-\beta_1'$ duty ratio and $\delta_1'$) can be adjusted to achieve a desired mark length and jitter. Here, it is desired that $\delta_1'-\delta_1=1$.

In the pulse generating method 2, as described above, it is particularly desired that $\delta_1=\delta_1'=0$. In that case, the pulse generating circuit should preferably be controlled to ensure that $\alpha_i$ ($1\leq i\leq m$) is generated in synchronism with a frequency-divided first reference clock 3 with a period 2T which is produced by frequency-dividing a first reference clock 1 with a period T; that $\alpha_i'$ ($2\leq i\leq m$) is generated in synchronism with a frequency-divided second reference clock 4 with a period 2T which is obtained by frequency-dividing a second reference clock 2 that has the same period T as that of the first reference clock 1 and is shifted 0.5T from the first reference clock 1; and that $\alpha_1'$ rises 2.5T before $\alpha_2'$ rises. The use of a plurality of reference clocks can simplify the pulse generating circuit.

There is a case in which the rising edges of $\alpha_1$ and $\alpha_1'$ need to be delayed or advanced with respect to the rising or falling edge of a square wave modulated according to the mark length to be recorded. In such a case it is preferred that the same delay times $T_{d1}$ be added in order to make the lengths of spaces constant. $T_{d1}$ is a real number between −2 and 2. When the value of $T_{d1}$ is negative, it indicates a advance time.

Figure 12:
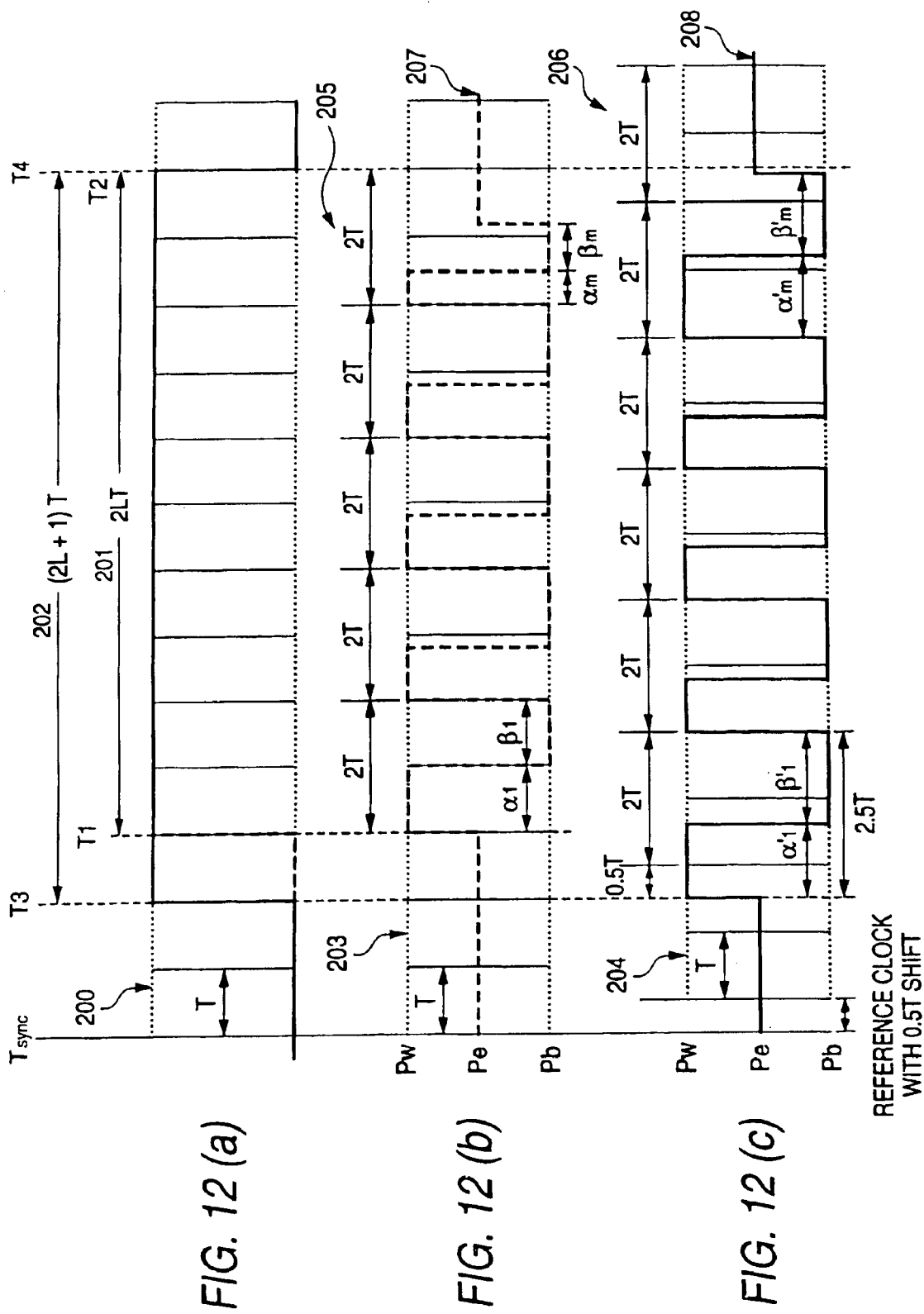
FIG. 12 is an explanatory diagram showing an example of a pulse division scheme according to the invention.

FIG. 12 shows an example relation between recording pulses when the pulse division scheme in the recording method of this invention is implemented by using a plurality of reference clocks described above. In FIG. 12, the delay times $T_{d1}$ of $\alpha_1 T$ and $\alpha_1'T$ with respect to the front end of the nT mark are 0; the recording power in the recording pulse section $\alpha_i T$ ($1\leq i\leq m$) is Pw which is constant; the bias power in the off pulse section $\beta_i T$ ($1\leq i\leq m$) is Pb which is constant; and the power of light radiated in the spaces and in other than $\alpha_i T$ ($1\leq i\leq m$) and $\beta_i T$ ($1\leq i\leq m$) is an erase power Pe which is constant. Here $Pb\leq Pe\leq Pw$.

In FIG. 12, reference number 200 denotes a reference clock with a period T.

FIG. 12(a) shows a pulse waveform corresponding to a recording mark with a length of nT, with reference number 201 representing the length of a 2LT recording mark and 202 representing the length of a (2L+1)T recording mark. FIG. 12(a) illustrates a case of L=5.

FIG. 12(b) shows a divided recording pulse waveform when n=2L (=10) and FIG. 12(c) shows a divided recording pulse waveform when n=2L+1 (=11).

In FIG. 12(b), a frequency-divided first reference clock 205 with a period 2T is obtained by frequency-dividing a first reference clock 203 which has a zero phase delay from the reference clock 200 with a period T. Because $\alpha_1+\beta_1=2$, the rising edge of each recording pulse section $\alpha_i T$ ($1\leq i\leq m$) is synchronized with the frequency-divided first reference clock 205 with a period 2T. In synchronism with the frequency-divided first reference clock 205, the duty ratio of $\alpha_i-\beta_i$ is adjusted to produce a recording pulse waveform 207.

In FIG. 12(c), a frequency-divided second reference clock 206 with a period 2T is obtained by frequency-dividing a second reference clock 204 with a period t which has a phase shift of 0.5T from the reference clock 200. The leading edge of each recording pulse section $\alpha_i T$ ($2\leq i\leq m$) is synchronized with the frequency-divided second reference clock 206 with a period 2T. Because $\alpha_1+\beta_1=2.5$, only $\alpha_1 T$ rises 0.5T before the clock. In synchronism with the frequency-divided second reference clock 206, the duty ratio of $\alpha_i-\beta_i$ is adjusted to produce a recording pulse waveform 208.

In FIG. 12, the mark lengths 2LT and (2L+1)T are depicted so that their rear ends are aligned at T2 and T4. Hence, there are only two possible relations (b) and (c) between the reference clocks 205 and 206, both with the period of 2T. In reality, however, when the 2T-period reference clocks are used, the front end positions of these mark lengths can be 1T out of phase with each other. Further, considering the cases of n being even and n being odd, there are four possible relations as shown in FIG. 13(a), (b), (c) and (d). It is therefore desirable to adopt the following gate generating method to deal with this situation.

FIG. 13 is a timing chart explaining the above gate generating method. The gate generating method of FIG. 13 involves the following steps: (1) it generates a reference time $T_{sync}$ corresponding to the clock mark formed at a predetermined position on the recording track; (2) it generates four reference clocks, a 2T-period reference clock 1a lagging the reference time $T_{sync}$ as a start point by the delay time $T_{d1}$, a 2T-period reference clock 2a leading the reference clock 1a by 0.5T, a 2T-period reference clock 1b leading the reference clock 1a by 1T, and a 2T-period reference clock 2b leading the reference clock 1a by 1.5T, (3) when recording a mark of nT=2LT, it generates gate groups G1a, G1b in synchronism with either the reference clock 1a or 1b at timings corresponding to the $\alpha_1 T$, $\alpha_i T$ ($2 \leq i \leq m-1$) and $\alpha_m T$ sections; and (4) when recording a mark of nT=(2L+1), it generates gate groups G2a, G2b in synchronism with either the reference clock 2a or 2b at timings corresponding to $\alpha_1'T$, $\alpha_i'T$ ($2 \leq i \leq m-1$) and $\alpha_m'T$.

In FIG. 13 the reference number 300 represents the reference clock with a period T (reference clock for data). To record data at a particular address on the recording medium, the recording system normally makes a phase comparison between the synchronization signal $T_{sync}$ generated at clock marks arranged on the medium for each minimum unit of address (e.g., synchronization signal such as VFO formed as a pit train on the medium and arranged for each sector, and a synchronization pattern arranged for each ATIP frame (every 1/75 second) formed as a groove meander on the medium) and the T-period reference clock generated in advance in order to establish synchronization.

FIG. 13 shows an example case in which the front end of the mark appears an even number of periods T after the $T_{sync}$. An even-numbered length mark 301 with n being even is shown in FIG. 13(a) and an odd-numbered length mark 304 with n being odd is shown in FIG. 13(d). As an example in which the front end of the mark appears an odd number of periods T after the $T_{sync}$, an even-numbered length mark 302 with n being even (FIG. 13(b)) and an odd-numbered length mark 303 with n being odd (FIG. 13(c)) are shown.

In each of FIG. 13(a) to 13(d), when reference clocks are generated by shifting them 0.5T from one another in a manner similar to that of FIG. 12, four different clock trains are produced, as indicated by 305, 306, 307 and 308. That is, with the reference clock 305 taken as a reference, the clock 307 is shifted by 0.5T, the clock 306 is shifted by 1T, and the clock 308 is shifted by 1.5T. These clocks are all formed by frequency-dividing the T-period reference clock having its origin at $T_{sync}$ and then shifting their phases by 0.5T from one another.

In the case of FIG. 13(a), in synchronism with each of periods P1a, P2a, P3a, P4a and P5a the gate group G1a corresponding to the recording pulse sections $\alpha_1 T$, $\alpha_2 T$, $\alpha_3 T$, $\alpha_4 T$, $\alpha_5 T$.

In the case of FIG. 13(b), in synchronism with each of periods P1b, P2b, P3b, P4b and P5b the gate group G1b corresponding to the recording pulses $\alpha_1 T$, $\alpha_2 T$, $\alpha_3 T$, $\alpha_4 T$, $\alpha_5 T$.

In the case of FIG. 13(c), in synchronism with each of periods R1a, R2a, R3a, R4a and R5a the gate group G2a corresponding to the recording pulses $\alpha_1'T$, $\alpha_2'T$, $\alpha_3'T$, $\alpha_4'T$, $\alpha_5'T$.

In the case of FIG. 13(d), in synchronism with each of periods R1b, R2b, R3b, R4b and R5b the gate group G2b corresponding to the recording pulses $\alpha_1'T$, $\alpha_2'T$, $\alpha_3'T$, $\alpha_4'T$, $\alpha_5'T$.

Here, the recording pulse generating gate groups G1a, G1b, G2a and G2b are identical to the Gate1, Gate2 and Gate4 combined in FIG. 1. That is, in FIG. 1, the Gate1 for generating the first pulse $\alpha_1 T$, the Gate2 for generating the intermediate pulse group $\alpha_i T$ ($2 \leq i \leq m-1$), and the Gate4 for generating the last pulse $\alpha_m T$ are produced separately and then combined to generate the gate groups G1a and G1b. In FIG. 1, the first pulse $\alpha_1'T$, the intermediate pulse group $\alpha_i'T$ ($2 \leq i \leq m-1$), and the last pulse $\alpha_m'T$ are produced separately and then combined to generate the gate groups G2a and G2b.

Figure 2:
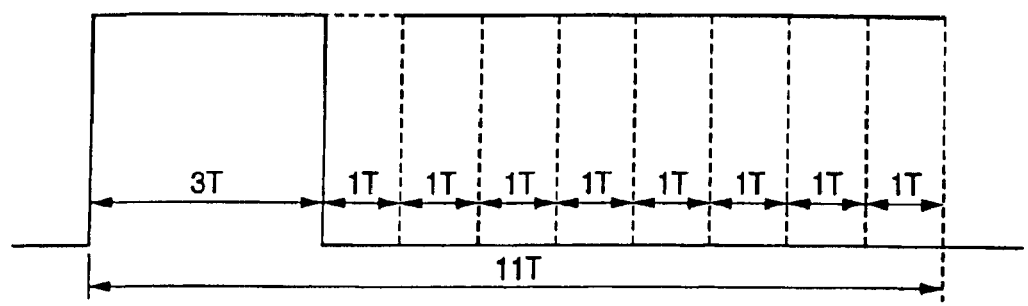
FIG. 2 is an explanatory diagram showing a conventional recording pulse division scheme.
Figure 2:
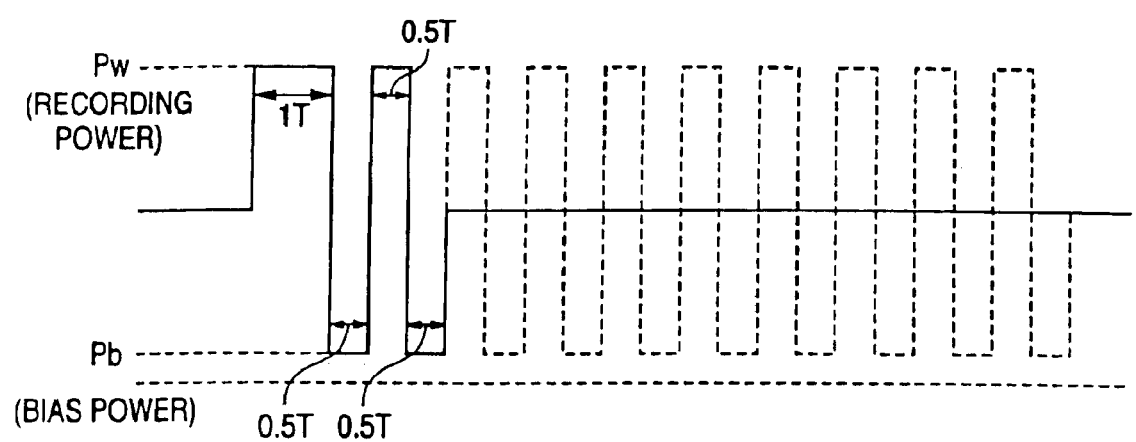

Generating the first pulse independently as with the Gate1 of FIG. 1 can deal with the situation where $(\alpha_1'+\beta_1')$ is 2.5 when n is odd, by generating the gate for $\alpha_1'T$ in synchronism with the front end of nT and generating the 2T-period intermediate pulse group $\alpha_i'T$ with a delay of 2.5T. This is equivalent to setting the $T_{d2}$ for Gate2 in FIG. 1 to 2.5T (when there is a delay $T_{d1}$, another delay $T_{d1}$ is made).

The gate groups G1a, G1b, G2a and G2b are selected as follows. First, with $T_{sync}$ taken a reference, the starting point of the T-period reference clock 300 is determined, and it is checked whether the mark length nT rises an even number of clock periods T or an odd number of clock periods T after the starting point. More specifically, a 1-bit adder is used which is reset at $T_{sync}$ and adds 1 every period. If the result is 0, it is decided that the elapsed time is determined to be an even number of periods; and if the result is 1, the elapsed time is determined to be an odd number of periods. That is, if the elapsed time from the reference time $T_{sync}$ to the front end of the nT mark is an even number times the period T, then the gate signal group G1a or G2b is selected depending on whether n is even or odd. If the elapsed time from the reference time $T_{sync}$ to the front end of the nT mark is an odd number times the period T, then the gate signal group G1b or G2a is selected depending on whether n is even or odd. It is therefore possible to generate all the recording pulses in a series of nT marks which are generated, with $T_o$ as a starting point, by using combinations of the four 2T-period reference clocks shifted 0.5T from one another.

To determine the length of the off pulse section and the erase power Pe light irradiating section requires focusing attention on the off pulse section $\beta_m T$. That is, it is desired to provide the rear end of the mark with not the period 2T but with a margin of about ±1T. In this case, the timing of the last off pulse $\beta_m$ or $\beta_m'$ needs to be defined exceptionally. To this end, it is preferable to generate a gate signal corresponding to the Gate3 of FIG. 1. For example, with the front end of the nT mark taken as a reference, the gate signals are generated depending on whether n is even or odd, that is, a gate G3 of $\Sigma(\alpha_i+\beta_i)$ is generated with a delay time of $T_{d1}$ when n is even; and a gate G4 of $\Sigma(\alpha_i'+\beta_i')$ is generated with a delay time of $T_{d1}$ when n is odd, to radiate light with different powers according to the following conditions. (1) in a duration where both G3 and G4 are off, light with a power Pe is radiated; (2) in a duration where either G3 or G4 is on, light with a power Pb is radiated; (3) in a duration where both G3 and G1a are on at the same time, light with a power Pw is radiated for a G1a-on section; (4) in a duration where both G3 and G1b are on at the same time, light with a power Pw is radiated for a G1b-on section; (5) in a duration where both G4 and G2a are on at the same time, light with a power Pw is radiated for a G2a-on section; and (6) in a duration where both G4 and G2b are on at the same time, light with a power Pw is radiated for a G2b-on section.

The gate priority relationship described above is determined by matching the gate on/off to logical 0 and 1 levels and performing an OR operation on each gate controlling logical signal.

FIG. 12 and FIG. 13 represent a case where, for simplicity, the rising edge of the first recording pulse $\alpha_1 T$, $\alpha_1'T$ is at the front end of the nT mark, i.e., concurrent with the front end of the nT mark being recorded. If the mark has a delay, it is preferred in terms of keeping the space length at a desired value that the rising edges of $\alpha_1 T$ and $\alpha_1'T$ be provided with the same delay $T_{d1}$.

Divided Recording Pulse Generating Method 3

The following description concerns another example of the divided recording pulse generating method based on a 2T-period clock signal which is obtained by dividing the reference clock period T. This method allows for the design of logic circuits based on more regular rules than those employed in the divided recording pulse generating method 1.

In more concrete terms, as in the pulse generating method 2, the procedure depends on whether the value the n of an nT mark can take is odd or even. In the divided recording pulse generating method 2, the correction of the mark length difference 1T between an even-numbered length mark and an odd-numbered length mark, both having the same number of divisions, is distributed and allocated to the first and last recording pulse periods. In the pulse generating method 3, however, the correction of the mark length difference 1T is done by adjusting the off pulse length $\beta_i T$ ($2 \leq i \leq m-1$) in the intermediate divided recording pulse group.

That is, for the recording of a mark in which n is even, i.e., the mark length is nT=2LT (L is an integer equal to 2 or more), the mark is divided into the number of sections m=L and the $\alpha_i$ and $\beta_i$ in the recording pulse sections $\alpha_i T$ and the off pulse sections $\beta_i T$ are defined as follows.

$$T_{d1}+\alpha_1=2+\epsilon_1$$

$$\beta_{i-1}+\alpha_i=2 \ (2 \leq i \leq m)$$

For the recording of a mark in which n is odd, i.e., the mark length is nT=(2L+1)T, on the other hand, the mark is divided into the number of sections m=L and the $\alpha_i'$ and $\beta_i'$ in the recording pulse sections $\alpha_i'T$ and the off pulse sections $\beta_i'T$ are defined as follows.

$$T_{d1}'+\alpha_1'=2+\epsilon_1'$$

$$\beta_1'+\alpha_2'=2.5+\epsilon_2'$$

$$\beta_{i-1}'+\alpha_i'=2 \ (3 \leq i \leq m-1)$$

$$\beta_{m-1}'+\alpha_m'=2.5+\epsilon_3'$$

(When L=2, it is assumed that $\beta_1'+\alpha_2'=2.5+\epsilon_2'$ or $\beta_1'+\alpha_2'=3+\epsilon_2'$)

Then, $\beta_1, \alpha_2, \beta_{m-1}, \alpha_m, \beta_1', \alpha_2', \beta_{m-1}'$ and $\alpha_m'$ satisfy the following equation.

$$\beta_1+\alpha_2+\beta_{m-1}+\alpha_m+\Delta_2=\beta_1'+\alpha_2'+\beta_{m-1}'+\alpha_m'$$

(where $\Delta_2$=0.8 to 1.2).

The values of $\alpha_i, \beta_i, \alpha_i', \beta_i', T_{d1}, T_{d1}', \epsilon_1, \epsilon_1', \epsilon_2'$ and $\epsilon_3'$ can vary according to L.

$T_{d1}$ and $T_{d1}'$ are delay or advance times from the starting end of the nT mark in the mark length-modulated original signal until the first recording pulse $\alpha_1 T$ rises. They are real numbers normally between −2 and 2. The positive values of $T_{d1}$ and $T_{d1}'$ signify delays. $T_{d1}$ and $T_{d1}'$ are preferably set almost constant regardless of the value of L.

$\alpha_i, \beta_i, \alpha_i'$ and $\beta_i'$ are real numbers normally between 0 and 2, preferably between 0.5 and 1.5.

$\epsilon_1, \epsilon_1', \epsilon_2'$ and $\epsilon_3'$ are real numbers normally between −1 and 1, preferably between −0.5 and 0.5. These are used, as required, as correction values for realizing precise mark lengths or space lengths in the divided pulse periods ($\beta_{i-1}+\alpha_i$)T that form the period 2T.

In the pulse generating method 3, two marks corresponding to n=2LT and n=(2L+1)T, where L's are equal, are divided into the same division number L of recording pulses in the process of recording. That is, for n=2, 3, 4, 5, 6, 7, 8, 9, . . . , the number of recording pulses for the corresponding n is set to 1, 1, 2, 2, 3, 3, 4, 4, 5, 5 . . . For example, in the EFM modulation signal, for n=3, 4, 5, 6, 7, 8, 9, 10, 11, the division number m is sequentially set to m=1, 2, 2, 3, 3, 4, 4, 5, 5 in that order. In the EFM+ signal, n=14 is added. In that case, the division number m is set to 7. In the (1, 7)-RLL-NRZI modulation, the division number m is set to 1 also in the case of n=2.

To record two kinds of mark lengths of n=2L and 2L+1 with the same division numbers, the period ($\beta_1+\alpha_2$)T and the period ($\beta_{m-1}+\alpha_m$)T are each increased or decreased by 0.5T to adjust their lengths. What is important in the mark length recording is the mark end position and the jitter that are determined by the waveform of the front and rear ends of the mark. The intermediate portion of the mark does not have a great effect on the jitter at the ends of the mark as long as the correct amplitude of the intermediate portion is obtained. The above adjusting method takes advantage of the fact that as long as the mark does not appear optically divided, if the recording pulse period in the intermediate portion of the mark is extended or reduced by 0.5T, the mark length only increases or decreases by the corresponding amount and does not greatly affect the jitter at the ends of the mark.

In the pulse generating method 3, 2T is taken as the base recording pulse period for any mark length. The duty ratio of $\alpha_i$–$\beta_i$ can be optimized for each mark length or for each i, but it is preferred that the following restrictions be provided for the simplification of the recording pulse generating circuit.

As to the front end of the mark, $\alpha_1, \beta_1, \alpha_1'$ and $\beta_1'$ are each preferably made constant and independent of L for the L value of 3 or more. More preferably, $\alpha_1'=0.8\alpha_1$ to $1.2\alpha_1$ and $\beta_1'=\beta_1$+about 0.5. Still more preferably, $\beta_1'=\beta_1+0.5$, $\alpha_1=\alpha_1'$ and $\beta_1=\beta_1'$. The position of the front end of the mark is almost determined by the leading edge of the first recording pulse. That is, if the position of the leading edge of $\alpha_1 T$= $\alpha_1'T$ is set to lag the starting end of the mark length nT by a constant delay time $T_{d1}$, the actual front end position of the mark is determined almost uniquely. As to the jitter at the front end of the mark, on the other hand, if $\beta_1 T$ has more than a certain length (in practice, 0.5T) assuming that $\alpha_1 T$ is nearly equal to $\alpha_1'T$, the jitter can be kept within a satisfactory level irrespective of n value by setting only $\beta_1'$ to approximately $\beta_1'=\beta_1+0.5$.

As to the rear end of the mark, $\alpha_m, \beta_m, \alpha_m'$ and $\beta_m'$ are each preferably made constant and independent of L for the L value of 3 or more. More preferably, $\beta_{m-1}'=\beta_{m-1}$+about 0.5, $\alpha_m'=0.8\alpha_m$ to $1.2\alpha_m$, and $\beta_m'=0.8\beta_m$ to $1.2\beta_m$. Still more preferably, $\beta_{m-1}'=\beta_{m-1}+0.5$, $\alpha_1=\alpha_m'$, and $\beta_m=\beta_m'$.

When L=2, it is preferred that $\beta_1'=\beta_1+0.5$ to 1.5, $\alpha_m'=\alpha_m+0$ to 1, and $\beta_m'=0.8\beta_m$ to $1.2\beta_m$. However, in either case, it is desired that the falling edges of the $\alpha_m T$ and $\alpha_1'T$ and the rear end of the mark length nT be synchronized, with a predetermined time difference therebetween.

The rear end position of the mark depends not only on the trailing edge position of the last recording pulse $\alpha_m T$ (or $\alpha_m'T$) but also on the cooling process of the recording layer temperature before and after the mark rear end position. In the phase change medium that forms amorphous marks in particular, the mark rear end position depends on the cooling speed of the recording layer temperature controlled by the last off pulse section $\beta_m T$ (or $\beta_m'T$) Hence, if $\alpha_m T$ and $\alpha_m'T$ are shifted a predetermined time from the rear end of the nT mark and $\beta_m'=\beta_m$, then the mark rear end position is determined almost uniquely.

As to the jitter at the rear end, on the other hand, if $\beta_{m-1}, \beta_{m-1}', \alpha_m$ and $\alpha_m'$ are longer than a predetermined length, the jitter produced is small and governed mostly by $\beta_m'=\beta_m$. Optimizing the $\beta_m'=\beta_m$ can produce nearly the best jitter.

In the pulse generating method 3, too, in the process of high density recording in particular, the values of $T_{d1}$, $\alpha_1$, $\alpha_1'$, $\beta_1$, $\beta_1'$, $\alpha_m$, $\alpha_m'$, $\beta_m$ and $\beta_m'$ can be finely adjusted in the range of about ±20% to correct the heat interference according to marks or spaces immediately before or after the mark being recorded. In the above explanation, the expression "about 0.5" or "about 1" means that the fine adjustment of that degree is allowed.

For further simplification of the pulse generating circuit, when L is 3 or more, $\alpha_i$ and $\alpha_i'$ are made constant and independent of i for the i value of $2 \leq i \leq m-1$. That is, $$\alpha_2 = \alpha_3 = \ldots = \alpha_{m-1}$$
$$\alpha_2' = \alpha_3' = \ldots = \alpha_{m-1}'$$

Here, the expression "L is 3 or more" is the condition to establish that the division number is 3 or more and there is one or more intermediate divided recording pulses excluding first and last divided pulses.

More preferably, when L is 3 or more, the values of $\alpha_i$ and $\alpha_i'$ for $2 \leq i \leq m-1$ are fixed to constant values of $\alpha c$ and $\alpha c'$ respectively, which are independent of L. Still more preferably, $\alpha c = \alpha c'$. In the mark length recording, the formation of the intermediate portion of the mark has little effect on the mark end position and the jitter as long as the appropriate signal amplitudes are produced. In most cases therefore it is possible to make a uniform setting of $\alpha_i = \alpha_i' = \alpha c$ ($2 \leq i \leq m-1$) as described above.

It is more preferred that $\alpha_m$ and $\alpha_m'$ be set to the same values of $\alpha_i$ and $\alpha_i'$ for $2 \leq i \leq m-1$.

When L=1, i.e., the mark length nT is 2T or 3T, it is preferred that m=1. In that case, the period $(\alpha_1 + \beta_1)T$ and the duty ratio of $\alpha_1 - \beta_1$ (or period $(\alpha_1' + \beta_1')T$ and $\alpha_1' - \beta_1'$ duty ratio) are adjusted to realize a desired mark length and jitter. If $\beta_1$ or $\beta_1'$ is constant for $n \geq 4$, it is preferred that $\beta_m$ or $\beta_m'$ also use the same values of $\beta_1$ or $\beta_1'$ for $n \geq 4$.

These divided recording pulses, when $0 \leq T_{d1} \leq 2$ and $0 \leq T_{d1}' \leq 2$, can be formed as follows.

First, (1) it is assumed that an original mark length modulation signal is generated in synchronism with the first reference clock with a period T. With the starting end of the nT mark of the mark length modulation signal taken as a reference, the first recording pulse $\alpha_1 T$ (or $\alpha_1'T$) is generated with a delay time of $T_{d1}$ (or $T_{d1}'$). Next, (2) the last recording pulse $\alpha_m T$ ($\alpha_m'T$) is generated so that its falling edge aligns, after a time difference of $\epsilon_3$ (or $\epsilon_3'$), with the rear end of the nT mark. Then, (3) as to $\alpha_i T$ and $\beta_i T$ ($2 \leq i \leq m-1$)—the intermediate divided recording pulses that are produced when L is 3 or more—$\alpha_2 T$ falls 4T after the starting end of the nT mark and thereafter $\alpha_i + \beta_{i-1}$ are generated with a period of 2T. (4) When n is odd (n=2L+1), $\alpha_2'T$ falls 4.5T after the starting end of the nT mark and thereafter $\alpha_i' + \beta_{i-1}'$ are generated.

In the above example, also when $\epsilon_1$, $\epsilon_1'$, $\epsilon_2'$ and $\epsilon_3'$ are not 0, the falling edge of at least $\alpha_2 T$ or $\alpha_2'T$ in the intermediate divided recording pulse group is produced precisely the delay time of 4T or 4.5T after the starting end of the nT mark. Therefore, at least the intermediate divided recording pulse group can be generated in synchronism with the 2T-period reference clock, which was generated by frequency-dividing the T-period reference data clock in advance.

Figure 24:
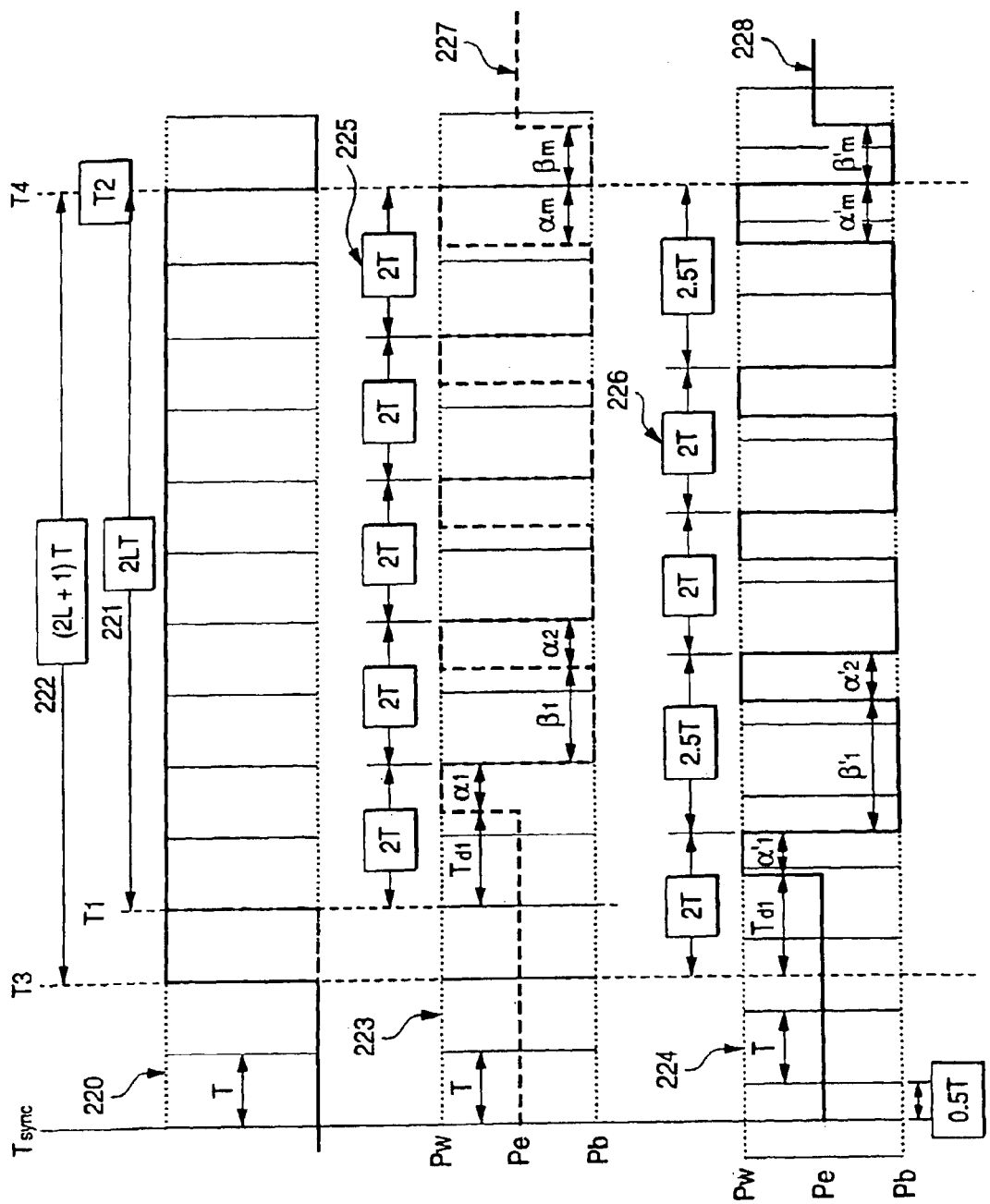
FIG. 24 is an explanatory diagram showing an example of a pulse division scheme according to the invention.

FIG. 24 shows the relation between the recording pulses when the recording pulse dividing method of this invention is implemented by combining a plurality of 2T-period reference clocks.

In FIG. 24, for simplicity, the recording power Pw of light radiated during the recording pulse sections, the bias power Pb of light radiated during the off pulse sections, and the erase power Pe of light radiated during other than these sections are each shown to be constant for any i. Although these powers are shown to have the relationship of Pb<Pe<Pw, these powers may be set to different values depending on the values of n and i. Particularly, the recording power $Pw_1$ in $\alpha_1 T$ and $\alpha_1'T$ and the recording power $Pw_m$ in $\alpha_m T$ and $\alpha_m'T$ may be set different from the recording power $Pw_i$ in other sections $\alpha_i T$ (i=2 to m-1).

Further, in FIG. 24, for simplification, it is assumed that $\epsilon_1 = \epsilon_1' = \epsilon_2' = \epsilon_3' = 0$, and the first recording pulses $\alpha_1 T$ and $\alpha_1'T$ are shown to fall 2T after the front end of the nT mark being recorded and the falling edges of $\alpha_m T$ and $\alpha_m'T$ are shown to coincide with the rear end of the nT mark.

In FIG. 24, reference number 220 represents a T-period reference clock.

FIG. 24(a) shows square waves associated with the nT mark of the original mark length modulation signal, with 221 representing a mark 2LT in length and 222 representing a mark (2L+1)T in length. Here, although two kinds of marks corresponding to L=5 are shown, it is possible to handle other cases of the L value by adding or subtracting the period of 2T for the intermediate i of $2 \leq i \leq m-1$ each time L increments or decrements by 1.

FIG. 24(b) represents a waveform of divided recording pulses when n=2L=10 and FIG. 24(c) represents a waveform of divided recording pulses when n=2L+1=11.

In FIG. 24(b), the 2T-period reference clock 225 is obtained by frequency-dividing a T-period reference clock 223 which has no phase delay with respect to the T-period reference clock 220. When $T_{d1} + \alpha_1 = 2$, the falling edge of each recording pulse $\alpha_i T$ ($1 \leq i \leq m$) is synchronized with the 2T-period reference clock 225. In synchronism with the 2T-period reference clock 225, the duty ratio of $\alpha_i - \beta_i$ is adjusted to produce a recording pulse waveform 227.

In FIG. 24(c), a 2T-period reference clock 226 is obtained by frequency-dividing a T-period reference clock 224 which is 0.5T out of phase with the T-period reference clock 220. The falling edge of each recording pulse $\alpha_i'T$ ($2 \leq i \leq m$) is synchronized with the 2T-period reference clock 226. In synchronism with the reference clock 226, the duty ratio of $\beta_{i-1-\alpha i}$ is adjusted to produce a recording pulse waveform 228.

In this way, by using the T-period first reference clock 1 (223) and the T-period second reference clock 2 (224) 0.5 T out of phase with the T-period first reference clock, $\alpha_i$ ($1 \leq i \leq m$) is generated in synchronism with the 2T-period reference clock 3 (225) which is obtained by frequency-dividing the reference clock 1 and $\alpha_i'$ ($2 \leq i \leq m-1$) is generated in synchronism with the 2T-period reference clock 4 (226) which is obtained by frequency-dividing the reference clock 2, thereby producing the divided recording pulses corresponding to 2L and 2L+1 easily.

In FIG. 24, the mark lengths 2LT and (2L+1)T are depicted to have their rear ends align with each other at T2 and T4. So, there are only two possible relations (b) and (c) between the 2T-period reference clocks 225 and 226. In reality, however, when the 2T-period reference clocks are used, the front end positions of these mark lengths can be 1T out of phase with each other although they are in phase with the 2T period. Hence, the divided recording pulse generating method 3 needs also to consider, as in the divided recording pulse generating method 2, the fact that there are four possible relations considering the cases of n being even and n being odd as shown in FIG. 13(a), (b), (c) and (d).

Then, by using the 2T-period clock train 4 of FIG. 13, in the case of (1a); a gate group G1a corresponding to the recording pulse sections $\alpha_1$T, $\alpha_2$T, $\alpha_3$T, $\alpha_4$T, $\alpha_5$T is generated in synchronism with each of the periods P1$a$, P2$a$, P3$a$, P4$a$, P5$a$; in the case of (1$b$), a gate group G1$b$ corresponding to the recording pulses $\alpha_1$T, $\alpha_2$T, $\alpha_3$T, $\alpha_4$T, $\alpha_5$T is generated in synchronism with each of the periods P1$b$, P2$b$, P3$b$, P4$b$, P5$b$; in the case of (2$a$), a gate group G2$a$ corresponding to the recording pulses $\alpha_1$'T, $\alpha_2$'T, $\alpha_3$'T, $\alpha_4$'T, $\alpha_5$'T is generated in synchronism with each of the periods R1$a$, R2$a$, R3$a$, R4$a$, R5$a$; and in the case of (2$b$), a gate group G2$b$ corresponding to the recording pulses $\alpha_1$'T, $\alpha_2$'T, $\alpha_3$'T, $\alpha_4$'T, $\alpha_5$'T is generated in synchronism with each of the periods Q1$b$, Q2$b$, Q3$b$, Q4$b$, Q5$b$.

These recording pulse generating gate groups G1$a$, G1$b$, G2$a$, G2$b$ are identical to the combinations of Gate 1, 2, and 4 in FIG. 1, as in the case of the divided recording pulse generating method 2.

That is, in generating G1$a$ and G1$b$, as shown in FIG. 1, the Gate1 for generating the first pulse $\alpha_1$T, the Gate2 for generating the intermediate pulse group $\alpha_i$T ($2 \leq i \leq m-1$), and the Gate4 for generating the last pulse $\alpha_m$T are separately generated and then combined. Or in generating G2$a$ and G2$b$, as shown in FIG. 1, the first pulse $\alpha_1$'T, the intermediate pulse group $\alpha_i$'T ($2 \leq i \leq m-1$), and the last pulse $\alpha_m$'T are separately produced and then combined. When $\epsilon_1$, $\epsilon_1$', $\epsilon_2$' and $\epsilon_3$' are not 0, the first recording pulses $\alpha_1$T, $\alpha_1$'T may be given a predetermined time difference of period P1$a$, Q1$a$, P1$b$ or Q1$b$, and the last recording pulses $\alpha_m$T, $\alpha_m$'T are given a predetermined time difference of either period P5$a$, P5$b$, Q5$a$ or Q5$b$.

On the other hand, to determine the off pulse sections and the Pe power irradiation sections, one must consider the fact that the last off pulse section $\beta_m$T of the mark is irregular. That is, the period of the rear end of the mark is not necessarily 2T and must be given a margin of about 2T±1T. This can be dealt with by defining the last off pulse $\beta_m$ or $\beta_m$' exceptionally. For that purpose, the gate signal corresponding to the Gate3 of FIG. 1 is generated.

That is, when n is even, a gate G3 of $\Sigma(\alpha_i+\beta_i)$T is generated with a delay time $T_{d1}$ from the front end of the nt mark; and when n is odd, a gate G4 of $\Sigma(\alpha_i'+\beta_i')$T is generated with a delay time $T_{d1}$' from the front end of the nT mark. Then, when either G3 or G4 is off, the light with the erase power Pe is radiated; when either G3 or G4 is on, the light with the bias power Pb is radiated; when both G3 and G1$a$ are on simultaneously, the light with the recording power Pw is radiated in response to the G1$a$-on section; when both G3 and G1$b$ are on simultaneously, the light with the recording power Pw is radiated in response to the G1$b$-on section; when both G4 and G2$a$ are on simultaneously, the light with the recording power Pw is radiated in response to the G2$a$-on section; and when both G4 and G2$b$ are on simultaneously, the light with the recording power Pw is radiated in response to the G2$b$-on section. The gate priority relationship described above is determined by matching the gate on/off to logical 0 and 1 levels and performing an OR operation on each gate controlling logical signal.

In summary, all the gates for generating the recording pulse sections $\alpha_i$T can be produced by the following procedure. (1) A reference time $T_{sync}$ corresponding to the clock mark formed at a predetermined position on the recording track is generated; (2) four reference clocks are generated: a 2T-period reference clock 1$a$ produced at the reference time $T_{sync}$ as a starting point, a 2T-period reference clock 2$a$ produced 0.5T in advance of the reference clock 1$a$, 2T-period reference clock 1$b$ produced 1T in advance of the reference clock 1$a$, and a 2T-period reference clock 2$b$ produced 1.5T in advance of the reference clock 1$a$; (3) in recording a mark of nT=2LT, the gate groups G1$a$ and G1$b$ which have timings corresponding to the $\alpha_1$T, $\alpha_i$T ($2 \leq i \leq m-1$) and $\alpha_m$T sections are generated in synchronism with either the reference clock 1$a$ or 1$b$; (4) in recording a mark of nT=(2L+1)T, the gate groups G2$a$ and G2$b$ which have timings corresponding to the $\alpha_1$'T, $\alpha_i$'T ($2 \leq i \leq m-1$) and $\alpha_m$'T are generated in synchronism with either the reference clock 2$a$ or 2$b$.

The gate groups G1$a$, G1$b$, G2$a$, G2$b$ can be selected as follows. First, it is checked whether the mark length nT rises an even number of clock periods T or an odd number of clock periods T after the reference time $T_{sync}$ as a start point. More specifically, a 1-bit adder is used which is reset at $T_{sync}$ and adds 1 every period. If the result is 0, it is decided that the elapsed time is determined to be an even number of periods; and if the result is 1, the elapsed time is determined to be an odd number of periods. That is, if the elapsed time from the reference time $T_{sync}$ to the front end of the nT mark is an even number times the period T, then the gate signal group G1$a$ or G2$b$ is selected depending on whether n is even or odd. If the elapsed time from the reference time $T_{sync}$ to the front end of the nT mark is an odd number times the period T, then the gate signal group G1$b$ or G2$a$ is selected depending on whether n is even or odd. It is therefore possible to generate all the recording pulses in a series of nT marks which are generated, with $T_0$ as a starting point, by using combinations of the four 2T-period reference clocks shifted 0.5T from one another.

With the divided recording pulse generating methods 1, 2 and 3 described above, by holding constant the switching period of at least intermediate pulse group ($\alpha_i+\beta_i$)T or ($\alpha_i+\beta_{i-1}$)T ($2 \leq i \leq m-1$) at 1T, 1.5T, 2T or 2.5T, and by changing the duty ratio of $\alpha_i-\beta_i$ and duty ratio of $\alpha_1'-\beta_i'$, it is possible to find an optimum divided recording pulse strategy easily even when mediums with different characteristics are used or when the same medium is used at different linear velocities.

The optical recording method of this invention is particularly effective for a phase change medium in which information is overwritten by forming an amorphous mark on a crystal-state medium, the crystal state being taken as an unrecorded or erased state.

The optical recording method of this invention is also effective in cases where the recording is made on the same medium at different linear velocities. Generally, a constant density recording is commonly practiced, which does not depend on the linear velocity but keeps a product of vT at a plurality of linear velocities constant, where v is a linear velocity and T is a clock period.

When for example the recording based on the mark length modulation scheme is to be performed on the same recording medium at a plurality of linear velocities v in such a way that v×T is constant, the pulse generation method 2, for L equal to or more than 2, keeps the periods of ($\alpha_i+\beta_i$)T and ($\alpha_i'+\beta_i'$)T for $2 \leq i \leq m-1$ constant irrespective of the linear velocity, also keeps $Pw_i$, $Pb_i$ and Pe for each i almost constant irrespective of the linear velocity, and reduces $\alpha_i$ and $\alpha_i'$ ($1 \leq i \leq m$) as the linear velocity becomes slower (JP-A9-7176). As a result, a satisfactory overwrite is made possible in a wide range of linear velocity.

When the recording based on the mark length modulation scheme is to be performed on the same recording medium at a plurality of linear velocities v with v×T kept constant, the pulse generation method 3, for L equal to or more than 2, keeps the periods of ($\beta_{i-1}+\alpha_i$)T and ($\beta_{i-1}'+\alpha_i'$)T for $2 \leq i \leq m$ constant irrespective of the linear velocity, also keeps $Pw_i$, $Pb_i$ and Pe for each i almost constant irrespective of the linear velocity, and monotonously reduces $\alpha_i$ and $\alpha_i'$ as the linear velocity becomes slower (JP-A 9-7176). In this case, too, a satisfactory overwrite is made possible in a wide range of linear velocity.

In the above two examples, the expression "$Pw_i$, $Pb_i$ and Pe are almost constant irrespective of the linear velocity" means that the minimum value is within about 20% of the maximum value, more preferably within 10%. Still more preferably, $Pw_i$, $Pb_i$ and Pe are virtually constant, not dependent of the linear velocity at all.

In the above two examples, the method of reducing $\alpha_i$ and increasing $\beta_i$ in $(\alpha_i+\beta_i)T$ and reducing $\alpha_i$ and increasing $\beta_i'$ in $(\alpha_i+\beta_i)T$ as the linear velocity decreases is particularly effective in the phase change medium. This is because in the phase change medium, the cooling speed of the recording layer becomes slower as the linear velocity decreases and it is necessary to accelerate the cooling effect by increasing the ratio of the off pulse section $\beta_i$. In that case, for all linear velocities v used and for all L, it is preferred that $\beta_i$ and $\beta_i'$ be set to $0.5<\beta_i\leq2.5$ and $0.5<\beta_i'\leq2.5$, more preferably $1\leq\beta_i\leq2$ and $1\leq\beta_i'<2$, to secure the cooling time to change the medium into the amorphous state.

In the above two examples, it is further preferred that, for all linear velocities, $\alpha_iT$ and $\alpha_1'T$ ($2\leq i\leq m-1$) be held constant, i.e., the intermediate recording pulses have almost constant absolute lengths of time. The expression "almost constant" means that they have a variation range of about ±0.1T at each linear velocity. In that case, the reference clock T becomes large as the linear velocity decreases, so $\alpha_i$ and $\alpha_i'$ in the intermediate pulse group necessarily decrease monotonously. Although the first recording pulse sections $\alpha_1T$, $\alpha_1'T$ can be made constant, they should preferably be finely adjusted at each linear velocity. The $\beta_m$ and $\beta_m'$ are preferably fine-adjusted at each linear velocity. In that case, it is preferred that $\beta_m$ and $\beta_m'$ be set constant or made to increase as the linear velocity decreases.

In the above two pulse generating methods 1, 2 and 3, when the reference clock period T is smaller than the ×1-speed of the recordable DVD (linear velocity 3.5 m/s; and reference clock period T is 38.2 nanoseconds), $n-(\eta_1+\eta_2)$ and the first and last pulses should preferably be controlled according to the preceding and/or subsequent mark lengths or space lengths.

Examples in which the present invention proves particularly effective are described below.

A first case is where the linear velocity during the recording is set as high as 10 m/s or more and the shortest mark length as small as 0.8 μm or less in order to perform high density recording. Because the shortest mark length is expressed as nT×V where V is the linear velocity, the reduced shortest mark length results in the reference clock period T being shortened.

It is also effective to set the wavelength of the recording light to as short as 500 nm or less, the numerical aperture of the lens for focusing the recording light to as high as 0.6 or more, the beam diameter of the recording light to a small value, and the shortest mark length to as small as 0.3 μm or less to perform high density recording.

Further, it is also effective to use high density recording modulation scheme, such as a 8–16 modulation scheme and a (1, 7)-RLL-NRZI modulation scheme, as the mark length modulation scheme.

Another case is where the mark length modulation scheme is an EFM modulation scheme and the linear velocity during recording is set to a very high speed of 10 times the CD reference linear velocity of 1.2 m/s to 1.4 m/s while keeping the recording line density constant during the recording.

Still another case is where the mark length modulation scheme is an EFM+ modulation scheme, the high density recording scheme, and the linear velocity during recording is set to as high as two or more times the DVD reference linear velocity of 3.49 m/s while keeping the recording line density constant during the recording.

Next, the quality of the mark length modulation signal will be described by referring to the drawings.

Figure 5:
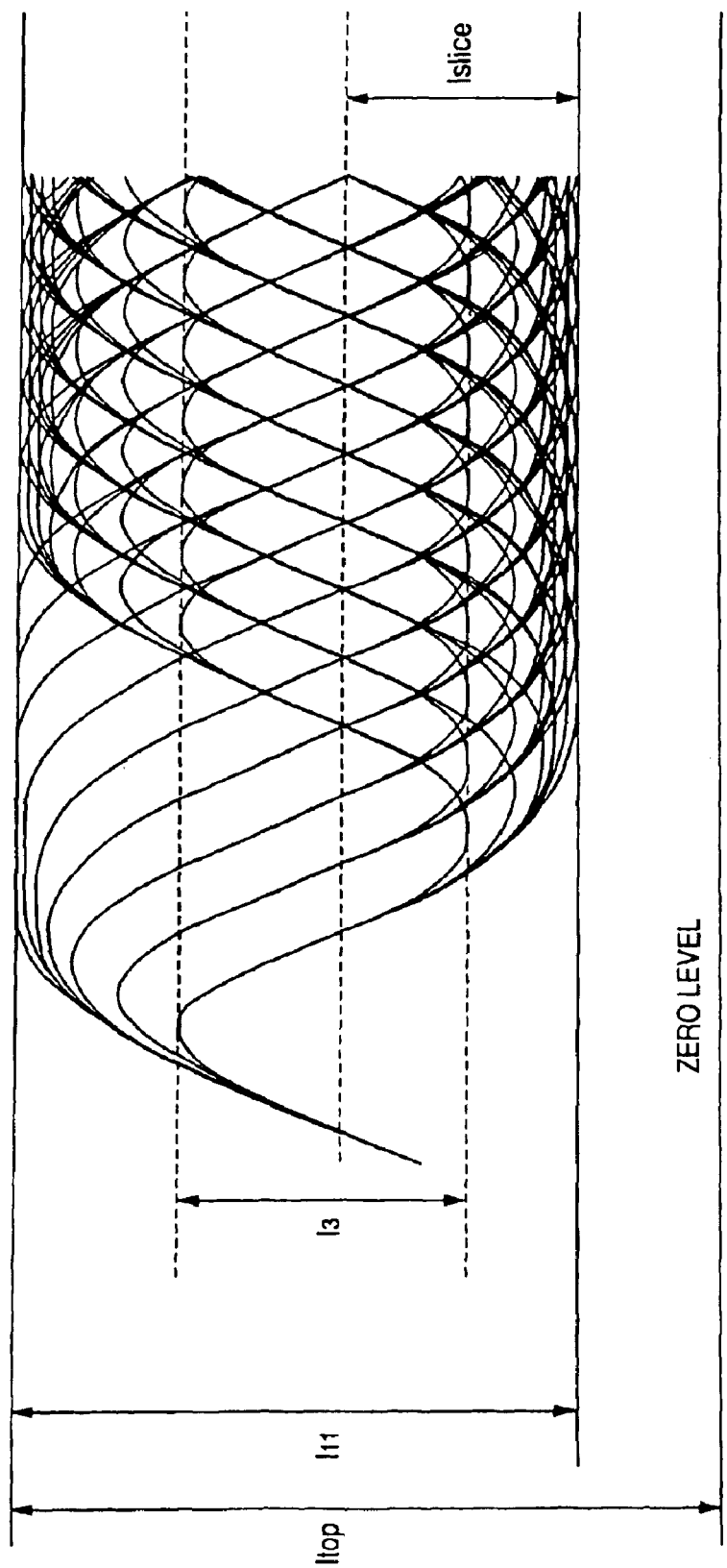
FIG. 5 is a schematic diagram of retrieved waveforms (eye-pattern) of an EFM modulation signal.

FIG. 5 is a schematic diagram showing retrieved waveforms (eye-pattern) of the EFM modulation signal used in the CD family including Cd-RW. In the EFM modulation, the recording mark and space lengths can take a time length of between 3T and 11T and the eye-pattern virtually randomly includes retrieved waveforms of all amorphous marks from 3T to 11T. The EFM+ modulation further includes a mark length of 14T and a space length of 14T.

The upper end $I_{top}$ of the eye-pattern converted into the reflectance is an upper end value $R_{top}$, and the amplitude of eye-pattern (in practice, amplitude of 11T mark) $I_{11}$ standardized by the $I_{top}$ is a modulation $m_{11}$ of the recording signal expressed as follows.

$$m_{11} = \frac{I_{11}}{I_{top}} \times 100 (\%) \qquad (1)$$

$m_{11}$ is preferably set between 40% and 80% and it is particularly important to set $m_{11}$ to 40% or more. It is preferred that the signal amplitude be set large, but too large a signal amplitude will result in the gain of the amplifier of the signal reproducing system becoming excessively saturated. So, the upper limit of $m_{11}$ is set at around 80%. Too small a signal amplitude on the other hand will reduce the signal-noise ratio (SN ratio) and thus the lower limit is set at around 40%.

Further it is preferred that the asymmetry value Asym defined by the equation below be set as close to 0 as possible.

$$Asym = \left(\frac{I_{slice}}{I_{11}} - \frac{1}{2}\right) (\%) \qquad (2)$$

Further, it is desired that the jitter of each mark and space of the retrieved signal be almost 10% or less of the reference clock period T and that the mark length and space length have nearly nT×V (T is a reference clock period of data, n is an integer from 3 to 11, and v is a linear velocity during reproduction). With this arrangement, a signal reproduction using a commercially available CD-ROM drive can be performed at a low error rate. In a recordable DVD medium using the EFM+ modulation scheme, equations (1) and (2) are defined by replacing $I_{11}$ with an amplitude $I_{14}$ of a 14T mark. The jitter is measured as a so-called edge-to-clock jitter, which is obtained by passing an analog retrieved signal through an equalizer to digitize it. In that case, the value of jitter is preferably 13% or less of the clock period, particularly 9% or less.

Next, a preferred optical recording medium for use in the above-described optical recording method will be explained.

Optical recording mediums recorded according to this invention include a pigment-based organic recording medium, a magnetooptical recording medium, a phase change recording medium and various other types of recording mediums. They also include a write-once and rewritable mediums. Of these mediums, the one that can produce a particularly significant effect is the phase change recording medium, particularly a rewritable phase change recording medium in which an amorphous mark is overwritten on a crystal-state medium, the crystal state being taken as an unrecorded state.

A particularly preferred material of the recording layer is of a type in which crystallization initiates at an interface between a crystal area and a melted area.

Among the preferred phase change mediums are those having a recording layer containing still more excessive Sb in the SbTe eutectic composition. A particularly preferred composition is the one which contains excessive Sb and also Ge in the base $Sb_{70}Te_{30}$ eutectic composition. The Sb/Te ratio is particularly preferably set to 4 or more. The content of Ge is preferably 10 atomic % or less. An example of such a recording layer is a $M_zGe_y (Sb_xTe_{1-x})_{1-y-x}$ alloy (where $0 \leq y \leq 0.1, 0 \leq y \leq 0.3, 0.8 \leq x$; and M is at least one of In, Ga, Si, Sn, Pb, Pd, Pt, Zn, Au, Ag, Zr, Hf, V, Nb, Ta, Cr, Co, Mo, Mn, Bi, O, N and S).

The alloy with the above composition, as explained above, is a binary alloy containing excessive Sb at the $Sb_{70}Te_{30}$ eutectic point and which contains Ge for for improving the time-dependent stability and jitter, and also contains at least one of the series of elements represented by M for further reduction of jitter and improvement of linear velocity dependency and optical characteristics. Alternatively, a composition with the Te amount close to zero can be regarded as an alloy that has Te or M element added in the composition near the $Ge_{15}Sb_{85}$ eutectic point.

In the above composition, Ge acts to enhance the time-dependent stability of the amorphous mark without degrading the high speed crystallization function offered by excess Sb. It is considered to have a capability to raise the crystallization temperature and enhance the activation energy for crystallization. That is, the above-mentioned alloy recording layer consisting mainly of GeSbTe in the base SbTe eutectic composition can increase the Sb/Te ratio while suppressing the formation of crystal nucleus by the presence of Ge and thereby increase the speed of crystal growth. Generally, the forming of crystal nucleus initiates at a lower temperature than that of the crystal growth and this is not desirable to the storage stability of the mark at around the room temperature when amorphous marks are formed. In the alloy recording layer with the above GeSbTe as a main component, because the crystal growth at near the melting point is selectively promoted, this alloy is capable of quick erasure and has an excellent stability of the amorphous mark at room temperature. In this sense, the alloy recording layer described above is particularly suited for high linear velocity recording.

As the element M in the above composition, In and Ga may be used. In in particular is effective in reducing jitter and enlarging the associated linear velocity margin. A more preferred composition of the recording layer of the phase change medium is $A^1{}_aA^2{}_bGe_c(Sb_dTe_{1-d})_{1-a-b-c}$ alloy (where $0 \leq a \leq 0.1, 0 < b \leq 0.1, 0.02 < c \leq 0.3, 0.8 < d$; $A^1$ is at least one of Zn, Pd, Pt, V, Nb, Ta, Cr, Co, Si, Sn, Pb, Bi, N, O and S; and $A^2$ is In and/or Ga).

These compositions are preferable because, compared with the composition near the conventional $GeTe—Sb_2Te_3$ pseudo-binary alloy, the reflectance of individual fine crystal grains has a smaller dependency on the direction of crystal plane, providing these compositions with the ability to reduce noise.

Further, the SbTe-based composition with the above Sb/Te ratio higher than 80/20 is excellent in that it is capable of quick erasure at high linear velocities equal to or more than 12 times the CD linear velocity (about 14 m/s) or 4 times the DVD linear velocity (about 14 m/s).

This composition, on the other hand, poses a particularly large problem when the reference clock period is as small as 25 ns or less. The reason is described as follows.

The erasure of the amorphous mark in the above composition is virtually governed only by the crystal growth from the boundary with the crystal area surrounding the amorphous mark, and the formation of a crystal nucleus inside the amorphous mark and the process of crystal growth from the crystal nucleus hardly contribute to the recrystallization process. As the linear velocity increases (e.g., to more than 10 m/s), the time that the erase power Pe is irradiated becomes short, extremely reducing the time that the layer is kept at a high temperature around the melting point necessary for the crystal growth. In the above composition, although the crystal growth from the area surrounding the amorphous mark can be promoted by increasing the Sb content, the increased content of Sb also increases the crystal growth speed during the re-solidifying of the melted area. That is, increasing the Sb content to ensure the quick erasure of the amorphous mark during the high linear velocity recording makes the formation of good amorphous marks difficult. In other words, when the speed of recrystallization from around the amorphous mark is increased above a certain level, the recrystallization from around the melted area during the re-solidifying of the melted area formed to record the amorphous mark is also accelerated.

In the composition described above, there is a problem that an attempt to perform erasure at high speed to effect a high linear velocity recording makes the formation of an amorphous mark difficult. In addition, at a high linear velocity the clock period is shortened, reducing the off pulse section and degrading the cooling effect, which in turn renders that problem even more conspicuous.

The composition problem described above is considered relatively not so large with the commonly used conventional $GeTe—Sb_2Te_3$ pseudo-binary alloy-based composition. In the $GeTe—Sb_2Te_3$ pseudo-binary alloy-based composition, the erasure of the amorphous mark is effected mostly by the formation of crystal nuclei within the amorphous mark and not very much by the crystal growth. Further, the formation of crystal nuclei is more active than the crystal growth at low temperatures. Hence, in the $GeTe—Sb_2Te_3$ pseudo-binary alloy-based composition, the recrystallization can be achieved by generating a large number of crystal nuclei even when the crystal growth is relatively slow. Further, during the process of re-solidification at temperatures below the melting point, the crystal nuclei are not generated and the speed of crystal growth is relatively small, so that the recording layer is easily transformed into the amorphous state at a relatively small critical cooling speed.

The recording layer having a composition containing excess Sb in the SbTe eutectic composition, particularly a composition further including Ge, should preferably have a crystal state consisting of a virtually single phase, not accompanied by phase separation. The crystal state can be obtained by performing an initialization operation, which involves heating and crystallizing the recording layer of amorphous state produced at an initial phase of the film deposition process using sputtering. The expression "virtually single phase" means that the recording layer may be formed of a single crystal phase or a plurality of crystal phases and that when it is formed of a plurality of crystal phases, it preferably has no lattice mismatch. When it is formed of a single crystal phase, the recording layer may be multiple crystal layers of the same crystal phase but with different orientations.

The recording layer of such a virtually single phase can improve characteristics, such as reduced noise, an improved storage stability and a greater ease with which crystallization can be effected at high speed. This may be explained as follows. When various crystal phases, including a crystal phase of a hexagonal structure, a cubic crystal such as Sb but with a largely differing lattice constant, a face-centered cubic crystal such as found in AgSbTe2, and other crystal phases belonging to other space groups, exist in a mixed state, a grain boundary with a large lattice mismatch is formed. This is considered to cause disturbances to the peripheral geometry of the mark and also produce optical noise. In the recording layer of a single phase, however, such a grain boundary is not formed.

The type of crystal phase formed in the recording layer depends largely on the initialization method performed on the recording layer. That is, to produce a preferred crystal phase in this invention, the recording layer initializing method should preferably incorporate the following provisions.

The recording layer is normally formed by a physical vacuum deposition such as sputtering. The as-deposited state immediately after the film is formed normally is an amorphous state and thus should be crystallized to assume an unrecorded/erased state. This operation is called an initialization. The initialization operation includes, for example, an oven annealing in a solid phase in a temperature range from the crystallization temperature (normally 150–300° C.) up to the melting point, an annealing using light energy irradiation by a laser beam and light of a flash lamp, and an initialization by melting. To obtain a recording layer of a preferred crystal state, the melting initialization is preferred. In the case of annealing in the solid phase there is a time margin for establishing a thermal equilibrium and thus other crystal phases are likely to be formed.

In the melting crystallization, it is possible to melt the recording layer and then directly recrystallize it during the re-solidification process. Or, it is possible to change the recording layer to the amorphous state during the re-solidification process and then recrystallize it in solid phase at near the melting point. In that case, when the crystallization speed is too slow, it may bring about a time margin for the thermal equilibrium to be established thereby forming other crystal phases. Therefore it is preferred that the cooling speed be increased to some extent.

For example, the time during which to hold the recording layer above the melting point is preferably set normally to 2 μs or less, more preferably 1 μs or less. For the melting initialization a laser beam is preferably used. It is particularly desirable for the initialization to use a laser beam which is elliptical with its minor axis oriented almost parallel in the direction of scan (this initialization method may hereinafter be referred to as a "bulk erase"). In that case, the length of major axis is normally 10–1,000 μm and the minor axis normally 0.1–10 μm. The lengths of major axis and minor axis of the beam are defined as a half width of the light energy intensity distribution measured within the beam. The scan speed is normally about 3–10 m/s. When the scanning is performed at speeds higher than the maximum usable linear velocity at which at least the phase change medium of this invention can be overwrite-recorded, the area that was melted during the initialization scan may be transformed into the amorphous state. Further, scanning at speeds 30% or more lower than the maximum usable linear velocity generally causes a phase separation, making it difficult to produce a single phase. A scan speed 50–80% of the maximum usable linear velocity is particularly preferred. The maximum usable linear velocity itself is determined as the upper limit of a linear velocity that can assure a complete erasure when the medium is irradiated with the Pe power at that linear velocity.

A laser beam source may use a semiconductor laser, a gas laser and others. The power of the leaser beam is normally between approximately 100 mW and 2 W.

During the initialization by the bulk erase, when a disklike recording medium is used, for example, it is possible to match the direction of the minor axis of the elliptical beam almost to the circumferential direction, scan the disk in the minor axis direction by rotating the disk, and move the beam in the major axis (radial) direction for every revolution, thus initializing the whole surface. The distance moved by the beam in the radial direction for each revolution is preferably made shorter than the beam major axis to overlap the scans so that the same radius is irradiated with the laser beam a plurality of times. This arrangement allows for a reliable initialization and avoids an uneven initialized state that would be caused by the energy distribution (normally 10–20%) in the radial direction of the beam. When the distance traveled is too small, other unwanted crystal phases are likely to be formed. Hence, the distance of travel in the radial direction is normally set to ½ or more of the beam major axis.

The melting initialization may also be accomplished by using two laser beams, melting the recording layer with a preceding beam, and recrystallizing the recording layer with the second beam. If the distance between the two beams is long, the area melted by the preceding beam solidifies first before being recrystallized by the second beam.

Whether the melting/recrystallization has been performed or not can be determined by checking whether a reflectance $R1$ of the erased state, after the recording layer has been actually overwritten with an amorphous mark by the recording light about 1 μm across, is virtually equal to a reflectance $R2$ of the unrecorded state after initialization. When a signal pattern for recording amorphous marks intermittently is used, the measurement of $R1$ is carried out after a plurality of overwrites, normally approximately 5 to 100 overwrites, have been performed. This eliminates the influences of the reflectance of the spaces that could remain in the unrecorded state after one recording operation alone.

The above erased state may be obtained, rather than by modulating the focused recording laser beam according to the actual recorded pulse generation method, but by irradiating the recording power DC-wise to melt the recording layer and then resolidifying it.

In the case of the recording medium of this invention, the difference between $R1$ and $R2$ is preferably set as small as possible.

In more concrete terms, it is preferred that a value involving $R1$ and $R2$ which is defined as follows be set 10(%) or less, particularly 5(%) or less.

$$\frac{2|R1 - R2|}{R1 + R2} \times 100(\%)$$

For example, in the phase change medium with $R1$ of around 17%, $R2$ needs to be in the range of 16–18%.

To realize such an initialized state, it is desired that almost the same thermal history as the actual recording condition be given by the initialization.

The single crystal phase obtained by such an initialization method generally tends to be a hexagonal crystal when the Sb/Te ratio is larger than approximately 4.5 and a face-centered cubic crystal when the Sb/Te ratio is less than 4.5. But this does not depend only on the Sb/Te ratio. In the recording at speeds 16 times the CD linear velocity and four times the DVD linear velocity, it is preferred that the recording layer be made of a single phase of hexagonal polycrystal.

The phase change medium of this invention normally has formed on the substrate a lower protective layer, a phase change recording layer, an upper protective layer and a reflection layer. It is particularly preferred to form a so-called rapid cooling structure in which the recording layer is 10–30 nm thick, the upper protective layer is 15–50 nm thick and the reflection layer is 30–300 nm thick. When the recording method of this invention is to be applied to the above optical recording medium, n/m associated with the time lengths of all recording marks should preferably be set to 1.5 or more. Further, n/m is more preferably 1.8 or more. The upper limit of n/m normally is approximately 4, preferably approximately 3, but can change depending on other conditions such as the recording power Pw and the bias power Pb. Basically, n/m needs only to fall in a range that gives a sufficient time length for cooling.

When the optical recording method is to be applied to a write-once type medium, a setting should be made such that Pe=Pb=Pr (Pr is a retrieving light power). It is also possible to set Pe>Pr to provide a residual heat effect.

The recording method of this invention does not depend on the layer structure of the recording medium or the light radiating method, and can be applied not only to a medium which has a layer structure of substrate/protective layer/recording layer/protective layer/reflection layer and in which a retrieve/write laser beam is radiated through the substrate but also to a so-called film-side incident type medium which has a layer structure of substrate/reflection layer/protective layer/recording layer/protective layer and in which the retrieve/write laser beam is radiated from the side opposite the substrate. Further, the recording method of this invention can also be applied to a medium that combines these mediums to form multiple recording layers.

The reflection layer has a function of promoting heat dissipation and enhancing the cooling speed. Hence, in the recording medium of this invention, the selection of the reflection layer is important. Specifically, it is preferred in this invention that a reflection layer used have a high heat dissipating effect.

The thermal conductivity of the reflection layer is considered to be nearly inversely proportional to its volume resistivity and the heat dissipating effect of the reflection layer is proportional to the film thickness. So, the heat dissipating effect of the reflection layer is considered generally to be inversely proportional to the sheet resistivity. In this invention, therefore, a reflection layer with a sheet resistivity of 0.5Ω/□ or less, particularly 0.4Ω/□ or less, is preferably used. The volume resistivity is preferably in the range of between approximately 20 nΩ·m and 100 nΩ·m. A material with too small a volume resistivity is practically not usable. A material with too large a volume resistivity tends not only to have a poor heat dissipating effect but to degrade the recording sensitivity.

Possible materials for the reflection layer include aluminum, silver and alloys of these materials as main components.

Examples of aluminum alloy that can be used for the reflection layer are aluminum alloys having added to Al at least one of Ta, Ti, Co, Cr, Si, Sc, Hf, Pd, Pt, Mg, Zr, Mo and Mn. The contents of the additive elements are normally between 0.2 atomic % and 1 atomic %. When these contents are too small, hillock resistance tends to be insufficient; and when they are too large, the heat dissipating effect tends to deteriorate.

Examples of silver alloy that can be used for the reflection layer are silver alloys having added to Ag at least one of Ti, V, Ta, Nb, W, Co, Cr, Si, Ge, Sn, Sc, Hf, Pd, Rh, Au, Pt, Mg, Zr, Mo and Mn. The additive elements are preferably at least one of Ti, Mg, Pd and Cu metal elements in terms of enhancing the time-dependent stability. The contents of the additive elements are normally between 0.2 atomic % and 3 atomic %. When these contents are too small, the corrosion resistance tends to deteriorate; and when they are too large, the heat dissipating effect tends to deteriorate.

The volume resistivity increases in proportion to the contents of the added elements in the Al alloy and to the contents of the added elements in the Ag alloy.

The reflection layer is normally formed by sputtering and vacuum deposition methods. Because the total amount of impurities in the reflection layer, including water and oxygen trapped therein during the film making, should preferably be 2 atomic % or less, it is desired that the vacuum level in the process chamber used for forming the layer be set to $1 \times 10^{-3}$ Pa or less. To reduce the amount of impurities trapped, the deposition rate is preferably set to 1 nm/sec or higher, particularly 10 nm/sec or higher. The amount of impurities trapped also depends on the method of manufacture of an alloy target used in the sputtering and on the sputter gas (rare gas such as Ar, Ne and Xe).

To enhance the heat dissipating effect of the reflection layer, the material of the reflection layer preferably consists of only aluminum and silver, as practically as possible.

The reflection layer may be formed in multiple layers to increase the heat dissipating effect and the reliability of the medium.

For example, when the reflection layer is made mainly of silver which has a large heat dissipating effect and a protective layer containing sulfur is provided between the reflection layer and the recording layer, the influences of silver and sulfur may pose problems with the repetitive overwrite characteristic and with a corrosion resistance under an accelerated test environment at high temperature and humidity. To avoid these problems an interface layer formed of an aluminum-based alloy can be provided between these two layers so that a 2-layer reflection layer consisting of an aluminum layer and a silver layer can be obtained. In that case, the thickness of the interface layer is normally between approximately 5 nm and 100 nm, preferably between 5 nm and 50 nm. When the interface layer is too thin, the protective effects tends to be insufficient; and when it is too thick, the heat dissipating effect tends to deteriorate.

Forming the reflection layer in multiple layers is effective also for obtaining a desired sheet resistivity at a desired thickness of layer.

Now, the present invention will be explained in detail by taking example embodiments. It should be noted that the invention is not limited to these embodiments but can be applied to whatever applications are within the spirit of the invention.

Embodiment 1

Over a polycarbonate substrate 1.2 mm thick formed with a tracking groove (track pitch of 1.6 μm, groove width of about 0.53 μm, and groove depth of about 37 nm), a $(ZnS)_{80}(SiO_2)_{20}$ protective layer was deposited to a thickness of 70 nm, a $Ge_5Sb_{77}Te_{18}$ recording layer to 17 nm, a $(ZnS)_{85}(SiO_2)_{15}$ protective layer to 40 nm, and an $Al_{99.5}Ta_{0.5}$ alloy to 220 nm by sputtering in the vacuum chamber. An ultraviolet curing protective coat was applied over this substrate to a thickness of 4 μm and cured to manufacture a phase change type rewritable optical disk.

This rewritable disk was subjected to the initial crystallization process using a bulk eraser with a laser waveform of 810 nm and a beam diameter of about 108 μm×1.5 μm at a power of 420 mW. Further in an evaluation apparatus having a laser wavelength of 780 nm and a pickup numerical aperture NA of 0.55, the grooves and the lands were crystallized once with a DC light of 9.5 mW by activating a servo to reduce noise of the crystal level.

Then, in the evaluation apparatus with a laser wavelength of 780 nm and a pickup numerical aperture NA of 0.55, the grooves were overwritten with an EFM modulation random pattern under the conditions: linear velocity of 12 m/s (×10-speed of CD), base clock frequency of 43.1 MHz, and reference clock period T of 23.1 nanoseconds. The EFM modulation scheme uses marks having time lengths ranging from 3T to 11T. A pattern in which these marks with different mark time lengths are randomly generated is an EFM modulation random pattern.

These patterns were overwrite-recorded by using the above-described pulse division scheme 3 (the division number is set to m=1, 2, 2, 3, 3, 4, 5, 5, 5 for n=3, 4, 5, 6, 7, 8, 9, 10, 11) with the recording power Pw set to 18 mW, the erase power Pe to 9 mW and the bias power Pb=retrieving power Pr to 0.8 mW. This pulse division scheme was able to be realized by slightly changing the pulse generating circuit of FIG. 1.

Retrieving was done at a speed of 2.4 m/s (×2-speed of CD) and the retrieve signal was passed through a 2-kHz high frequency pass filter and then DC-sliced and retrieve by taking the center of the signal amplitude as a threshold value.

Before performing the overwrite, the pulse division scheme was optimized in each of the mark time lengths ranging from 3T to 11T. Specifically, the first recording pulse section $\alpha_1 T$ and the last off pulse section $\beta_m T$ were optimized.

An example case is shown in which an 11T mark (1.27 microseconds at ×2-speed) was divided into five parts and the recording pulse widths and off pulse widths were determined.

Figure 6:
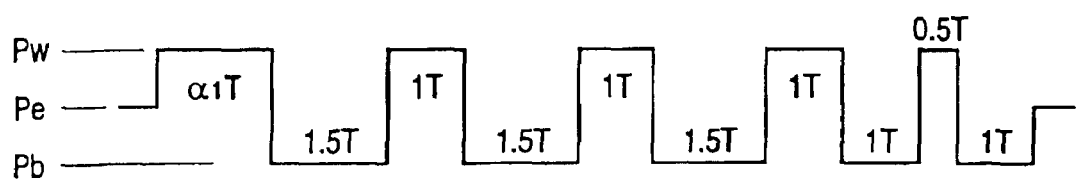
FIG. 6 is an example of division scheme of a recording pulse for an 11T mark according to an embodiment of the invention.
Figure 6:
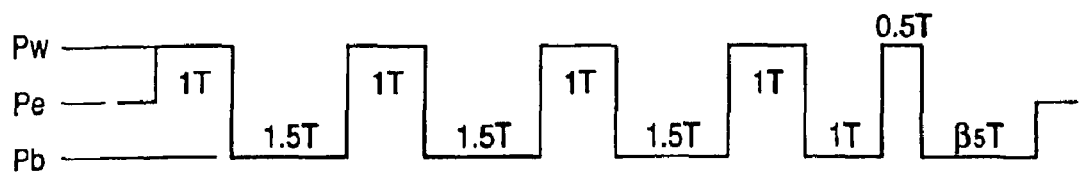
Figure 6:
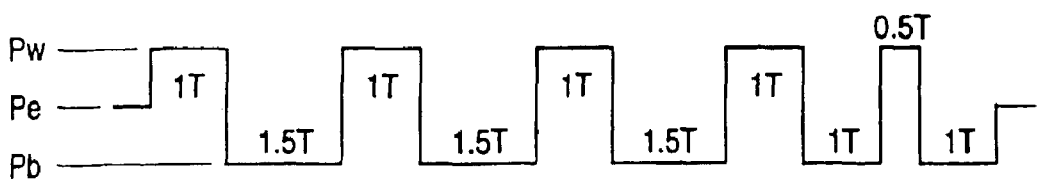
Figure 7:
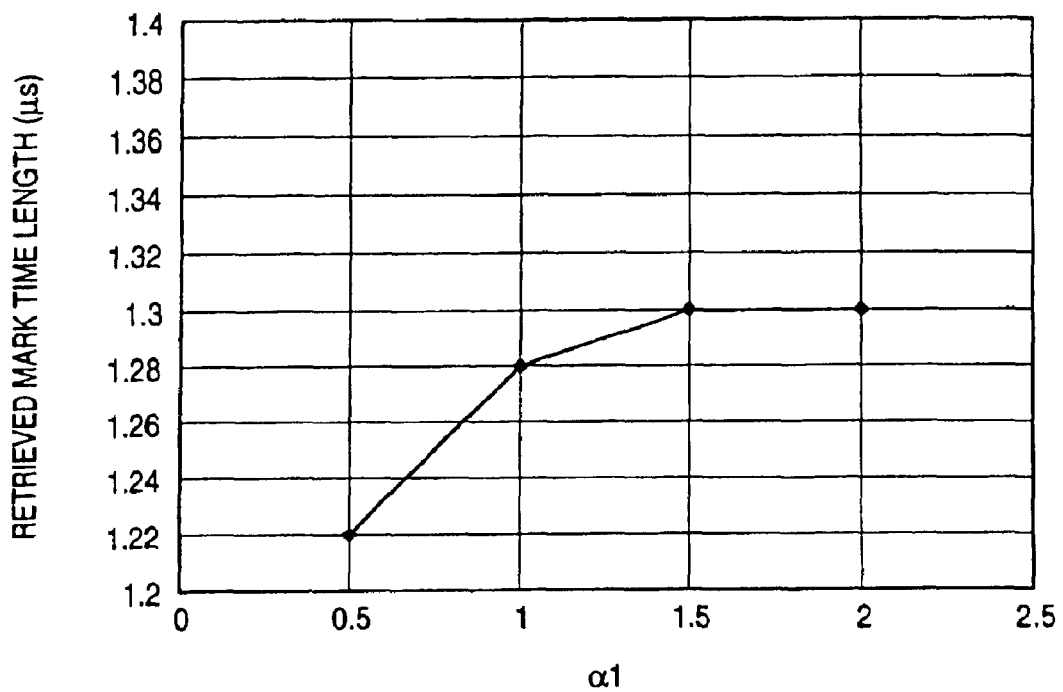
FIG. 7 is a graph showing a relation between $\alpha_1$ and a mark time length in the embodiment 1 of the invention.

Using the pulse division scheme shown in FIG. 6(*a*), the pulse widths were recorded by changing only $\alpha_1$. The $\alpha_1$-dependency of the retrieve mark time length at the linear velocity of 2.4 m/s is shown in FIG. 7. For $\alpha_1=1.0$, the mark time length was 1.28 microseconds, which was most preferable. The theoretical value is 1.27 microseconds.

Figure 8:
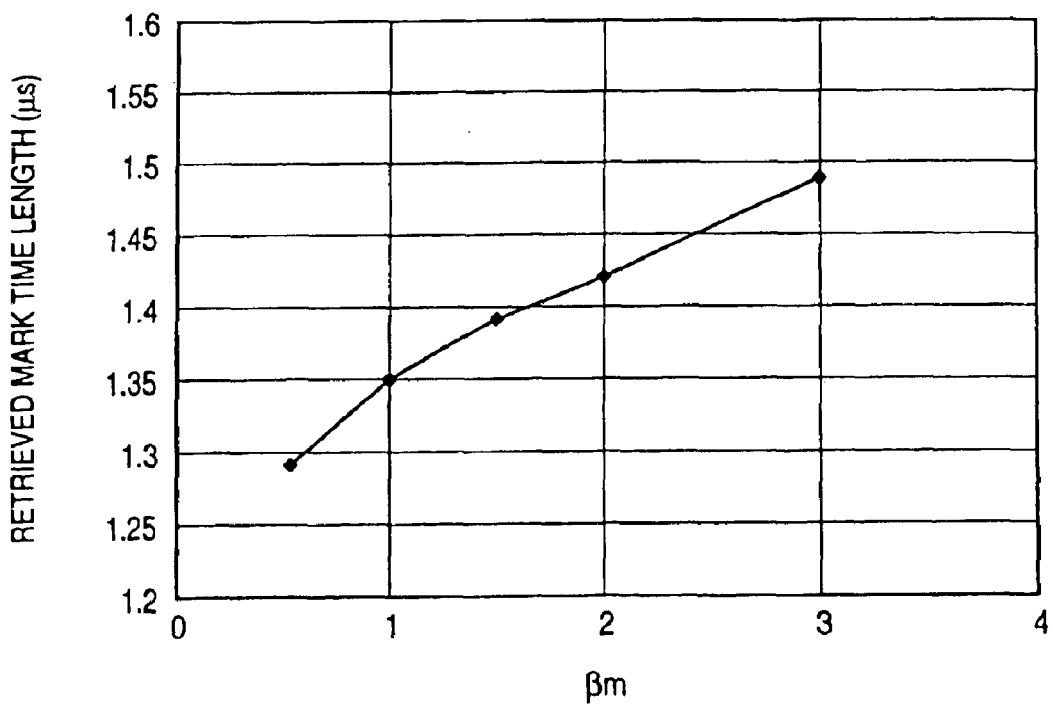
FIG. 8 is a graph showing a relation between $\beta_m$ and a mark time length in the embodiment 1 of the invention.

Similarly, using the pulse division scheme shown in FIG. 6(*b*), measurements were made of the $\beta_m$ (m=5) dependency. FIG. 8 shows the $\beta_m$-dependency of the retrieve mark time length at the linear velocity of 2.4 m/s equivalent to two times the CD linear velocity. For $\beta_m=\beta_5=1.0$, the mark time length was 1.35 microseconds.

These experiments were conducted on the marks having respective mark time lengths in order to optimize, in particular, the first recording pulse $\alpha_1$ and the last off pulse $\beta_5$. The pulse division scheme shown in FIG. 9 was determined. For the long marks with 8T to 11T lengths, $\alpha_1=1.0$ and $\beta_m=1.0$ were set.

Figure 9:
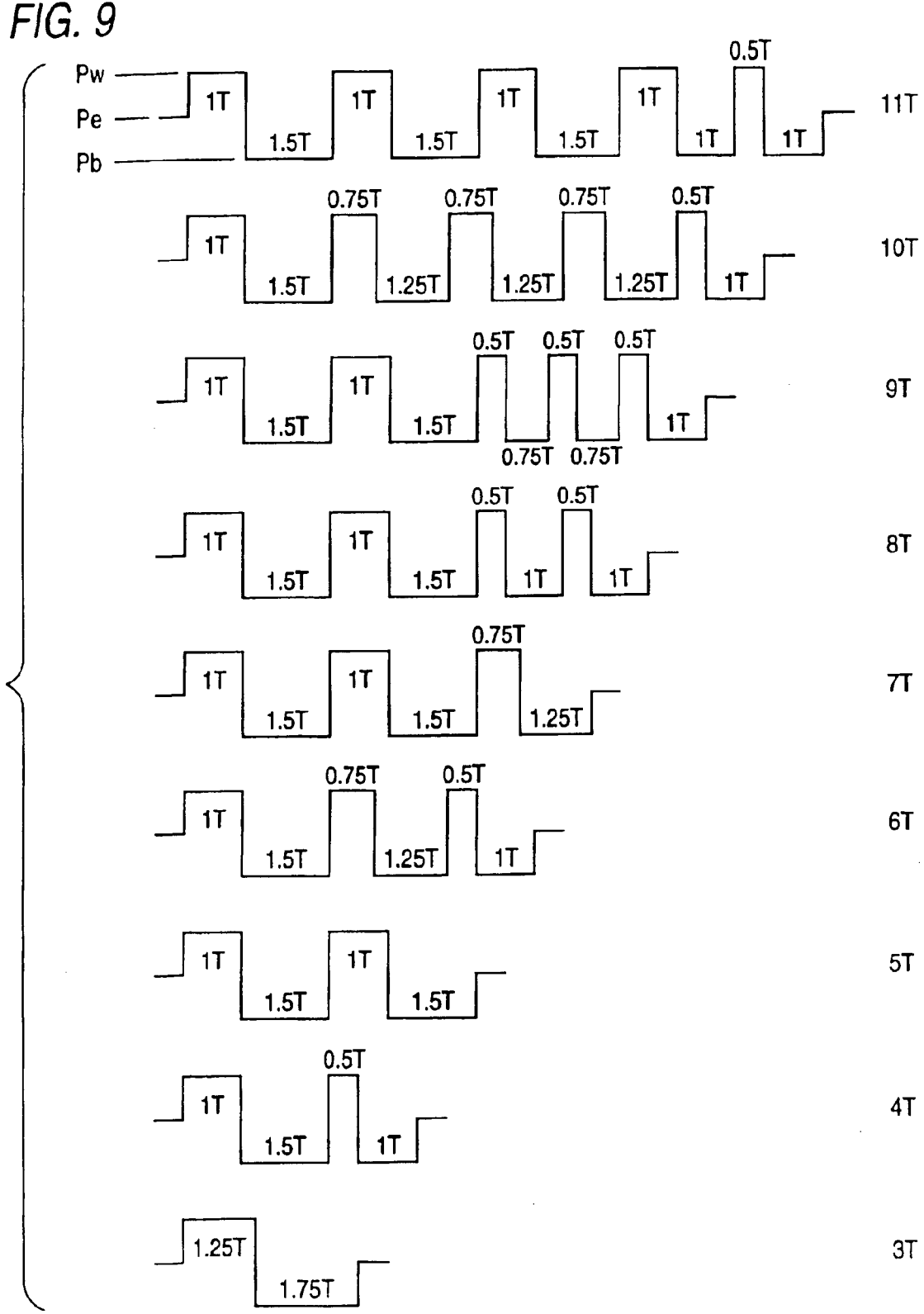
FIG. 9 is an example of division scheme of a recording pulse for an EFM random pattern in the embodiment 1 of the invention.
Figure 10:
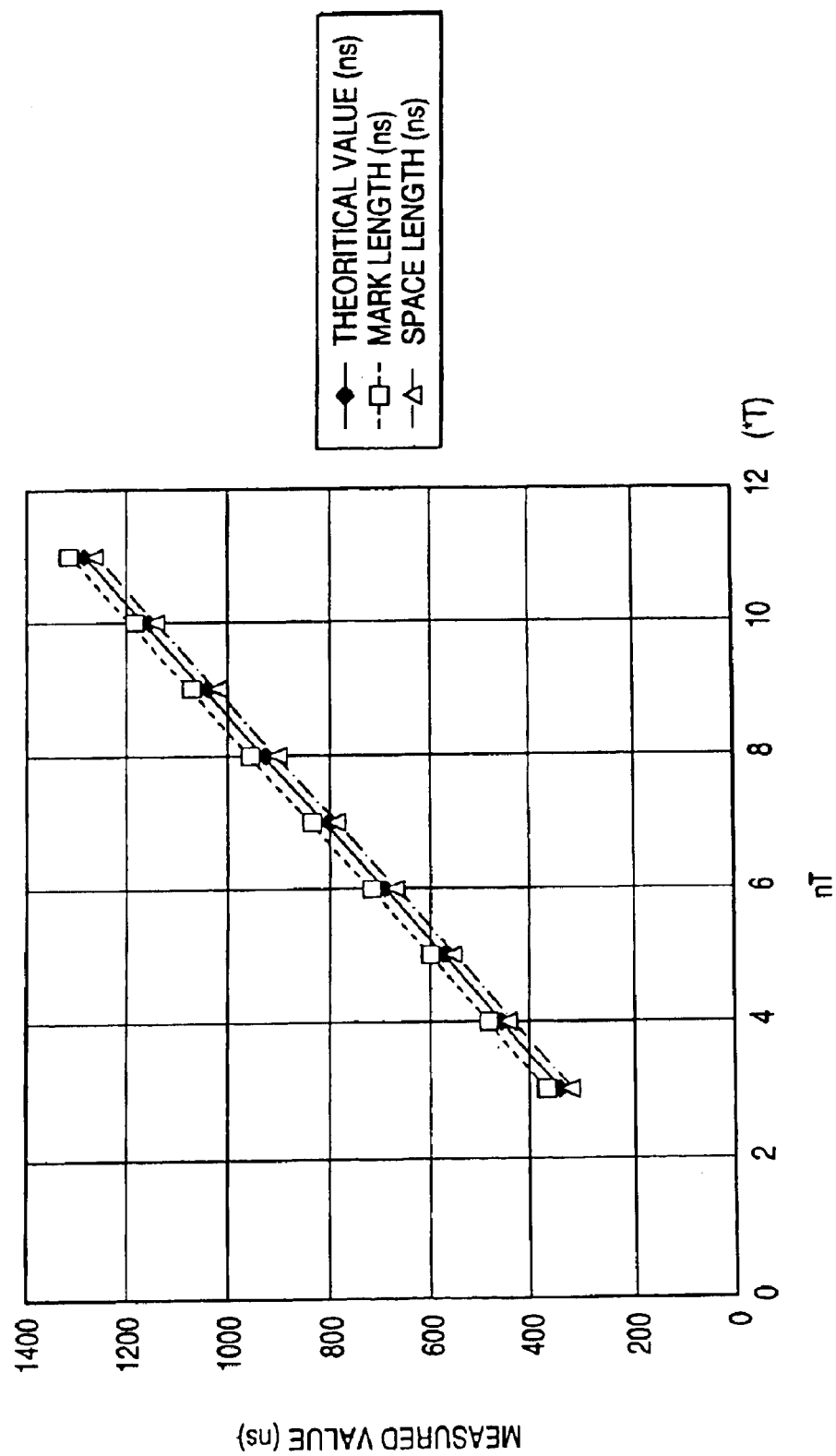
FIG. 10 is a graph showing a relation of measured values of mark time length/space time length with respect to theoretical values in the embodiment 1 of the invention.

After the optimization, the pulse division scheme of FIG. 9 was used to overwrite the amorphous marks in the crystal area. The measurements of the mark time lengths of the retrieve signals for individual input signals of nT marks are shown in FIG. 10. The mark length change was linear and the mark length deviation of the retrieve marks was in a range that allows the 3T–11T marks to be correctly distinguished and detected. The jitter value here was low, well below the CD standard's jitter upper limit of 17.5 nanoseconds for the ×2-speed reproduction, and the modulation was 0.6 or higher. This indicates that the recording signal thus obtained was satisfactory. In the figure, the mark length refers to a mark time length and the space length refers to a space time length.

Next, by using the pulse division scheme of FIG. 9, the EFM random signal was overwritten. The random signal was generated using AWG520 manufactured by Sony Techtronix. At this time the pulse division was optimized for each mark length. As a result, even when the random signals were generated, desired mark lengths and satisfactory mark length jitter and space length jitter below 17.5 ns were obtained during the reproduction at ×2-speed.

When the random pattern was recorded, it was verified by a transmission electron microscope that the nT marks were not divided into a plurality of amorphous portions but formed into a continuous amorphous mark.

Embodiment 2

Over a polycarbonate substrate 1.2 mm thick formed with a tracking groove (track pitch of 1.6 µm, groove width of about 0.53 µm, and groove depth of about 37 nm), a $(ZnS)_{80}(SiO_2)_{20}$ protective layer was deposited to a thickness of 70 nm, a $Ge_7Sb_{79}Te_{14}$ recording layer to 17 nm, a $(ZnS)_{85}(SiO_2)_{15}$ protective layer to 40 nm, and an $Al_{99.5}Ta_{0.5}$ alloy to 220 nm by sputtering in the vacuum chamber. An ultraviolet curing protective coat was applied over this substrate to a thickness of 4 µm and cured to manufacture an optical disk.

This rewritable disk was subjected to the initial crystallization process using a bulk eraser with a laser waveform of 810 nm and a beam diameter of about 108 µm×1.5 µm at a power of 420 mW. Further in an evaluation apparatus having a laser waveform of 780 nm and a pickup numerical aperture NA of 0.55, the grooves and the lands were crystallized once with a DC light of 9.5 mW by activating a servo to reduce noise of the crystal level.

Then, in the evaluation apparatus with a laser waveform of 780 nm and a pickup numerical aperture NA of 0.55, the grooves were recorded with amorphous marks 11T in time length by using the pulse division scheme shown in FIG. 6(*c*) under the conditions: linear velocity of 19.2 m/s (×16-speed of CD), base clock frequency of 69.1 MHz, and reference clock period T of 14.5 nanoseconds.

The overwrite-recording was performed using the recording power Pw of 18 mW, the erase power Pe of 9 mW and the bias power Pb=retrieving power Pr of 0.8 mW.

The retrieving was performed at 2.4 m/s (×2-speed of CD) and the retrieved signal was passed through a 2-kHz high frequency pass filter and then DC-sliced and retrieve by taking the center of the signal amplitude as a threshold value.

The mark jitter was 13.1 nanoseconds and the space jitter 13.2 nanoseconds, well below the CD standard's jitter upper limit of 17.5 nanoseconds.

An EFM modulation random pattern was recorded and retrieved in a manner similar to the embodiment 1. The result was satisfactory.

Example for Comparison 1

In the evaluation apparatus with a laser waveform of 780 nm and a pickup numerical aperture NA of 0.55, the disk manufactured in the embodiment 2 was recorded with amorphous marks 11T in time lengths and spaces 11T in time length alternately by using the n–k division scheme (m=n–k, n=1, the minimum of n/m is 1.1) of FIG. 11 currently employed in the CD-RW, under the conditions: linear velocity of 19.2 m/s (×16-speed of CD), base clock frequency of 69.1 MHz, and reference clock period T of 14.5 nanoseconds.

The overwrite-recording was performed using the recording power Pw of 18 mW, the erase power Pe of 9 mW and the bias power Pb=retrieving power Pr of 0.8 mW.

When the signal was retrieved at the linear velocity of 2.4 m/s, the reflectance corresponding to a central portion of the mark of the retrieved signal did not fall sufficiently. Examination of the mark found that the central portion of the mark was significantly recrystallized. The jitter exceeded the 17.5-nanosecond limit substantially and was too high to be measured. To prevent recrystallization, the recording pulse widths were narrowed while still in the n−1 division scheme but the modulation of the recording laser beam could not follow the narrowed pulses, resulting in an increased recording power Pw and showing no improvements in the cooling effect.

Embodiment 3

Over a polycarbonate substrate 1.2 mm thick formed with a tracking groove, which has a track pitch of 1.6 µm, a groove width of about 0.53 µm and a groove depth of about 37 nm, a $(ZnS)_{80}(SiO_2)_{20}$ protective layer was deposited to a thickness of 70 nm, a $Ge_7Sb_{78}Te_{15}$ recording layer to 17 nm, a $(ZnS)_{80}(SiO_2)_{20}$ protective layer to 45 nm, and an $Al_{99.5}Ta_{0.5}$ alloy reflection layer to 220 nm (volume resistivity of about 100 nΩ·m and sheet resistivity of 0.45 Ω/□) by sputtering in the vacuum chamber. An ultraviolet curing resin protective coat was applied over this substrate to a thickness of 4 µm. A guide groove for tracking was given groove meanders 30 nm in amplitude (peak-to-peak) which were formed by frequency modulating a 22.05-kHz carrier wave by ±1 kHz. That is, address information was provided in the form of so-called ATIP along the spiral groove.

As in the embodiment 1 and 2, the disk was arranged so that a major axis of a focused laser beam was oriented in the direction of the disk radius, the laser beam having a wavelength of about 810 nm and an elliptical shape about 108 µm in major axis by about 1.5 µm in minor axis. The disk was scanned at a linear velocity of 3–6 m/s and irradiated with a power of 400–600 mW for initialization. Further, in the evaluation apparatus with a laser wavelength of 780 nm and a pickup numerical aperture NA of 0.55, a servo was activated to crystallize the grooves and the lands once with 9.5 mW of DC light to reduce the noise of the crystallization level.

For the retrieve/write evaluation, a Pulsetech DDU1000 (wavelength of 780 nm, NA=0.55) was used to write into and retrieve from the grooves. The retrieving was performed at ×2-speed irrespective of the linear velocity used for recording. The jitter tolerance value for the CD format in this case is 17.5 nanoseconds. As a signal source for generating gate signals, an arbitrary waveform signal source AWG520 of Sony Techtronix made was used.

First, the recording was made at a linear velocity 16 times the CD linear velocity (19.2 m/s) and the reference clock period T was 14.5 nanoseconds.

(1) First, the optimum condition for the intermediate pulse group was studied by using the divided recording pulses of FIG. 14. The recording power $Pw_i$ was set constant at 20 mW, the bias power $Pb_i$ was also set constant at 0.8 mW and the erase power Pe for spaces was set to 10 mW.

As shown in FIG. 14(a), in the divided recording pulses having constant $\alpha_i=1$, $\beta_i$ was set to $\beta c$ (constant value) and then changed to examine the dependency of the amorphous mark formation on the off pulse section length.

Figure 3:
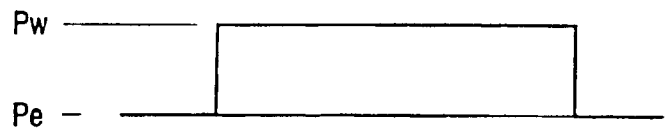
FIG. 3 is a schematic diagram showing a shape of a recorded mark and a change of reflectance in a phase change optical recording medium.
Figure 3:
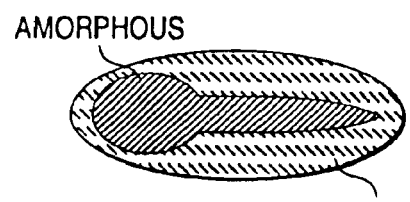
Figure 3:
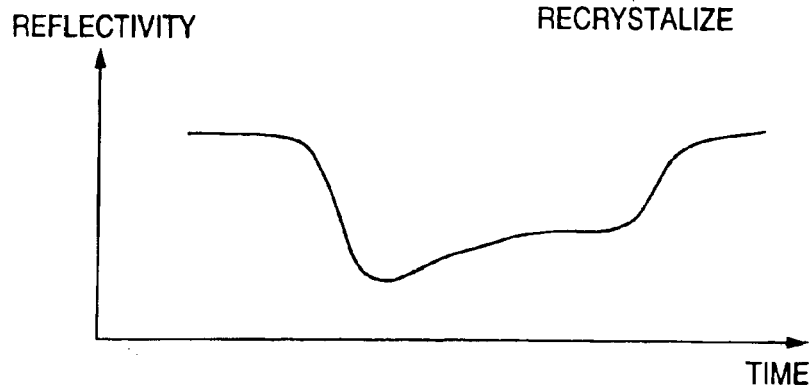
Figure 3:
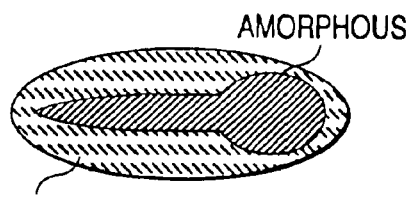
Figure 3:
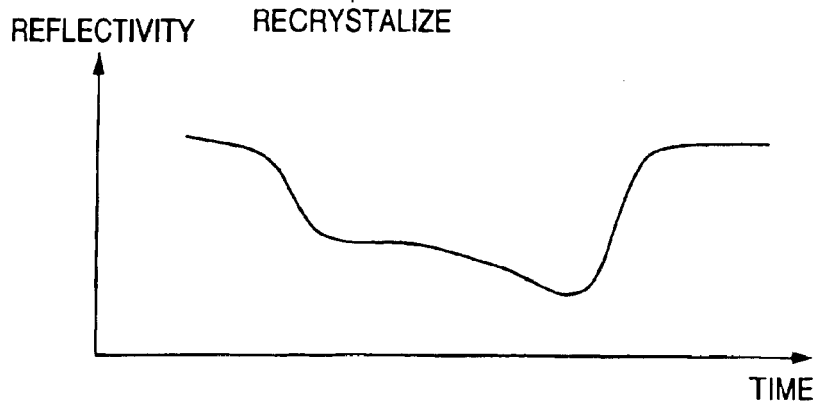
Figure 4:
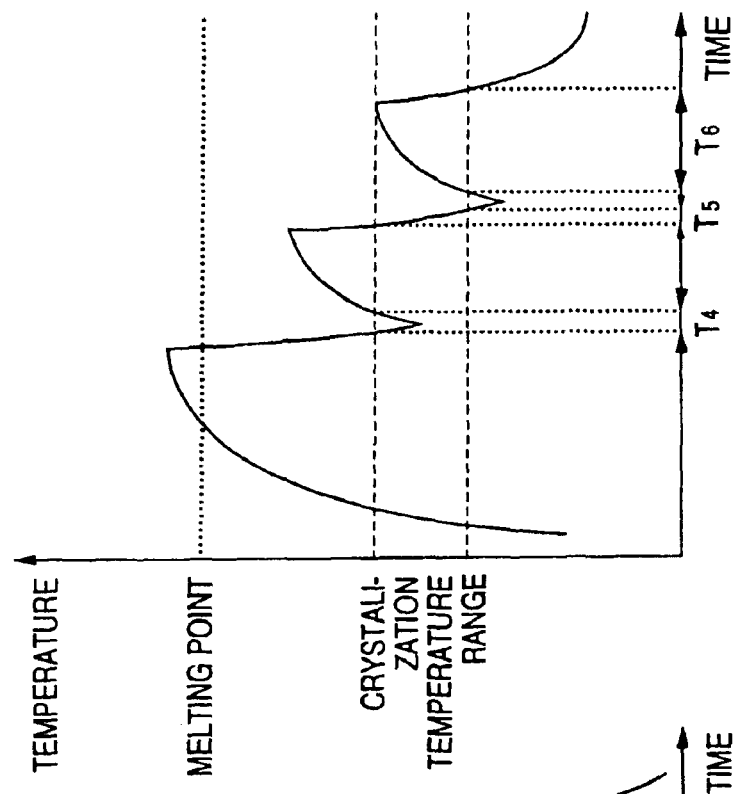
FIG. 4 is an example of temperature history when recording light is radiated against the recording layer of the phase change optical recording medium.
Figure 4:
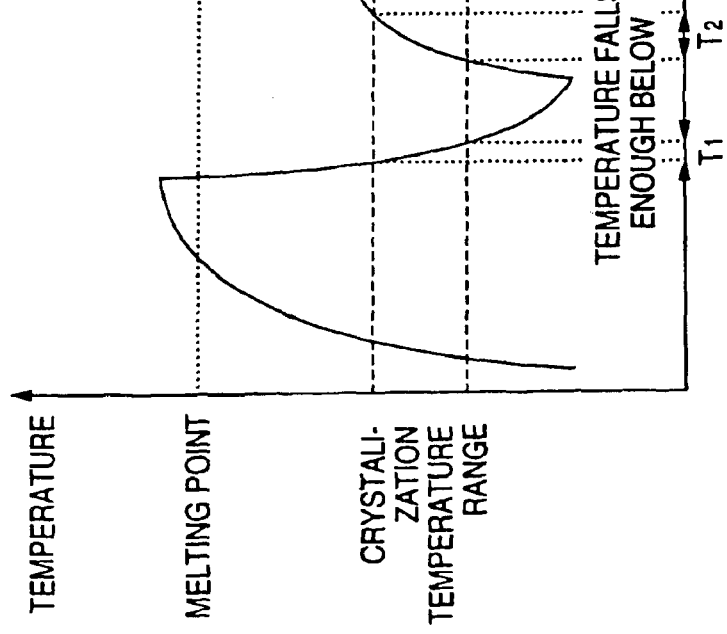
Figure 15:
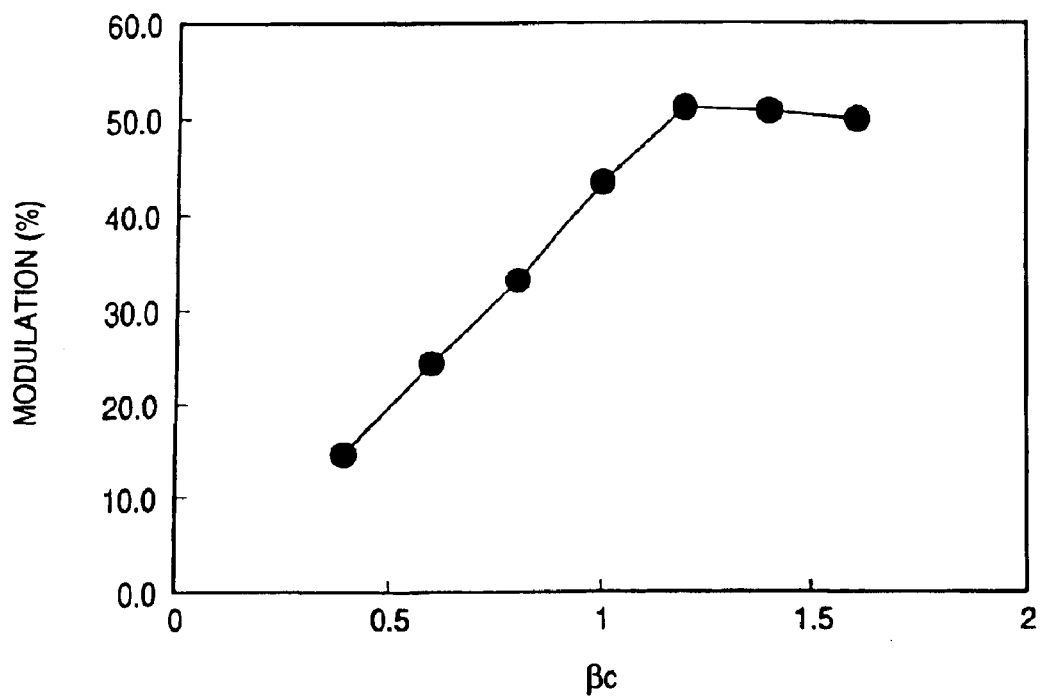
FIG. 15 is a graph showing a dependency of a modulation in (1) of embodiment 3.
Figure 15:
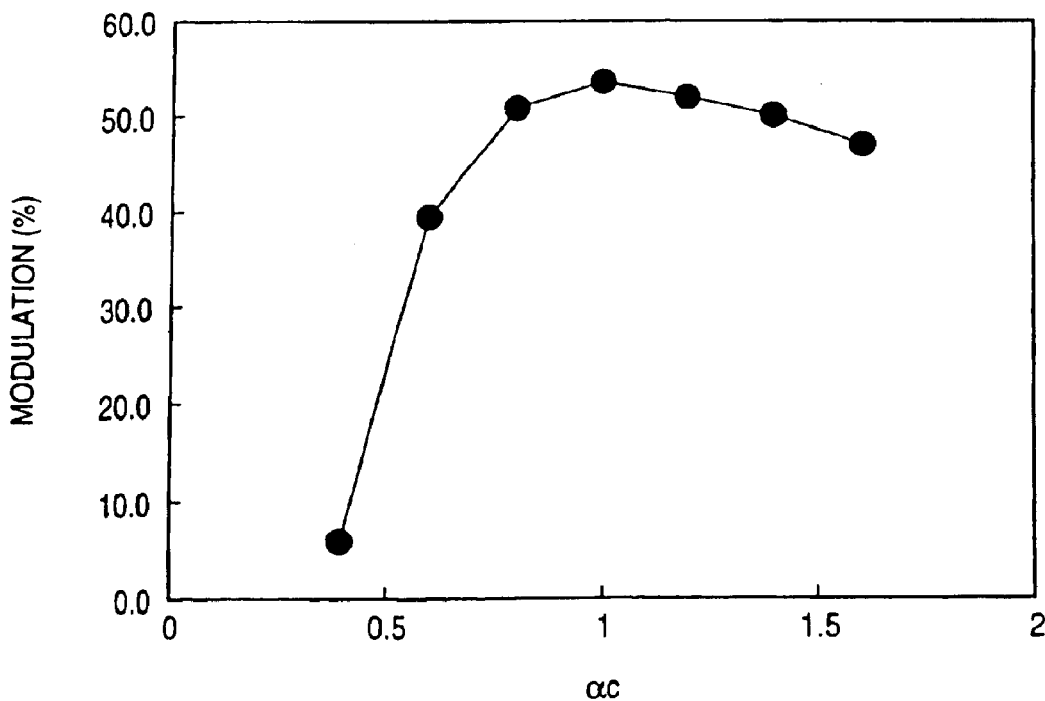

When the off pulse section was shorter than about 1T, the signal amplitude at the front end of the mark was low due to the recrystallization at the mark front end as shown in FIG. 3(d). At the rear end, too, the amplitude was somewhat low. The maximum amplitude in the entire mark length divided by the erase level signal intensity (×100%) was defined as a modulation, and the dependency of the modulation on the off pulse section is shown in FIG. 15(a). It is seen that when the off pulse section was short, the modulation deteriorated due to the influence of the waveform distortion (bad formation of the amorphous mark). When the off pulse section exceeded 1T, the modulation became saturated, producing a waveform close to a rectangular wave without distortion.

Next, using the divided recording pulses as shown in FIG. 14(b) with the off pulse section set to 1.5T, the dependency of the modulation on the recording pulse section was examined. In FIG. 14(b), $\alpha_i$ was set to $\alpha c$ (a constant value) and changed uniformly. FIG. 15(b) shows the $\alpha c$-dependency of modulation. It is seen that a nearly saturated modulation was obtained for $\alpha c=1$ to 1.5.

Figure 16:
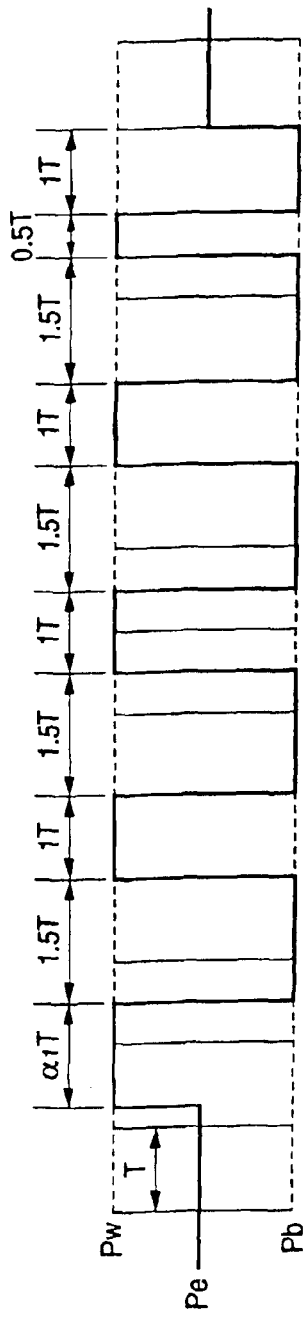
FIG. 16 is an explanatory diagram showing a pulse division scheme in (2) of embodiment 3.
Figure 16:
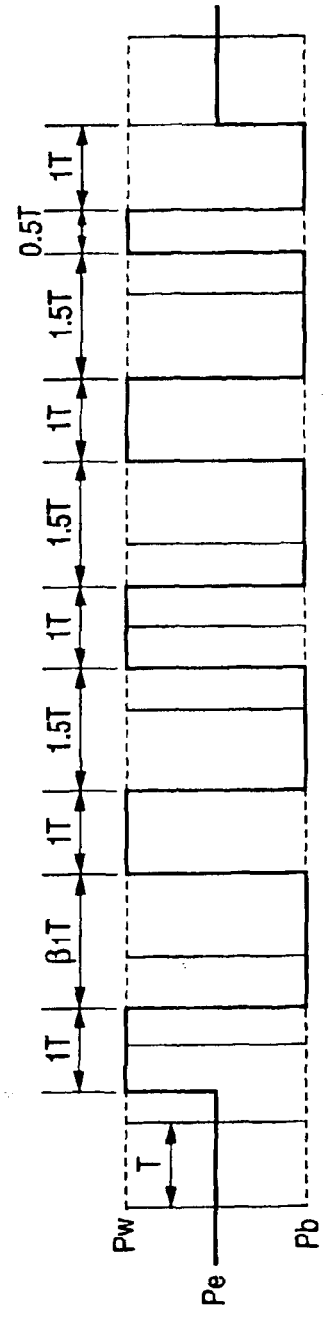
Figure 16:
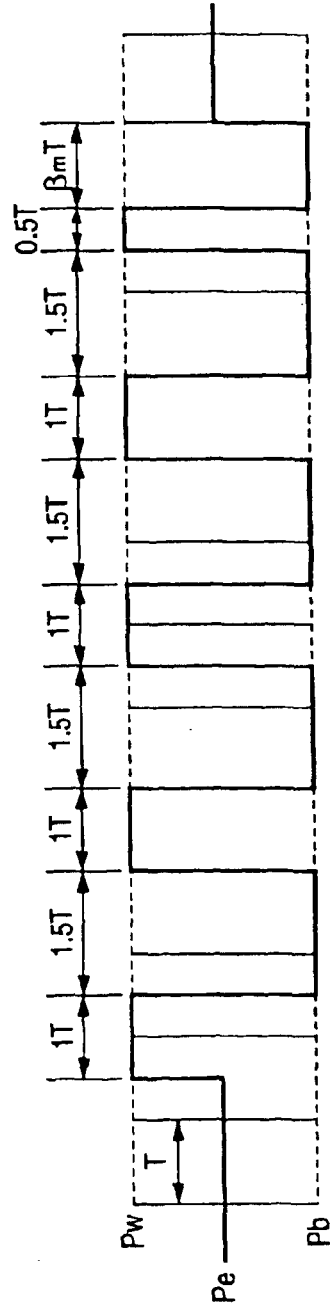
Figure 17:
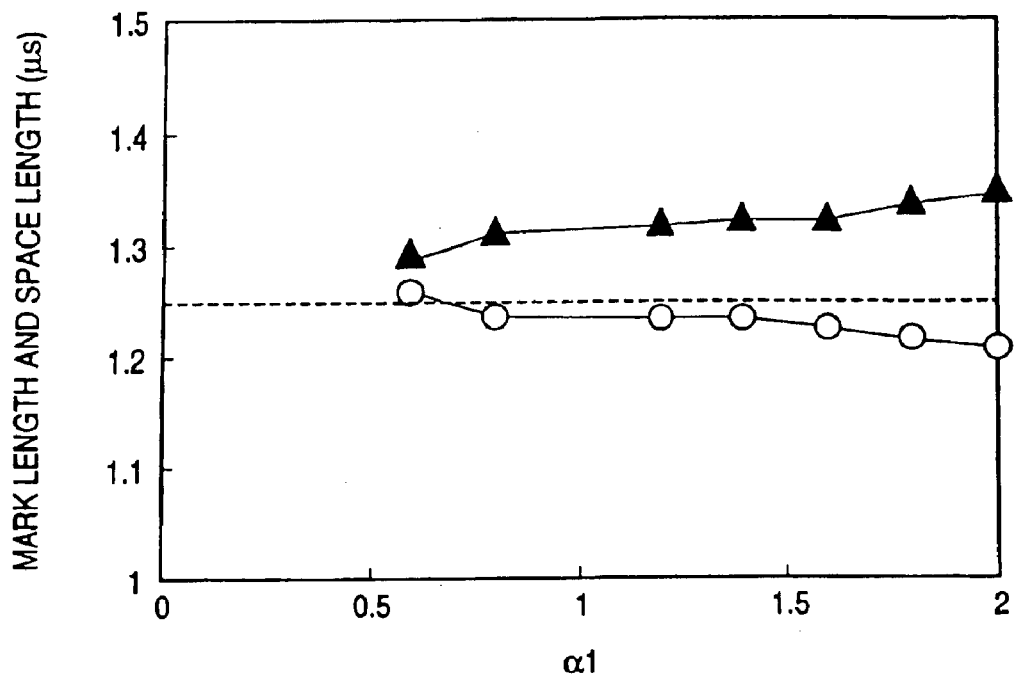
FIG. 17 is a graph showing a dependency of at of $\alpha_1$ mark length (-▲-) and a space length (-○-) in (2) of embodiment 3.
Figure 17:
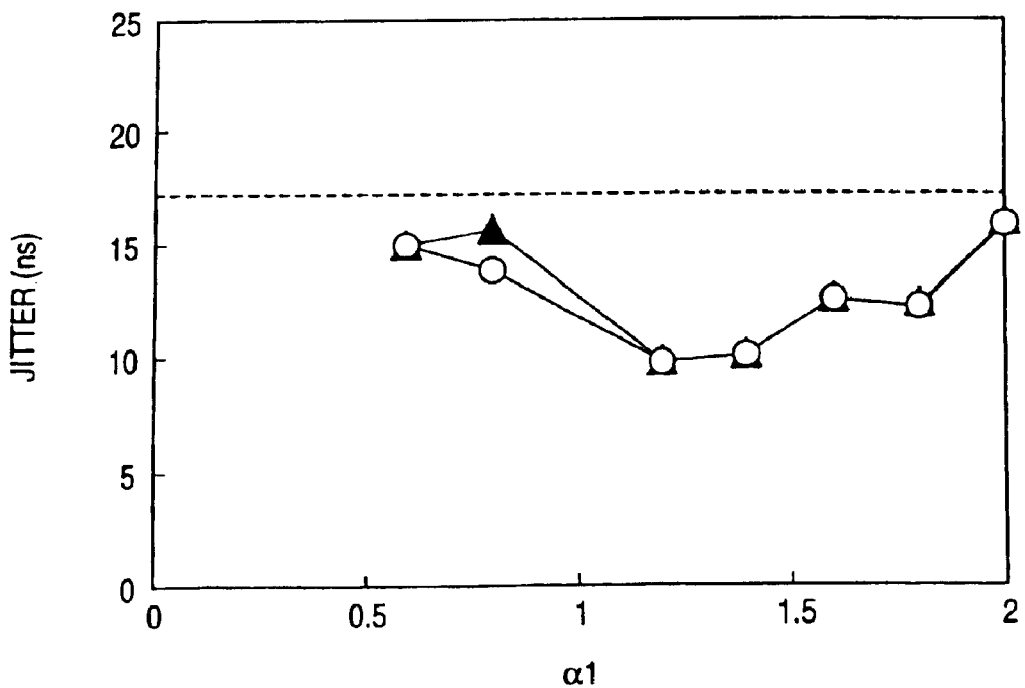
Figure 18:
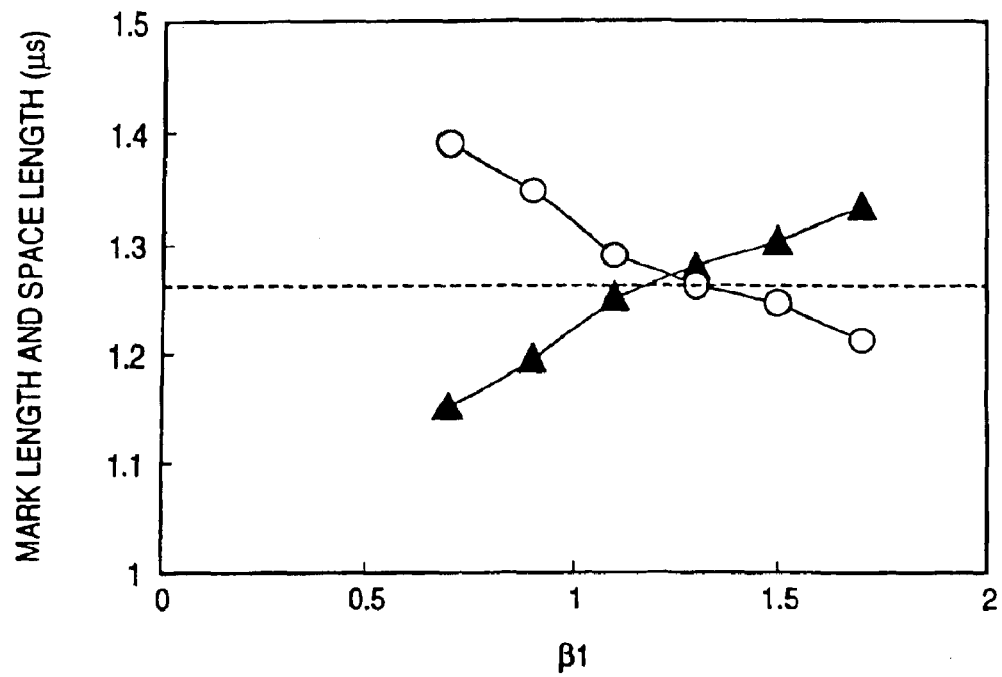
FIG. 18 is a graph showing a dependency of of $\beta_1$ mark length (-▲-) and a space length (-○-) in (2) of embodiment 3.
Figure 18:
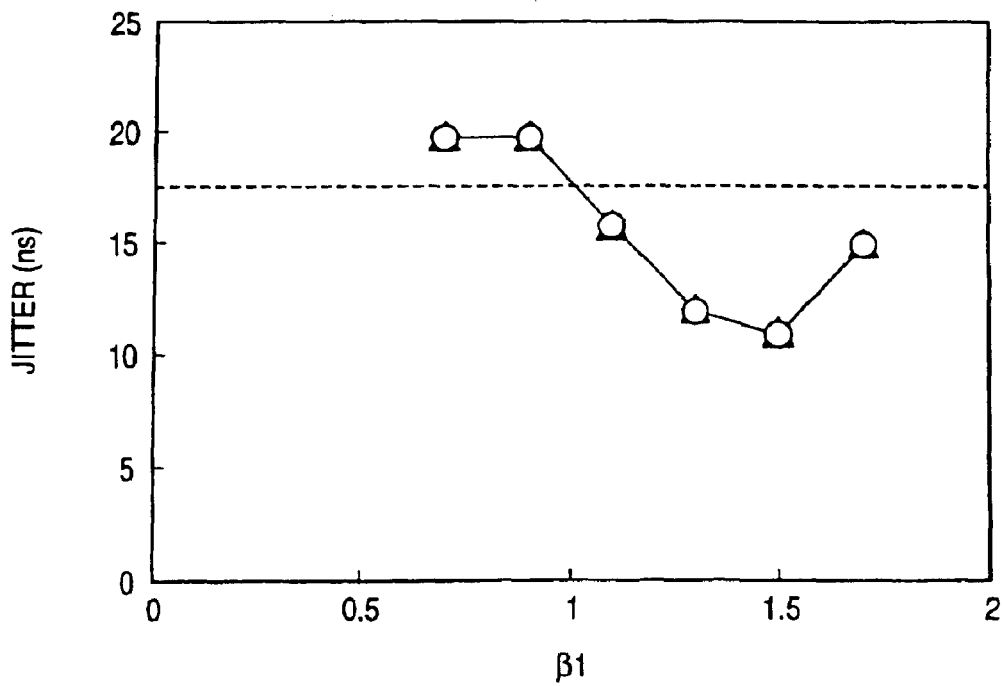
Figure 19:
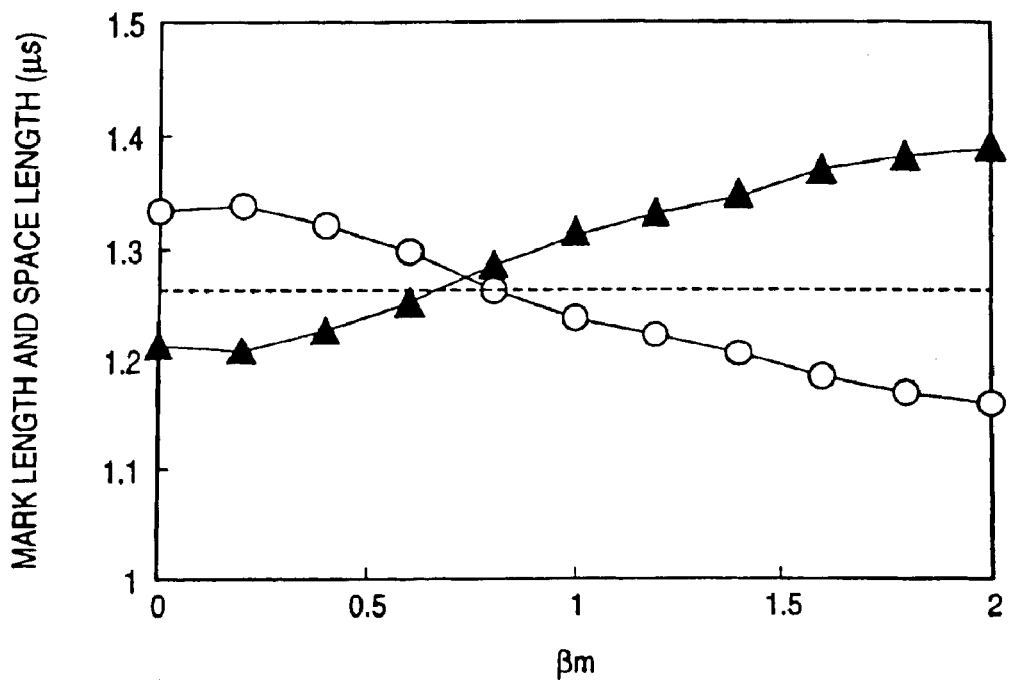
FIG. 19 is a graph showing a dependency of $\beta_m$ of a mark length (-▲-) and a space length (-○-) in (2) of embodiment 3.
Figure 19:
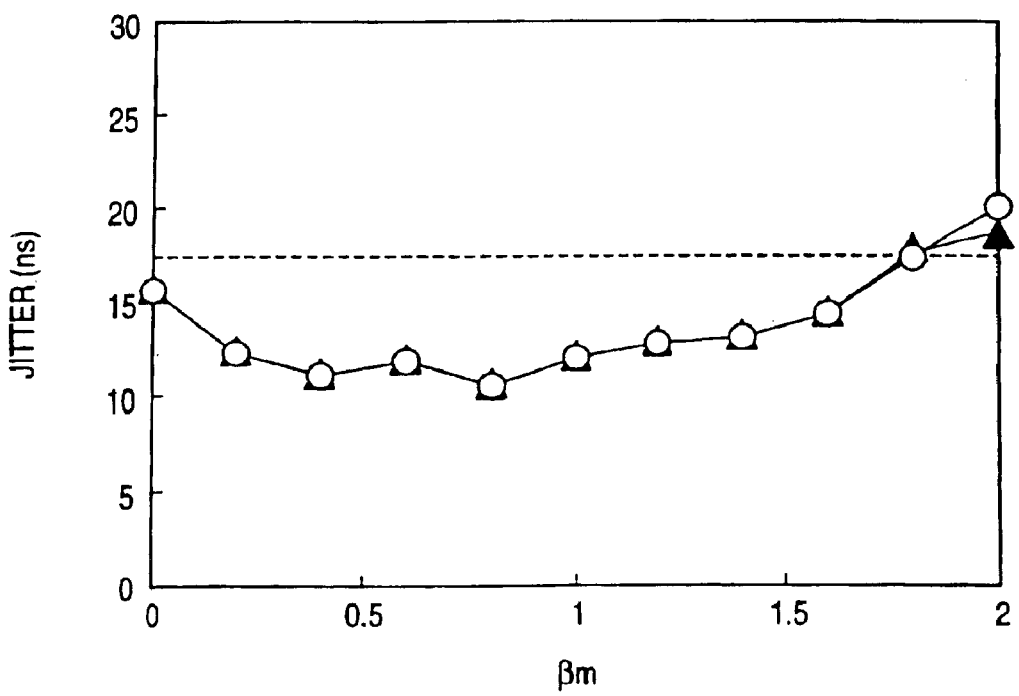

(2) Next, the divided recording pulses of FIG. 16 with the intermediate pulse group fixed to $\alpha_i=1$ and $\beta_i=1.5$ were used and the control of the mark length and the characteristic of the mark end was examined by controlling the first period and the last period. In FIG. 16, one 0.5T recording pulse section was added at the rear end of the mark to make the mark length close to 11T accurately. This made both of the mark length and the space length assume 11T and the condition for obtaining a satisfactory jitter was searched. The original waveform was a repetitive pattern of the 11T mark and the 11T space, with the first recording pulse rising in synchronism with the front end of the 11T mark. Here, because the ×2-speed retrieving was performed, the upper limit of the jitter allowable value was 17.5 nanoseconds (ns) and the 11T was equivalent to about 1.27 microseconds (µs). FIGS. 17, 18 and 19 show these values with dotted lines.

Using the divided recording pulses as shown in FIG. 16(a), the dependency on the front recording pulse $\alpha_1$ length was checked. FIGS. 17(a) and 17(b) represent the $\alpha_1$-dependency of the mark length and space length and the $\alpha_1$-dependency of the mark jitter and the space jitter, respectively. It is seen from FIG. 17(b) that $\alpha_1$ is preferably set to 0.8–1.8 to keep the jitter below 17.5 nanoseconds.

In FIG. 17(b) the desired 11T was not obtained for the mark length and space length. So, $\alpha_1$ was set to $\alpha_1=1$, and the divided recording pulses as shown in FIG. 16(b) were used to examine the dependency on the first off pulse $\alpha_1T$ length. FIGS. 18(a) and 18(b) represent the $\beta_1$-dependency of the mark length and the space length and the $\beta_1$-dependency of the mark jitter and the space jitter, respectively. It is seen that almost the desired mark length and space length were obtained for $\beta_1=1.3$ and that satisfactory jitters were obtained for a $\beta_1$ range of between 1 and 1.7. Here, $\beta_1=1.5$ was chosen.

Further, using the divided recording pulses as shown in FIG. 16(c) and setting $\alpha_1=1$ and $\alpha_1=1.5$, the dependency on the last off pulse $\beta_m$ length was studied. FIGS. 19(a) and 19(b) show the $\beta_m$-dependency of the mark length and the space length and the $\beta_m$-dependency of the mark jitter and the space jitter, respectively. The figures show that the desired mark length and space length were obtained for $\beta_m$=around 0.7 and that satisfactory jitters were obtained in a wide range of $\beta_m=0$ to 1.8.

These show that setting $\alpha_1=1$, $\beta_1=1.5$ and $\beta_m=0.8$ results in the desired 11T mark length and minimum jitters.

(3) With the results of the above (1) and (2) taken into account, a pulse dividing method based on the (divided recording pulse generating method 2) described above and using a base period of 2T was performed, in a range of $\alpha_1=1\pm0.5$ and $\beta_1=1\pm0.5$, on the EFM modulation signal which consists of 3T to 11T mark lengths. The specific pulse dividing method for each mark length is shown in FIG. 20.

That is, for the mark recording in which n is even, i.e., the mark length is nT=2LT, where L is an integer equal to or more than 2, the mark is divided into m=L sections and the recording pulse section $\alpha_i$ where the recording power $Pw_i$ is to be radiated and the off pulse section $\beta_i$ where the bias power $Pb_i$ is to be radiated are set as follows:

$\alpha_1+\beta_1=2$ $\alpha_i+\beta_i=2$ $(2\leq i\leq m-1)$ $\alpha_m+\beta_m=1.6$ For the mark recording in which n is odd, i.e., the mark length is nT=(2L+1)T, the mark is divided into m=L sections and each pulse sections is set as follows:

$\alpha_1'+\beta_1'=2.5$ $\alpha i'+\beta_i'=2$ $(2\leq i\leq m-1)$ $\alpha_m'+\beta_m'=2.1$ Although the division number is the same m=L for the 2LT mark and the (2L+1)T mark, the first period and the last period are differentiated between these marks by giving them a 0.5T difference.

In FIG. 20 the delay of $\alpha_1 T$ from the front end of the nT mark is set to $T_{d1}=0$. For $n\geq 4$, the intermediate pulse group is held constant at $\alpha_i=0.8$ and $\beta_i=1.2$ $(2\leq i\leq m-1)$ irrespective of the n value.

Further, when n is even, the following settings are made: $\alpha_1=0.8$, $\beta_1 32 1.2$, $\alpha_m=0.7$ and $\beta_m=0.9$. When n is odd, the following settings are made: $\alpha_1'=1.0$, $\beta_1'=1.5$, $\alpha_m'=1.0$ and $\beta_m'=1.1$. Only the 3T case was exceptional. A 3T mark length was obtained for $\alpha_1=1.2$ and $\beta_1=1.5$. In FIG. 20, the recording pulse section and the off pulse section are represented by the top and bottom portions of the rectangular wave. Individual lengths of sections are indicated by numbers, and the depicted lengths of the top and bottom portions in the figure are not scaled to the exact lengths of the sections.

The recording power $Pw_i$ and the bias power $Pb_i$ were set constant irrespective of the i value, i.e., Pw=20 mW and Pb=0.8 mW, the erase power Pe was set to 10 mW.

Figure 21:
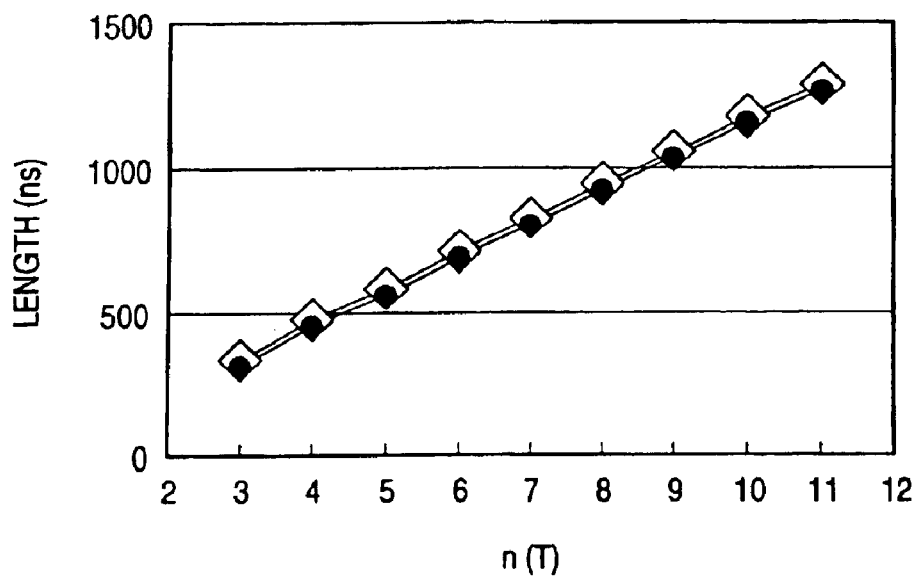
FIG. 21 is a graph showing a mark length (-◇-) and a space length (-●-), and their jitters in (3) of embodiment 3.
Figure 21:
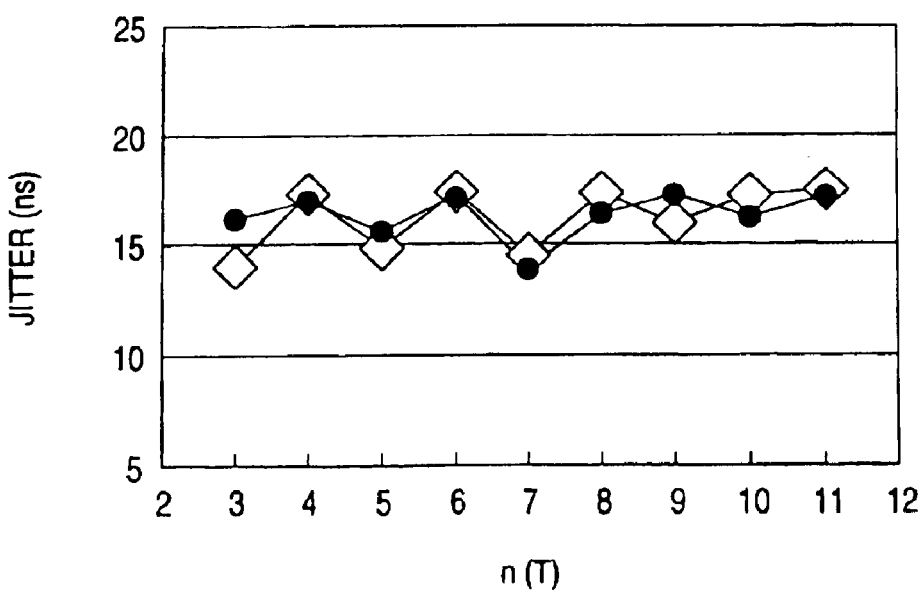

After 9 overwrites were performed (the initial recording was deemed a 0-th recording), measurements were made of the mark length and space length and also jitters for each nT mark and nT space. The measurements of mark lengths and space lengths are shown in FIG. 21(a) and the measurements of jitters of the marks and spaces are shown in FIG. 21(b). The mark lengths and space lengths were almost precisely nT and the jitters were below 17.5 nanoseconds although the jitters degraded 2–3 nanoseconds from the initial recording due to overwriting. Instead of performing overwrite, the erase power Pe was radiated DC-wise for erase operation. This resulted in a jitter improvement of about 2 nanoseconds.

(4) An overwrite was performed on the same medium at ×10-speed of CD by changing the clock period so that the product of the linear velocity v and the clock period T was constant. That is, the reference clock period T in this case was 23.1 nanoseconds. For $n\geq 4$, $\alpha_i T$ $(1\leq i\leq m)$ was held almost constant. That is, the intermediate recording pulse group was held constant at $\alpha_i=0.5$ and $\beta_i=1.5$ $(2\leq i\leq m-1)$.

The divided pulses are as shown in FIG. 22. When n was even, pulses were set to $\alpha_1=0.6$, $\beta_1=1.4$, $\alpha_m=0.5$ and $\beta_m=1.4$. When n was odd, pulses were set to $\alpha_1'=0.6$, $\beta_1'=1.9$, $\alpha_m'=0.6$ and $\beta_m'=1.8$. Only the 3T case was exceptional. A 3T mark length was obtained for $\alpha_1=0.8$ and $\beta_1=2.4$. This divided recording pulses correspond, except for n=3, roughly to multiplying the clock period by 16/10 (inversely proportional to the linear velocity) while holding the recording pulse length obtained in FIG. 20 constant. The recording power $Pw_i$ and the bias power $Pb_i$ were held constant at Pw=20 mW and Pb=0.8 mW irrespective of the i value as in the case with the ×16-speed. The erase power Pe was also set to 10 mW as in the case with the ×16-speed.

Figure 23:
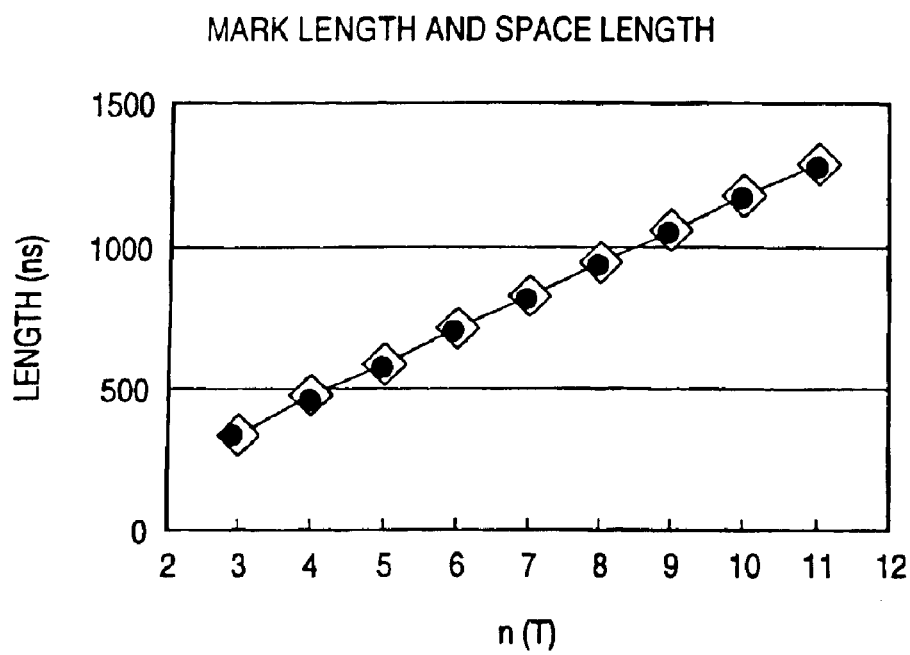
FIG. 23 is a graph showing a mark length (-◇-) and a space length (-●-), and their jitters in (4) of embodiment 3.

After 9 overwrites were performed (the initial recording was deemed a 0-th recording), measurements were made of the mark length and space length and also jitters for each nT mark and nT space. The measurements of mark lengths and space lengths are shown in FIG. 23(a) and the measurements of jitters of the marks and spaces are shown in FIG. 23(b). The mark lengths and space lengths were almost precisely nT and the jitters were below 17.5 nanoseconds although the jitters degraded 2–3 nanoseconds from the initial recording due to overwriting.

Instead of performing overwrite, the erase power Pe was radiated DC-wise for erase operation. This resulted in a jitter improvement of about 2 nanoseconds.

(5) An overwrite was performed on the same medium by using a repetitive pattern (11T pattern) consisting of 11T mark with divided recording pulses and 11T spaces, and a repetitive pattern (3T pattern) consisting of 3T mark with divided recording pulses and 3T spaces. After overwriting the 3T pattern nine times, the 11T pattern was overwritten at the 10th time and a rate of reduction in the carrier level of the 3T signal (in unit of dB) was measured as an erase ratio (overwrite erase ratio). Although the 3T pattern was slightly deviated among different linear velocities, both the 3T and 11T patterns were basically changed according to the division method of FIG. 20 so that $\alpha_i T$ $(1\leq i\leq m)$ remained almost constant.

The erase ratio was evaluated by changing the linear velocity while keeping the product of the linear velocity and the reference clock period constant. The overwrite erase ratio of 20 dB or more was obtained for the 10, 12, 16 and 18 times the CD linear velocity.

When a random pattern was recorded, it was verified with a transmission electron microscope that the nT marks were not divided into a plurality of amorphous portions but formed into a continuous amorphous mark.

The recording layer similar to that used above was peeled off after being initialized and its crystallinity was observed with a transmission electron microscope. The observation found that the recording layer was a polycrystal formed of a single phase of hexagonal crystal. The crystal phase was found to have no phase separation and is assumed to have a single phase polycrystalline structure with the orientations rotated. An examination using an X-ray diffraction found that it had a hexagonal structure.

Embodiment 4

Over a polycarbonate substrate 0.6 mm thick formed with a tracking groove, which has a track pitch of 0.74 μm, a groove width of about 0.27 μm and a groove depth of about 30 nm, a $(ZnS)_{80}(SiO_2)_{20}$ protective layer was deposited to a thickness of 68 nm, a $Ge_5Sb_{77}Te_{18}$ recording layer to 14 nm, a $(ZnS)_{80}(SiO_2)_{20}$ protective layer to 25 nm, and an $Al_{99.5}Ta_{0.5}$ alloy reflection layer to 200 nm (volume resistivity of about 100 nΩ·m and sheet resistivity of 0.5 Ω/□) by sputtering in the vacuum chamber. An ultraviolet curing resin layer was applied over this substrate to a thickness of 4 μm by a spin coat. This is bonded with another substrate 0.6 mm thick having the same structure of layers to form a phase change disk.

As in the embodiment 3, the disk thus obtained was arranged so that a major axis of a focused laser beam was oriented in the direction of the disk radius, the laser beam having a wavelength of about 810 nm and an elliptical shape about 108 μm in major axis by about 1.5 μm in minor axis. The disk was scanned at a linear velocity of 3–6 m/s and irradiated with a power of 400–600 mW for initialization. Further, in the evaluation apparatus with a laser wavelength of 660 nm and a pickup numerical aperture NA of 0.65, tracking and focus servos were activated to scan about 6 mW of DC light over the grooves once at 4 m/s to reduce the noise of the crystallization level.

For the retrieve/write evaluation, a Pulsetec DDU1000 (wavelength of about 660 nm, NA=0.55) was used to write into and retrieve from the grooves. As a signal source for generating gate signals, an arbitrary waveform signal source AWG610 manufactured by Sony Techtronix was used. In this case, the length of a 3T mark was 0.4 μm and the clock period at each linear velocity was so set that the recording density would be the same as that of DVD (26.16 MHz at 3.5 m/s).

Figure 25:
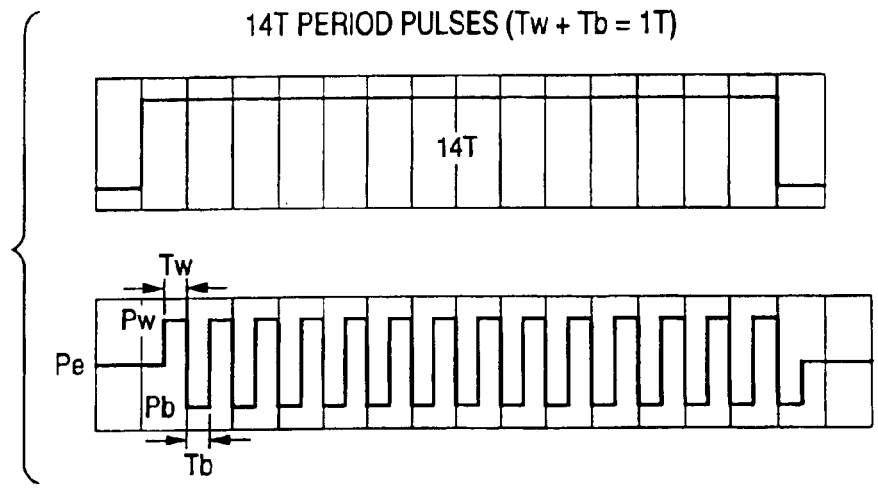
FIG. 25 is an explanatory diagram showing an example of a pulse division scheme according to embodiment 4 and a dependency on Tw/T of a modulation obtained.
Figure 25:
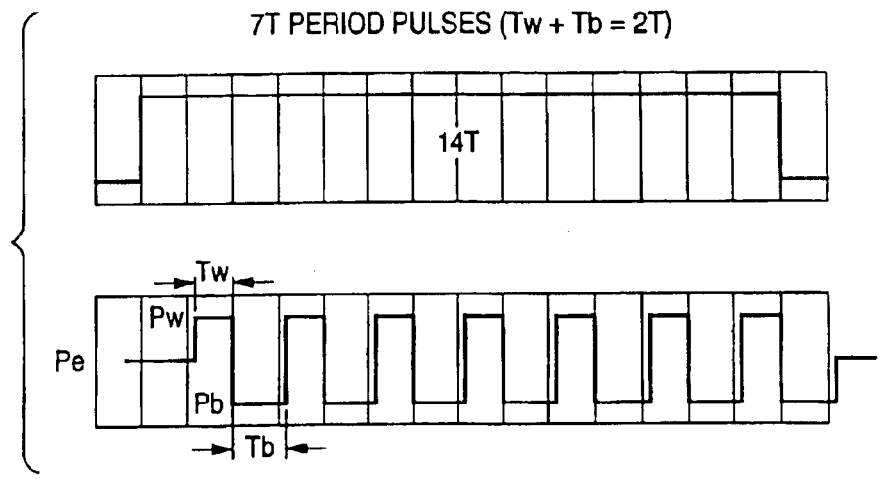
Figure 25:
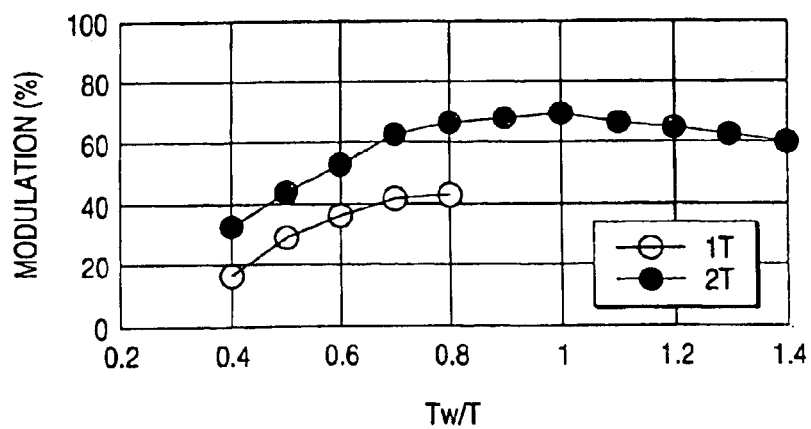

First, the linear velocity during the recording was set to 16.8 m/s (clock frequency of 125.93 MHz and clock period of 7.9 nsec) equivalent to the ×4.8-speed of DVD; a 14T section was divided by using simple waveforms as shown in FIG. 25; and the intermediate divided recording pulses were examined. The space was set to 14T. The recording power was set to a constant value of Pw=15 mW, the erase power to Pe=5 mW, and the bias power to Pb=0.5 mW. The recording power application section was denoted Tw and the bias power application section Tb. Two cases were studied: in the first case Tw+Tb=1T was set and Pw and Pb were applied for 14T periods (FIG. 25(*a*)); and in the second case Tw+Tb=2T was set and Pw and Pb were applied for 7T periods FIG. 25(*b*)). In each of these two cases, the dependency of the modulation of the recording mark portion of the retrieved signal on a ratio of Tw to T (Tw/T) was evaluated. When the Tw/T for 2T periods was 1.0, the signal obtained was a square wave almost free of distortion and the modulation was maximum. When the Tw/T ratio was less than 0.5, the waveform was distorted. This is considered due to the insufficient recording power application section and therefore an insufficient temperature rise. Conversely, when the Tw/T is more than 1.0, as Tw increases, the modulation decreases. This is considered due to the insufficient cooling time, which prevents the transformation to the amorphous state by recrystallization. When Tw/T exceeds 1.5, the modulation falls below 5%, resulting in a distorted waveform (not shown). For 1T period, the modulation was low over the entire range and only the distorted waveforms were produced. This is because in the 1T period there might not be a range where the recording power application time and the cooling time were both sufficient.

It can be seen from the foregoing discussion that, in the divided recording pulse generating method 2 or 3, the intermediate divided recording pulse group for at least $2 \leq i \leq m-1$ is preferably set to $\alpha_i = \alpha_i' = 1$ and $\beta_i = \beta_i' = 1$.

Next, it was verified as follows that the disk discussed above was capable of high speed erasure at high linear velocities of 14 m/s and 17.5 m/s (equivalent to 4 and 5 times the DVD linear velocity of 3.5 m/s). That is, the overwrite was performed by using a repetitive pattern (8T pattern) consisting of 8T mark with divided recording pulses and 8T spaces, and a repetitive pattern (3T pattern) consisting of 3T mark with divided recording pulses and 3T spaces. After overwriting the 3T pattern 9 times, the 8T pattern was overwritten at the 10th time and a rate of reduction in the carrier level of the 3T signal was determined as an overwrite erase ratio. The overwrite erase ratio was determined by keeping the product of the linear velocity and the reference clock period constant so that the same recording density as the DVD was obtained. The overwrite erase ratio of 25 dB or more was obtained for 14 m/s and 17.5 m/s.

Further, a pulse dividing method based on the divided recording pulse generating method 3 described above and using a base period of 2T was performed on a EFM+ modulation signal consisting of 3T–11T and 14T marks. This EFM+ modulation signal was recorded at 14 m/s and 16.8 m/s (3 and 4.8 times the DVD linear velocity of 3.5 m/s). For the ×4-speed, the clock frequency was 104.9 MHz and the clock period was 9.5 nsec. For the ×4.8-speed, the clock frequency was 125.9 MHz and the clock period was 7.9 nsec. The specific pulse dividing method is as shown in FIG. 26.

For the mark recording in which n is even, i.e., the mark length is nT=2LT (L is an integer equal to or more than 2), the mark is divided into m=L sections and $\alpha_i$ and $\beta_i$ in the recording pulse section $\alpha_i T$ and the off pulse section $\beta_i T$ are set as follows:

$$T_{d1} + \alpha_1 = 2 \ (T_{d1} = 0.95)$$

$$\beta_{i-1} + \alpha_i = 2 \ (2 \leq i \leq m-1)$$

For the mark recording in which n is odd, i.e., the mark length is nT=(2L+1)T, the mark is divided into m=L sections and $\alpha_i$ and $\beta_i$ in the recording pulse section $\alpha_i T$ and the off pulse section $\beta_i T$ are set as follows:

$$T_{d1}' + \alpha_1' = 2.05 \ (T_{d1}' = 1)$$

$$\beta_1' + \alpha_2' = 2.45$$

$$\beta_{i-1}' + \alpha_i' = 2 \ (3 \leq i \leq m-1)$$

$$\beta_{m-1}' + \alpha_m' = 2.45$$

In this case, for L=2, $\beta_1' + \alpha_2' = 2.9$ and $\alpha_m = 1$ and $\alpha_m' = \alpha_m + 0.2 = 1.2$.

In the case of $L \geq 3$, the intermediate recording pulse group was set to constant values: $\alpha_i' = \alpha_i = 1$ and $\beta_i' = \beta_i = 1$ ($2 \leq i \leq m-1$), and $\alpha_m = \alpha_m' = 1$. For $L \geq 2$, they were set to constant values, not dependent on the n value: $\alpha_1 = \alpha_1' = 1.05$ and $\beta_m = \beta m' = 0.4$.

Further, in the case of 3T, a 3T mark length was obtained with $T_{d1} = 1.15$, $\alpha_1 = 1.2$ and $\beta_1 = 0.8$. In FIG. 26, the recording pulse section and the off pulse section are represented by the top and bottom portions of the rectangular wave. Specific lengths of sections are indicated by numbers, and the depicted lengths of the top and bottom portions in the figure do not correspond to the lengths of the sections.

Figure 27:
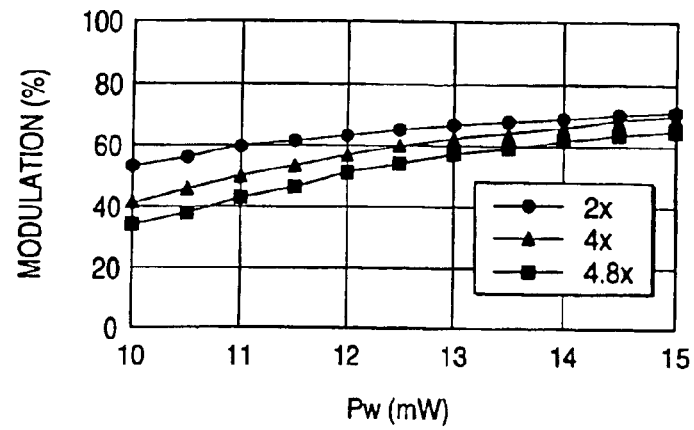
FIG. 27 is a diagram showing a dependency on power of modulation and jitter and a dependency of jitter on the number of overwrites.
Figure 27:
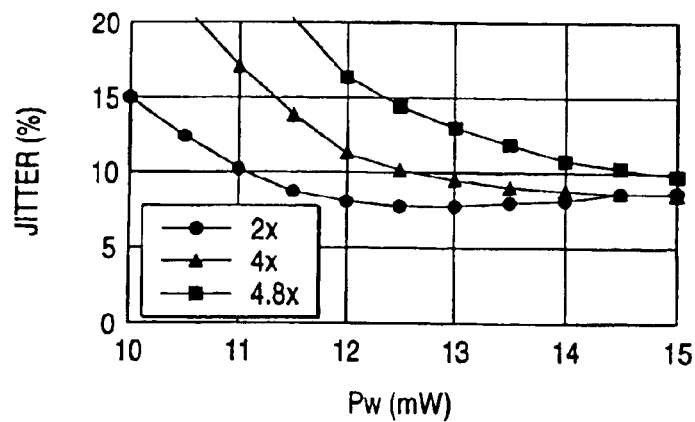
Figure 27:
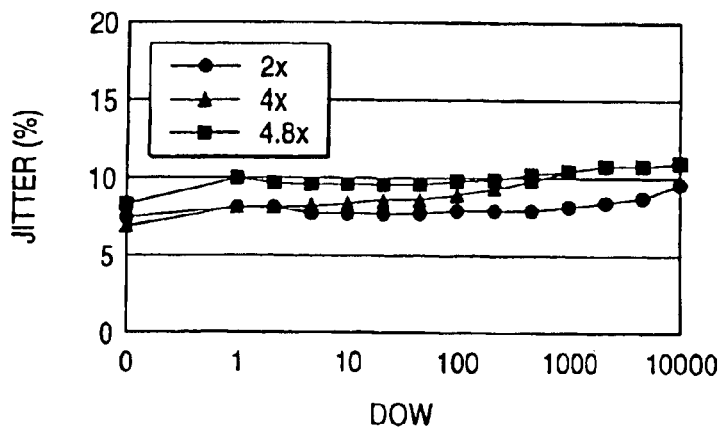

The bias power $Pb_i$ was set to a fixed value Pb=0.5 mW, not dependent on the i value, and the erase power Pe was set to 4.5 mW. The recording power $Pw_i$ was also set to a fixed value irrespective of the i value. After overwriting 9 times, the edge-to-clock jitter and the dependency of the modulation on the recording power were measured. Retrieving was performed using the reproducing light power of Pr=0.8 mW and the linear velocity of 3.5 m/s. At either recording linear velocity and with the recording power of 15.0 mW, the edge-to-clock jitter was less than 10% and the modulation achieved 60% or higher, as shown in FIG. 27(*a*) and 27(*b*). $R_{top}$ was about 18%. Measurement of the overwrite dependency at the recording power of 15.0 mW found that, as shown in FIG. 27(*c*), the edge-to-clock jitter was 11% or less even after 10,000 overwrite operations. At this time $R_{top}$ and the modulation exhibited almost no change with the overwrite.

Further, a pulse dividing method of FIG. 28 based on the divided recording pulse generating method 3 described above was performed on the similar disk by recording an EFM+ modulation signal at a linear velocity of 7 m/s, equivalent to two times the DVD linear velocity, and a clock frequency of 52.5 MHz (clock period of 19.1 nsec).

As in the case with 4 and 4.8 times the DVD speed, the bias power was set constant at Pb=0.5 mW and the erase power Pe at 4.5 mW. The recording power $Pw_i$ was also set constant, not dependent on the i value. After nine overwrite operations, the edge-to-clock jitter and the recording power dependency of the modulation were measured. As shown in FIG. 27(a) and 27(b), at the recording power of 13.0 mW, the edge-to-clock jitter was less than 8% and the modulation achieved 57% or higher. $R_{top}$ was about 18%. At the recording power of 13.0 mW, the overwrite dependency was measured and it was found that, as shown in FIG. 27(c), the edge-to-clock jitter was below 11% even after 10,000 overwrite operations. At this time $R_{top}$ and the modulation exhibited almost no change with the overwrite.

From the above discussion, it is understood that the use of the pulse dividing method based on the divided recording pulse generation method 3 enables recording in a linear velocity range of 2 to 4.8 times the DVD linear velocity. Hence, with this method the recording with a constant angular velocity can be performed in a radial range, for example, from about 24 mm to about 58 mm, which constitutes a data area of DVD.

INDUSTRIAL APPLICABILITY

According to this invention, even when the reference clock period is short, a satisfactory mark length modulation recording can be performed, allowing a higher density and a faster recording of the optical recording media. This in turn leads to an increase in the recordable capacity of the optical disk and enables the recording speed and transfer rate of the optical disk to be enhanced, greatly expanding the range of its applications for recording large amounts of data such as music and video and for external storage devices of computers. For instance, it is possible to realize a rewritable CD that overwrites EFM modulation marks at speeds more than 12 times the CD linear velocity and a rewritable DVD that overwrites EFM+ modulation marks at speeds more than 4 times the DVD linear velocity.

What is claimed is:

1. An optical recording method for recording mark length-modulated information with a plurality of recording mark lengths by irradiating a recording medium with a light, the optical recording method comprising the steps of:

when a time length of one recording mark is denoted nT (T is a reference clock period equal to or less than 25 ns, and n is a natural number equal to or more than 2), dividing the time length of the recording mark nT into $$\eta_1 T, \alpha_1 T, \beta_1 T, \alpha_2 T, \beta_2 T, \ldots, \alpha_i T, \beta_i T, \ldots \alpha_m T, \beta_m T, \eta_2 T$$

in that order (m is a pulse division number; $\Sigma_i(\alpha_i+\beta_i)+\eta_1+\eta_2=n$; $\alpha_i$ ($1 \leq i \leq m$) is a real number larger than 0; $\beta_i$ ($1 \leq i \leq m-1$) is a real number larger than 0; $\beta_m$ is a real number larger than or equal to 0; and $\eta_1$ and $\eta_2$ are real numbers between −2 and 2);

radiating recording light with a recording power $Pw_i$ in a time duration of $\alpha_i T$ ($1 \leq i \leq m$); and radiating recording light with a bias power $Pb_i$ in a time duration of $\beta_i T$ ($1 \leq i \leq m-1$), the bias power being $Pb_i < Pw_i$ and $Pb_i < Pw_{i+1}$;

wherein the pulse division number m is 2 or more for the time duration of at least one recording mark and meets $n/m \geq 1.25$ for the time length of all the recording marks, further wherein when the same pulse division number m is used on at least two recording marks with different n values, said at least two recording marks are formed by changing at least one of pulse time of $(\alpha_1+\beta_1)$, $(\alpha_2+\beta_1)$, $(\alpha_m+\beta_{m-1})$ and $(\alpha_m+\beta_m)$ or changing one of duty ratio of $(\alpha_i/(\alpha_i+\beta_i))$ and $(\alpha_i/(\alpha_i+\beta_{i-1}))$.

2. An optical recording method according to claim 1, wherein when the same pulse division number m is used on two recording marks of which length difference is 1T, said two recording marks are formed by changing at least two of $\alpha_1$, $\beta_1$, $\alpha_2$, $\beta_{m-1}$, $\alpha_m$, and $\beta_m$.

3. An optical recording method according to claim 2, wherein said two recoding marks are formed by changing at least one of $\beta_1$, $\beta_{m-1}$, and $\beta_m$.

4. An optical recording method according to claim 1, wherein $Pw_i$ and $Pb_i$ are represented by Pw and Pb respectively for all the value n and the value i where i is $1 \leq i \leq m$.

5. An optical recording method according to claim 1, wherein $\alpha_i+\beta_i$ ($2 \leq i \leq m-1$) or $\beta_{i-1}+\alpha_i$ ($2 \leq i \leq m-1$) is a constant value independently of said real number i.

6. An optical recording method according to claim 5, wherein $\alpha_i+\beta_i$ ($2 \leq i \leq m-1$) or $\beta_{i-1}+\alpha_i$ ($2 \leq i \leq m-1$) is 2 independently of said real number i.

7. An optical recording method according to claim 1, wherein $\alpha_i$ is kept almost constant as a constant value α c where said i is ($2 \leq i \leq m-1$).

8. An optical recording method according to claim 1, wherein $\alpha_i$ ($2 \leq i \leq m-1$) is kept almost constant for the recording marks with the pulse division number of not less than 3.

9. An optical recording method according to claim 1, wherein when performing a mark length modulation scheme recording on the same recording medium by using a plurality of linear velocities v while keeping v×T constant, for m equal to or greater than 2, $(\alpha_i+\beta_i)$ in $2 \leq i \leq m-1$ is kept constant independently of the linear velocity, $Pw_i$, $Pb_i$ and Pe in each i are kept almost constant independently of the linear velocity, and $\alpha_i$ ($2 \leq i \leq m-1$) is decreased as the linear velocity lowers.

10. An optical recording method according to claim 1, wherein when performing a mark length modulation scheme recording on the same recording medium by using a plurality of linear velocities v while keeping v×T constant, for m equal to or greater than 2, $(\beta_i+\alpha_i)$ in $2 \leq i \leq m$ are kept constant independently of the linear velocity, $Pw_i$, $Pb_i$ and Pe in each i are kept almost constant independently of the linear velocity, and $\alpha_i$ ($2 \leq i \leq m$) are decreased as the linear velocity lowers.

11. An optical recording method according to claim 9 or 10, wherein $\alpha_i T$ ($2 \leq i \leq m-1$) are kept almost constant independently of the linear velocity.

* * * * *